US012585563B1

(12) United States Patent (10) Patent No.: US 12,585,563 B1
Cole et al. (45) Date of Patent: Mar. 24, 2026

(54) CACHING FOR OBJECT STORES

(71) Applicant: Qumulo, Inc., Seattle, WA (US)

(72) Inventors: Christopher Edward Cole, Seattle, WA (US); Matthew Christopher McMullan, Bellevue, WA (US); Thomas Gregory Rothschilds, Issaquah, WA (US); Tyler Morrison Moody, Seattle, WA (US); Yuxi Bai, Seattle, WA (US); Michael Anthony Chmiel, Seattle, WA (US); Aaron James Passey, San Rafael, CA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 19/405,047

(22) Filed: Dec. 1, 2025

(51) Int. Cl.
*G06F 11/00* (2006.01)
*G06F 11/10* (2006.01)
*G06F 11/30* (2006.01)
*G06F 11/32* (2006.01)
*G06F 12/0891* (2016.01)

(52) U.S. Cl.
CPC ...... *G06F 11/3037* (2013.01); *G06F 11/1064* (2013.01); *G06F 11/324* (2013.01); *G06F 12/0891* (2013.01)

(58) Field of Classification Search
CPC ............. G06F 11/3037; G06F 11/1064; G06F 11/324; G06F 11/073; G06F 11/321; G06F 11/322; G06F 11/323; G06F 11/327; G06F 11/328
See application file for complete search history.

(56) References Cited

U.S. PATENT DOCUMENTS 5,165,031 A    11/1992  Pruul et al.
5,283,875 A    2/1994   Gibson et al.
5,319,773 A    6/1994   Britton et al.
(Continued)

FOREIGN PATENT DOCUMENTS

CN    101689141 A  *  3/2010  ............. G06F 11/07
CN    116647491 A     8/2023
(Continued)

OTHER PUBLICATIONS

Office Communication for U.S. Appl. No. 18/070,705 mailed Feb. 22, 2024, 7 Pages.
(Continued)

*Primary Examiner* — Katherine Lin
(74) *Attorney, Agent, or Firm* — John W. Branch; Branch Partners PLLC

(57) ABSTRACT

Embodiments provide caching for object stores. A read request to collect data from a file system may be obtained. A file system address associated with the read request may be used to perform further actions including: collecting cache lines in the read cache; collecting portions of the data for the read request from the cache lines. Other portions of the data that are unavailable in the read cache may be used to perform further actions, including: collecting fixed size slices of content that include the other portions of the data from objects in the object store based on the read request; obtaining new cache lines based on the fixed size slices of content such that the new cache lines are stored in the read cache; collecting a response to the read request based on the portions of the data and the other portions of the data.

20 Claims, 20 Drawing Sheets

(56) References Cited

U.S. PATENT DOCUMENTS

| | | | |
|---|---|---|---|
| 5,410,684 A | 4/1995 | Ainsworth et al. | |
| 5,410,719 A | 4/1995 | Shackleford | |
| 5,442,561 A | 8/1995 | Yoshizawa et al. | |
| 5,953,719 A | 9/1999 | Kleewein et al. | |
| 6,049,809 A | 4/2000 | Raman et al. | |
| 6,236,996 B1 | 5/2001 | Bapat et al. | |
| 6,385,641 B1 | 5/2002 | Jiang et al. | |
| 6,415,283 B1 | 7/2002 | Conklin | |
| 6,496,944 B1 | 12/2002 | Hsiao et al. | |
| 6,529,998 B1 | 3/2003 | Yochai et al. | |
| 6,560,615 B1 | 5/2003 | Zayas et al. | |
| 6,772,435 B1 | 8/2004 | Thexton et al. | |
| 6,874,130 B1 | 3/2005 | Baweja et al. | |
| 6,892,211 B2 | 5/2005 | Hitz et al. | |
| 6,965,903 B1 | 11/2005 | Agarwal et al. | |
| 6,965,936 B1 | 11/2005 | Wipfel et al. | |
| 7,072,911 B1 | 7/2006 | Doman et al. | |
| 7,165,158 B1 | 1/2007 | Yagawa | |
| 7,213,040 B1 | 5/2007 | Stokes et al. | |
| 7,330,948 B2 | 2/2008 | Deguchi et al. | |
| 7,467,333 B2 | 12/2008 | Keeton et al. | |
| 7,594,138 B2 | 9/2009 | Abdulvahid | |
| 7,636,743 B2 | 12/2009 | Erofeev | |
| 7,693,876 B2 | 4/2010 | Hackworth et al. | |
| 7,757,056 B1 | 7/2010 | Fair | |
| 7,761,456 B1 | 7/2010 | Cram et al. | |
| 7,844,580 B2 | 11/2010 | Srivastava et al. | |
| 7,933,870 B1 | 4/2011 | Webster | |
| 7,937,421 B2 | 5/2011 | Mikesell et al. | |
| 7,956,293 B2 | 6/2011 | Echigo et al. | |
| 7,958,304 B1 | 6/2011 | Goel et al. | |
| 7,962,709 B2 | 6/2011 | Agrawal | |
| 7,966,293 B1 | 6/2011 | Owara et al. | |
| 8,027,827 B2 | 9/2011 | Bitar et al. | |
| 8,046,378 B1 | 10/2011 | Zhuge et al. | |
| 8,108,429 B2 | 1/2012 | Sim-Tang et al. | |
| 8,140,773 B2 * | 3/2012 | Saha | G06F 12/14 |
| | | | 711/163 |
| 8,296,312 B1 | 10/2012 | Leung et al. | |
| 8,341,540 B1 | 12/2012 | Haynes et al. | |
| 8,353,044 B1 | 1/2013 | Jones et al. | |
| 8,355,407 B2 | 1/2013 | Wookey et al. | |
| 8,364,648 B1 | 1/2013 | Sim-Tang | |
| 8,423,733 B1 | 4/2013 | Ozdemir | |
| 8,423,821 B1 | 4/2013 | Keith, Jr. | |
| 8,448,170 B2 | 5/2013 | Wipfel et al. | |
| 8,463,825 B1 | 6/2013 | Harty et al. | |
| 8,489,656 B2 | 7/2013 | Erofeev | |
| 8,504,733 B1 | 8/2013 | Iyer et al. | |
| 8,515,911 B1 | 8/2013 | Zhou et al. | |
| 8,612,404 B2 | 12/2013 | Bone et al. | |
| 8,612,488 B1 | 12/2013 | Subramanya et al. | |
| 8,645,323 B2 | 2/2014 | Jackiewicz et al. | |
| 8,661,447 B1 | 2/2014 | Olliff et al. | |
| 8,725,691 B1 | 5/2014 | Natanzon | |
| 8,776,050 B2 | 7/2014 | Plouffe et al. | |
| 8,782,655 B2 | 7/2014 | Blanding et al. | |
| 8,805,786 B1 | 8/2014 | Natanzon | |
| 8,806,154 B1 | 8/2014 | Gupta et al. | |
| 8,838,887 B1 | 9/2014 | Burke et al. | |
| 8,838,931 B1 | 9/2014 | Marshak et al. | |
| 8,849,754 B2 | 9/2014 | Craggs | |
| 8,849,764 B1 | 9/2014 | Long et al. | |
| 8,849,809 B1 | 9/2014 | Seshadri | |
| 8,868,797 B1 | 10/2014 | Kirac et al. | |
| 8,924,364 B1 | 12/2014 | Zhong et al. | |
| 8,972,694 B1 | 3/2015 | Dolan et al. | |
| 9,015,214 B2 | 4/2015 | Nishida et al. | |
| 9,026,765 B1 | 5/2015 | Marshak et al. | |
| 9,031,994 B1 | 5/2015 | Cao et al. | |
| 9,032,170 B2 | 5/2015 | Vaghani et al. | |
| 9,047,017 B1 | 6/2015 | Dolan et al. | |
| 9,141,633 B1 | 9/2015 | Li et al. | |
| 9,143,379 B1 | 9/2015 | Berger et al. | |
| 9,158,653 B2 | 10/2015 | Gold | |
| 9,171,145 B2 | 10/2015 | Dash et al. | |
| 9,244,975 B2 | 1/2016 | Das et al. | |
| 9,244,976 B1 | 1/2016 | Zhang et al. | |
| 9,361,187 B2 | 6/2016 | Jarvis | |
| 9,384,252 B2 | 7/2016 | Akirav et al. | |
| 9,396,202 B1 | 7/2016 | Drobychev et al. | |
| 9,459,804 B1 | 10/2016 | Natanzon et al. | |
| 9,501,487 B1 | 11/2016 | Yuan et al. | |
| 9,519,664 B1 | 12/2016 | Kharatishvili et al. | |
| 9,547,560 B1 | 1/2017 | Lee | |
| 9,600,193 B2 | 3/2017 | Ahrens et al. | |
| 9,613,120 B1 | 4/2017 | Kharatishvili et al. | |
| 9,727,432 B1 | 8/2017 | Cutforth et al. | |
| 9,747,171 B2 | 8/2017 | Beeken et al. | |
| 9,753,782 B2 | 9/2017 | Fang et al. | |
| 9,753,932 B1 | 9/2017 | Brow et al. | |
| 9,753,987 B1 | 9/2017 | Dolan et al. | |
| 9,785,377 B2 | 10/2017 | Shin et al. | |
| 9,836,480 B2 | 12/2017 | Okun et al. | |
| 9,846,698 B1 | 12/2017 | Panidis et al. | |
| 10,073,856 B1 | 9/2018 | Cooper et al. | |
| 10,095,708 B2 | 10/2018 | Passey et al. | |
| 10,095,709 B2 | 10/2018 | Okun et al. | |
| 10,095,729 B2 | 10/2018 | Taron et al. | |
| 10,140,185 B1 | 11/2018 | Lopez et al. | |
| 10,162,980 B1 | 12/2018 | Bernotavicius et al. | |
| 10,261,868 B2 | 4/2019 | Brown et al. | |
| 10,275,493 B1 | 4/2019 | Mostak | |
| 10,303,561 B2 | 5/2019 | Beeken et al. | |
| 10,318,401 B2 | 6/2019 | Rothschilds et al. | |
| 10,318,494 B2 | 6/2019 | Krasnow et al. | |
| 10,339,101 B1 | 7/2019 | Gupta | |
| 10,346,355 B2 | 7/2019 | Godman | |
| 10,387,810 B1 | 8/2019 | Kalush et al. | |
| 10,409,784 B1 | 9/2019 | Krasnow et al. | |
| 10,423,609 B1 | 9/2019 | Strauss | |
| 10,437,509 B1 | 10/2019 | Alexeev et al. | |
| 10,447,779 B2 | 10/2019 | Dieterich et al. | |
| 10,459,884 B1 | 10/2019 | Godman | |
| 10,459,892 B2 | 10/2019 | Godman et al. | |
| 10,460,122 B1 | 10/2019 | Kirby et al. | |
| 10,474,635 B1 | 11/2019 | Unger et al. | |
| 10,534,758 B1 | 1/2020 | Carpenter et al. | |
| 10,540,662 B2 | 1/2020 | Barlett et al. | |
| 10,545,986 B2 | 1/2020 | Tappan et al. | |
| 10,552,373 B2 | 2/2020 | Brow et al. | |
| 10,606,812 B2 | 3/2020 | Cooper et al. | |
| 10,614,033 B1 | 4/2020 | Rothschilds et al. | |
| 10,614,241 B1 | 4/2020 | Kirby et al. | |
| 10,621,057 B2 | 4/2020 | Tripathi et al. | |
| 10,621,147 B1 | 4/2020 | Liang et al. | |
| 10,628,391 B1 | 4/2020 | Bent et al. | |
| 10,664,408 B1 | 5/2020 | Chatterjee et al. | |
| 10,678,663 B1 | 6/2020 | Sharma et al. | |
| 10,678,671 B2 | 6/2020 | Rothschilds et al. | |
| 10,725,977 B1 | 7/2020 | Chmiel et al. | |
| 10,795,796 B1 | 10/2020 | Bai et al. | |
| 10,860,372 B1 | 12/2020 | Bai et al. | |
| 10,860,414 B1 | 12/2020 | Urban et al. | |
| 10,860,546 B2 | 12/2020 | Ye et al. | |
| 10,860,547 B2 | 12/2020 | Passey et al. | |
| 10,877,942 B2 | 12/2020 | Okun et al. | |
| 10,936,538 B1 | 3/2021 | Unger et al. | |
| 10,936,551 B1 | 3/2021 | Unger et al. | |
| 10,938,650 B1 | 3/2021 | Hermoni et al. | |
| 10,938,661 B1 | 3/2021 | Pignataro et al. | |
| 11,023,535 B1 | 6/2021 | Greenwood et al. | |
| 11,132,126 B1 | 9/2021 | Chmiel et al. | |
| 11,132,336 B2 | 9/2021 | Passey et al. | |
| 11,150,823 B2 | 10/2021 | Gao et al. | |
| 11,151,001 B2 | 10/2021 | Su et al. | |
| 11,151,092 B2 | 10/2021 | Chmiel et al. | |
| 11,157,458 B1 | 10/2021 | Carter et al. | |
| 11,249,907 B1 | 2/2022 | Brewer | |
| 11,256,682 B2 | 2/2022 | Taron et al. | |
| 11,265,262 B1 | 3/2022 | Makie et al. | |
| 11,290,425 B2 | 3/2022 | Newell et al. | |
| 11,294,604 B1 | 4/2022 | McMullan et al. | |
| 11,294,718 B2 | 4/2022 | Bai et al. | |

(56)         References Cited

U.S. PATENT DOCUMENTS

| | | |
|---|---|---|
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 11,921,677 B1 | 3/2024 | Kirby et al. |
| 11,934,660 B1 | 3/2024 | McMullan et al. |
| 11,966,592 B1 | 4/2024 | Bai |
| 12,019,875 B1 | 6/2024 | McMullan et al. |
| 12,038,877 B1 | 7/2024 | Kirby et al. |
| 12,222,903 B1 | 2/2025 | Rothschilds et al. |
| 12,292,853 B1 | 5/2025 | Ellis et al. |
| 12,346,290 B2 | 7/2025 | Haber et al. |
| 12,443,559 B2 | 10/2025 | Ellis et al. |
| 12,443,568 B1 | 10/2025 | Bhageshpur et al. |
| 12,481,625 B1 | 11/2025 | Bhageshpur et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0004914 A1 | 1/2011 | Ennis et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0153560 A1 | 6/2011 | Bryant et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0103778 A1 | 4/2013 | Hayashi et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0310726 A1 | 11/2013 | Miller et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |

(56) References Cited

U.S. PATENT DOCUMENTS

| | | |
|---|---|---|
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0258657 A1 | 9/2014 | Schott et al. |
| 2014/0280485 A1 | 9/2014 | Hummaida et al. |
| 2014/0280889 A1 | 9/2014 | Nispel et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193317 A1 | 7/2015 | Firley |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0269203 A1 | 9/2015 | Baldwin et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0164916 A1 | 6/2016 | Satish et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0350363 A1 | 12/2016 | Raja et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2016/0380913 A1 | 12/2016 | Morgan et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0088153 A1 | 3/2019 | Bader-Natal et al. |
| 2019/0095112 A1 | 3/2019 | Lingarajappa |
| 2019/0102700 A1 | 4/2019 | Babu et al. |
| 2019/0163589 A1 | 5/2019 | Mcbride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0396287 A1 | 12/2020 | Kasi et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0132824 A1 | 5/2021 | Furuta et al. |
| 2021/0173588 A1 | 6/2021 | Kannan et al. |

(56) References Cited

U.S. PATENT DOCUMENTS

| | | |
|---|---|---|
| 2021/0191650 A1 | 6/2021 | Vansteenkiste et al. |
| 2021/0232427 A1 | 7/2021 | Bai et al. |
| 2021/0232464 A1 | 7/2021 | Su et al. |
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |
| 2023/0069434 A1 | 3/2023 | Cheng et al. |
| 2023/0106208 A1 | 4/2023 | Nossenson et al. |
| 2023/0342053 A1 | 10/2023 | Varghese et al. |
| 2024/0020268 A1 | 1/2024 | Haber et al. |
| 2024/0028596 A1 | 1/2024 | Lakshman et al. |
| 2025/0147924 A1 | 5/2025 | Ellis et al. |
| 2025/0245193 A1 | 7/2025 | Ellis et al. |

FOREIGN PATENT DOCUMENTS

| | | | | |
|---|---|---|---|---|
| DE | 69915462 T2 * | 3/2005 | ......... | G06F 16/9574 |
| EP | 1217551 A2 | 6/2002 | | |
| EP | 1498829 A1 | 1/2005 | | |
| EP | 3311312 A1 | 12/2016 | | |
| EP | 3333732 A1 | 6/2018 | | |
| EP | 3361397 A1 | 8/2018 | | |
| EP | 3361397 B1 | 11/2020 | | |
| EP | 3333732 B1 | 3/2023 | | |
| WO | 99/44145 A1 | 9/1999 | | |
| WO | 00/72201 A1 | 11/2000 | | |
| WO | 2009/007250 A2 | 1/2009 | | |
| WO | 2012/029259 A1 | 3/2012 | | |
| WO | 2016/205752 A1 | 12/2016 | | |
| WO | 2021/151107 A1 | 7/2021 | | |
| WO | 2021/189055 A2 | 9/2021 | | |
| WO | 2025/101416 A1 | 5/2025 | | |
| WO | 2025/101465 A1 | 5/2025 | | |

OTHER PUBLICATIONS

Office Communication for U.S. Appl. No. 18/070,705 mailed Mar. 5, 2024, 2 Pages.

Office Communication for U.S. Appl. No. 17/115,529 mailed Mar. 26, 2024, 27 Pages.

Office Communication for U.S. Appl. No. 18/583,746 mailed May 14, 2024, 21 Pages.

Office Communication for U.S. Appl. No. 18/590,088 mailed Apr. 24, 2024, 18 Pages.

Office Communication for U.S. Appl. No. 18/590,088 mailed May 2, 2024, 13 Pages.

Office Communication for U.S Appl. No. 17/864,190 mailed Jun. 4, 2024, 12 Pages.

Marcus Jurgens, "Aggregated Data in Tree-Based Index Structures" in Index Structures for Data Warehouses, LNCS 1859, Springer, Year: 2002, pp. 43-62.

Office Communication for U.S. Appl. No. 18/503,082 mailed Feb. 29, 2024, 26 Pages.

Office Communication for U.S. Appl. No. 18/503,082 mailed May 15, 2024, 27 Pages.

Office Communication for U.S. Appl. No. 18/503,082 mailed Jun. 25, 2024, 4 Pages.

Office Communication for U.S. Appl. No. 18/503,082 mailed Sep. 6, 2024, 27 Pages.

Office Communication for U.S. Appl. No. 18/799,431 mailed Oct. 23, 2024, 30 Pages.

Office Communication for U.S. Appl. No. 18/799,431 mailed Nov. 6, 2024, 27 Pages.

Office Communication for U.S. Appl. No. 17/864,190 mailed Dec. 6, 2024, 8 Pages.

Office Communication for U.S. Appl. No. 18/503,082 mailed Jan. 28, 2025, 8 Pages.

Office Communication for U.S. Appl. No. 18/945,379 mailed Feb. 21, 2025, 18 Pages.

Office Communication for U.S. Appl. No. 18/945,343 mailed Feb. 24, 2025, 25 Pages.

International Search Report and Written Opinion for International Patent Application No. PCT/US2024/053881 mailed Jan. 21, 2025, 14 Pages.

International Search Report and Written Opinion for International Patent Application No. PCT/US2024/054442 mailed Feb. 10, 2025, 8 Pages.

Ryousei Takano, File System Ext2/Ext3, Software Design, No. 161, Mar. 18, 2004, 16 pages with English translation.

Naohiro Aota, "F2FS optimized for flash memory", Nikkei Linux, vol. 17 No. 3, Mar. 3, 2015, 7 pages with English translation.

Office Communication for U.S. Appl. No. 18/945,379 mailed Jun. 4, 2025, 8 Pages.

Office Communication for U.S. Appl. No. 18/945,379 mailed Jun. 11, 2025, 5 Pages.

Office Communication for U.S. Appl. No. 18/945,343 mailed Jun. 25, 2025, 20 Pages.

Office Communication for U.S. Appl. No. 19/183,475 mailed Jun. 6, 2025, 18 Pages.

Office Communication for U.S. Appl. No. 18/945,343 mailed Aug. 8, 2025, 3 Pages.

Office Communication for U.S. Appl. No. 18/945,343 mailed Oct. 20, 2025, 27 Pages.

International Search Report and Written Opinion for International Patent Application No. PCT/US2025/036658 mailed Oct. 14, 2025, 13 Pages.

Office Communication for U.S. Appl. No. 17/062,500 mailed Jun. 13, 2023, 8 Pages.

Office Communication for U.S. Appl. No. 18/070,705 mailed Jun. 20, 2023, 16 Pages.

Office Communication for U.S. Appl. No. 18/070,705 mailed Feb. 23, 2023, 14 Pages.

Office Communication for U.S. Appl. No. 17/062,500 mailed Feb. 27, 2023, 23 Pages.

Office Communication for U.S. Appl. No. 17/954,640 mailed Mar. 15, 2023, 9 Pages.

Office Communication for U.S. Appl. No. 17/864,190 mailed Apr. 28, 2023, 5 Pages.

Office Communication for U.S. Appl. No. 17/973,944 mailed May 10, 2023, 9 Pages.

Office Communication for U.S. Appl. No. 17/115,529 mailed May 22, 2023, 25 Pages.

Office Communication for U.S. Appl. No. 17/864,190 mailed Jan. 24, 2023, 12 Pages.

Office Communication for U.S. Appl. No. 17/588,120 mailed Feb. 1, 2023, 15 Pages.

Office Communication for U.S. Appl. No. 17/864,190 mailed Sep. 19, 2022, 10 Pages.

Office Communication for U.S. Appl. No. 17/062,500 mailed Oct. 5, 2022, 4 Pages.

Office Communication for U.S. Appl. No. 17/203,452 mailed Oct. 19, 2022, 9 Pages.

Office Communication for U.S. Appl. No. 17/588,120 mailed Oct. 21, 2022, 5 Pages.

Office Communication for U.S. Appl. No. 17/203,452 mailed Nov. 9, 2022, 2 Pages.

(56)          References Cited

OTHER PUBLICATIONS

Office Communication for U.S. Appl. No. 17/588,895 mailed Nov. 9, 2022, 11 Pages.
Office Communication for U.S. Appl. No. 17/954,640 mailed Nov. 30, 2022, 10 Pages.
Office Communication for U.S. Appl. No. 17/115,529 mailed Dec. 9, 2022, 21 Pages.
Office Communication for U.S. Appl. No. 17/484,167 mailed May 17, 2022, 3 Pages.
Office Communication for U.S. Appl. No. 17/484,167 mailed Jun. 10, 2022, 5 Pages.
Office Communication for U.S. Appl. No. 17/203,452 mailed Jun. 22, 2022, 22 Pages.
Office Communication for U.S. Appl. No. 14/595,598 mailed Jul. 13, 2022, 9 Pages.
Office Communication for U.S. Appl. No. 17/062,500 mailed Jul. 26, 2022, 20 Pages.
Office Communication for U.S. Appl. No. 17/588,120 mailed Jul. 27, 2022, 34 Pages.
Office Communication for U.S. Appl. No. 17/190,653 mailed Aug. 2, 2022, 8 Pages.
Office Communication for U.S. Appl. No. 17/115,529 mailed Aug. 8, 2022, 21 Pages.
Office Communication for U.S. Appl. No. 17/588,895 mailed Aug. 12, 2022, 12 Pages.
Office Communication for U.S. Appl. No. 17/203,452 mailed Sep. 8, 2022, 4 Pages.
Office Communication for U.S. Appl. No. 17/504,289 mailed Mar. 28, 2022, 9 Pages.
Office Communication for U.S. Appl. No. 17/588,120 mailed Apr. 11, 2022, 36 Pages.
Office Communication for U.S. Appl. No. 17/588,895 mailed Apr. 27, 2022, 6 Pages.
Office Communication for U.S. Appl. No. 17/190,653 mailed Apr. 28, 2022, 13 Pages.
Office Communication for U.S. Appl. No. 17/510,043 mailed Apr. 29, 2022, 10 Pages.
Office Communication for U.S. Appl. No. 17/115,529 mailed Apr. 29, 2022, 4 Pages.
Office Communication for U.S. Appl. No. 17/190,653 mailed Dec. 21, 2021, 12 Pages.
Office Communication for U.S. Appl. No. 14/595,598 mailed Dec. 29, 2021, 19 Pages.
Office Communication for U.S. Appl. No. 17/062,500 mailed Jan. 7, 2022, 4 Pages.
Office Communication for U.S. Appl. No. 16/741,567 mailed Jan. 11, 2022, 6 Pages.
Office Communication for U.S. Appl. No. 17/203,452 mailed Jan. 14, 2022, 4 Pages.
Office Communication for U.S. Appl. No. 17/510,043 mailed Jan. 21, 2022, 13 Pages.
Office Communication for U.S. Appl. No. 16/741,567 mailed Feb. 7, 2022, 8 Pages.
Office Communication for U.S. Appl. No. 17/530,420 mailed Feb. 10, 2022, 24 Pages.
Office Communication for U.S. Appl. No. 16/004,182 mailed Feb. 18, 2022, 11 Pages.
Office Communication for U.S. Appl. No. 17/115,529 mailed Feb. 18, 2022, 20 Pages.
Office Communication for U.S. Appl. No. 17/203,452 mailed Feb. 24, 2022, 14 Pages.
Office Communication for U.S. Appl. No. 17/484,167 mailed Mar. 11, 2022, 11 Pages.
Office Communication for U.S. Appl. No. 17/062,500 mailed Mar. 22, 2022, 19 Pages.
Office Communication for U.S. Appl. No. 16/152,277 mailed Oct. 18, 2021, 5 Pages.
International Search Report and Written Opinion for International Patent Application No. PCT/US2021/023525 mailed Oct. 12, 2021, 6 Pages.
Office Communication for U.S. Appl. No. 17/115,529 mailed Oct. 22, 2021, 20 Pages.
Office Communication for U.S. Appl. No. 17/062,500 mailed Oct. 27, 2021, 17 Pages.
Office Communication for U.S. Appl. No. 14/595,598 mailed Oct. 28, 2021, 6 Pages.
Office Communication for U.S. Appl. No. 16/741,567 mailed Oct. 28, 2021, 11 Pages.
Office Communication for U.S. Appl. No. 17/203,452 mailed Nov. 2, 2021, 13 Pages.
Office Communication for U.S. Appl. No. 17/190,653 mailed Nov. 10, 2021, 6 Pages.
Office Communication for U.S. Appl. No. 17/484,167 mailed Nov. 18, 2021, 15 Pages.
Office Communication for U.S. Appl. No. 17/504,289 mailed Dec. 7, 2021, 15 Pages.
Office Communication for U.S. Appl. No. 17/114,384 mailed Dec. 14, 2021, 7 Pages.
Office Communication for U.S. Appl. No. 16/226,587 mailed Aug. 5, 2019, 46 Pages.
Office Communication for U.S. Appl. No. 16/228,716 mailed Jun. 24, 2019, 10 Pages.
Office Communication for U.S. Appl. No. 16/231,354 mailed Jul. 10, 2019, 8 Pages.
Office Communication for U.S. Appl. No. 16/262,756 mailed Aug. 5, 2019, 35 Pages.
Office Communication for U.S. Appl. No. 15/967,499 mailed Jun. 27, 2018, 16 Pages.
Office Communication for U.S. Appl. No. 16/226,587 mailed Feb. 25, 2019, 43 Pages.
Office Communication for U.S. Appl. No. 16/228,716 mailed Feb. 28, 2019, 15 Pages.
Office Communication for U.S. Appl. No. 16/231,354 mailed Mar. 25, 2019, 10 Pages.
Office Communication for U.S. Appl. No. 16/262,756 mailed Apr. 2, 2019, 29 Pages.
Office Communication for U.S. Appl. No. 16/262,790 maned Aug. 23, 2019, 16 Pages.
Office Communication for U.S. Appl. No. 16/262,790 mailed Apr. 18, 2019, 14 Pages.
Office Communication for U.S. Appl. No. 16/262,756 mailed Oct. 25, 2019, 4 Pages.
Office Communication for U.S. Appl. No. 16/659,488 mailed Dec. 30, 2019, 6 Pages.
Office Communication for U.S. Appl. No. 14/595,598 mailed Dec. 31, 2019, 16 Pages.
Office Communication for U.S. Appl. No. 16/004,208 mailed Aug. 27, 2018, 11 Pages.
Office Communication for U.S. Appl. No. 16/234,395 mailed Aug. 8, 2019, 10 Pages.
Office Communication for U.S. Appl. No. 16/234,334 mailed Apr. 5, 2019, 15 Pages.
Office Communication for U.S. Appl. No. 16/234,395 mailed Mar. 28, 2019, 10 Pages.
Kappes, Giorgos et al., "Dike: Virtualization-awarn Access Control for Multitenant Filesystems", Feb. 18, 2013, pp. 1-6.
HiTZ, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 mailed Jun. 30, 2017, 23 Pages.
Extended European Search Report for European Patent Application No. 18155779.4 mailed Apr. 17, 2018, 15 Pages.
Office Communication for U.S. Appl. No. 16/004,182 mailed Aug. 23, 2018, 43 Pages.
Office Communication for U.S. Appl. No. 16/004,182 mailed Mar. 5, 2019, 46 Pages.
Office Communication for U.S. Appl. No. 16/004,182 mailed Jul. 3, 2019, 45 Pages.
Office Communication for U.S. Appl. No. 15/694,604 mailed Jun. 3, 2019, 8 Pages.
Office Communication for U.S. Appl. No. 16/004,182 mailed May 22, 2019, 4 Pages.

(56) References Cited

OTHER PUBLICATIONS

Office Communication for U.S. Appl. No. 14/595,043 mailed May 4, 2017, 30 Pages.
Office Communication for U.S. Appl. No. 14/595,043 mailed Feb. 23, 2018, 16 Pages.
Office Communication for U.S. Appl. No. 14/595,043 mailed May 25, 2018, 7 Pages.
Office Communication for U.S. Appl. No. 14/595,043 mailed Oct. 5, 2018, 17 Pages.
Office Communication for U.S. Appl. No. 14/595,043 mailed Jun. 7, 2019, 19 Pages.
Office Communication for U.S. Appl. No. 14/595,043 mailed Aug. 27, 2019, 17 Pages.
Office Communication for U.S. Appl. No. 14/658,015 mailed Apr. 27, 2017, 7 Pages.
Office Communication for U.S. Appl. No. 14/658,015 mailed Jan. 4, 2018, 28 Pages.
Office Communication for U.S. Appl. No. 14/658,015 mailed Jul. 13, 2018, 8 Pages.
Office Communication for U.S. Appl. No. 14/859,061 mailed Sep. 22, 2017, 16 Pages.
Office Communication for U.S. Appl. No. 15/831,236 mailed Mar. 30, 2018, 8 Pages.
Office Communication for U.S. Appl. No. 15/831,236 mailed Aug. 15, 2018, 14 Pages.
Office Communication for U.S. Appl. No. 14/859,114 mailed Jul. 24, 2017, 41 Pages.
Office Communication for U.S. Appl. No. 14/859,114 mailed Feb. 21, 2018, 25 Pages.
Office Communication for U.S. Appl. No. 14/859,114 mailed May 11, 2018, 5 Pages.
Office Communication for U.S. Appl. No. 16/883,922 mailed Aug. 7, 2020, 13 Pages.
Office Communication for U.S. Appl. No. 16/775,041 mailed Aug. 18, 2020, 9 Pages.
Office Communication for U.S. Appl. No. 16/883,879 mailed Sep. 1, 2020, 11 Pages.
Extended European Search Report for European Patent Application No. 16812585.4 mailed Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 mailed Jan. 2, 2020, 6 Pages.
International Search Report and Written Opinion for International Patent Application No. PCT/US2016/038242 mailed Oct. 11, 2016, 9 Pages.
Office Communication for U.S. Appl. No. 14/595,598 mailed Jul. 31, 2019, 5 Pages.
Office Communication for U.S. Appl. No. 14/595,598 mailed Sep. 20, 2018, 18 Pages.
Office Communication for U.S. Appl. No. 14/595,598 mailed Dec. 15, 2017, 18 Pages.
Office Communication for U.S. Appl. No. 14/595,598 mailed Feb. 24, 2017, 8 Pages.
Office Communication for U.S. Appl. No. 14/595,598 mailed Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, 7 Pages.
Office Communication for European Patent Application No. 18155779.4 mailed Oct. 8, 2019, 4 Pages.
Office Communication for U.S. Appl. No. 16/152,259 mailed Aug. 28, 2020, 5 Pages.
Office Communication for U.S. Appl. No. 16/752,509 mailed Aug. 11, 2020, 7 Pages.
Office Communication for U.S. Appl. No. 14/595,598 mailed Sep. 25, 2020, 7 Pages.
Office Communication for U.S. Appl. No. 16/152,277 mailed Oct. 16, 2020, 10 Pages.
Office Communication for U.S. Appl. No. 16/152,615 mailed Oct. 20, 2020, 7 Pages.
Office Communication for U.S. Appl. No. 16/775,041 mailed Nov. 3, 2020, 5 Pages.
Office Communication for U.S. Appl. No. 17/062,500 mailed Nov. 12, 2020, 12 Pages.
Office Communication for U.S. Appl. No. 16/004,182 mailed Nov. 30, 2020, 55 Pages.
Office Communication for U.S. Appl. No. 14/859,114 mailed Dec. 1, 2020, 24 Pages.
Office Communication for U.S. Appl. No. 16/883,922 mailed Dec. 2, 2020, 9 Pages.
Office Communication for U.S. Appl. No. 16/883,879 mailed Dec. 8, 2020, 5 Pages.
Office Communication for U.S. Appl. No. 16/152,277 mailed Dec. 28, 2020, 5 Pages.
Office Communication for U.S. Appl. No. 16/004,182 mailed Jan. 28, 2021, 4 Pages.
Office Communication for U.S. Appl. No. 14/595,598 mailed Feb. 4, 2021, 19 Pages.
Office Communication for U.S. Appl. No. 17/115,529 mailed Feb. 8, 2021, 15 Pages.
Office Communication for U.S. Appl. No. 16/262,756 mailed Feb. 10, 2021, 19 Pages.
Office Communication for U.S. Appl. No. 17/114,384 mailed Feb. 17, 2021, 12 Pages.
Office Action for European Patent Application No. 17206518.7 mailed Feb. 23, 2021, 6 Pages.
Office Communication for U.S. Appl. No. 14/859,114 mailed Mar. 8, 2021, 4 Pages.
Office Communication for U.S. Appl. No. 16/004,182 mailed Mar. 8, 2021, 60 Pages.
Office Communication for U.S. Appl. No. 17/062,500 mailed Mar. 9, 2021, 17 Pages.
Office Communication for U.S. Appl. No. 16/152,277 mailed Mar. 18, 2021, 10 Pages.
Office Communication for U.S. Appl. No. 17/160,698 mailed Mar. 18, 2021, 11 Pages.
Office Communication for U.S. Appl. No. 17/062,500 mailed May 18, 2021, 4 Pages.
Office Communication for U.S. Appl. No. 17/203,371 mailed May 20, 2021, 10 Pages.
Office Communication for U.S. Appl. No. 17/115,529 mailed May 25, 2021, 18 Pages.
Office Communication for U.S. Appl. No. 14/859,114 mailed May 26, 2021, 11 Pages.
Office Communication for U.S. Appl. No. 16/262,756 mailed May 27, 2021, 7 Pages.
Office Communication for U.S. Appl. No. 17/114,384 mailed May 27, 2021, 13 Pages.
Office Communication for U.S. Appl. No. 17/190,653 mailed May 27, 2021, 11 Pages.
Office Communication for U.S. Appl. No. 16/741,567 mailed Jun. 8, 2021, 5 Pages.
Office Communication for U.S. Appl. No. 17/203,452 mailed Jun. 23, 2021, 11 Pages.
Office Communication for U.S. Appl. No. 16/152,277 mailed Jun. 25, 2021, 10 Pages.
Office Communication for U.S. Appl. No. 16/004,182 mailed Jul. 1, 2021, 58 Pages.
Office Communication for U.S. Appl. No. 17/160,698 mailed Jul. 2, 2021, 12 Pages.
Office Communication for U.S. Appl. No. 19/048,348 mailed Dec. 31, 2025, 26 Pages.
International Search Report and Written Opinion for International Patent Application No. PCT/US2021/023531 mailed Jul. 6, 2021, 6 Pages.
Office Communication for U.S. Appl. No. 17/062,500 mailed Jul. 12, 2021, 18 Pages.

(56)         References Cited

OTHER PUBLICATIONS

Office Communication for U.S. Appl. No. 16/775,041 mailed Jul. 21, 2021, 11 Pages.

Office Communication for U.S. Appl. No. 17/114,384 mailed Aug. 3, 2021, 4 Pages.

Office Communication for U.S. Appl. No. 14/595,598 mailed Aug. 6, 2021, 20 Pages.

Office Communication for U.S. Appl. No. 17/115,529 mailed Aug. 12, 2021, 4 Pages.

Office Communication for U.S. Appl. No. 17/190,653 mailed Aug. 27, 2021, 11 Pages.

Office Communication for U.S. Appl. No. 17/114,384 mailed Sep. 2, 2021, 5 Pages.

Office Communication for U.S. Appl. No. 16/152,277 mailed Sep. 3, 2021, 4 Pages.

Office Communication for U.S. Appl. No. 16/004,182 mailed Sep. 10, 2021, 4 Pages.

Office Communication for U.S. Appl. No. 16/004,182 mailed Sep. 29, 2021, 11 Pages.

Office Communication for U.S. Appl. No. 17/491,017 mailed Dec. 23, 2021, 41 Pages.

Office Communication for U.S. Appl. No. 17/491,017 mailed May 12, 2022, 50 Pages.

Office Communication for U.S. Appl. No. 17/491,017 mailed Sep. 15, 2022, 55 Pages.

Office Communication for U.S. Appl. No. 17/491,017 mailed Feb. 10, 2023, 55 Pages.

Office Communication for U.S. Appl. No. 17/491,017 mailed Aug. 8, 2023, 13 Pages.

Office Communication for U.S. Appl. No. 14/595,598 mailed May 16, 2019, 18 Pages.

Office Communication for U.S. Appl. No. 16/152,277 mailed Oct. 26, 2021, 2 Pages.

Office Communication for U.S. Appl. No. 16/004,182 mailed Mar. 17, 2022, 3 Pages.

Office Communication for U.S. Appl. No. 16/226,587 mailed Jan. 27, 2020, 13 Pages.

Office Communication for U.S. Appl. No. 16/741,567 mailed Feb. 24, 2022, 2 Pages.

Office Communication for U.S. Appl. No. 16/234,334 mailed Oct. 11, 2019, 16 Pages.

Office Communication for U.S. Appl. No. 16/262,790 mailed Nov. 8, 2019, 5 Pages.

Office Communication for U.S. Appl. No. 17/504,289 mailed Apr. 20, 2022, 2 Pages.

Office Communication for U.S. Appl. No. 16/659,488 mailed May 6, 2020, 8 Pages.

International Preliminary Report on Patentability Chapter I for International Patent Application No. PCT/US2021/023531 mailed Aug. 4, 2022, 5 Pages.

International Preliminary Report on Patentability Chapter I for International Patent Application No. PCT/US2021/023525 mailed Aug. 4, 2022, 5 Pages.

International Preliminary Report on Patentability Chapter I for International Patent Application No. PCT/US2016/038242 mailed Dec. 28, 2017, 8 Pages.

Office Action for European Patent Application No. 17206518.7 mailed Mar. 15, 2022, 5 Pages.

Intention to Grant for European Patent Application No. 17206518.7 mailed Sep. 30, 2022, 6 Pages.

Office Communication for U.S. Appl. No. 17/508,869 mailed Mar. 8, 2022, 2 Pages.

Office Communication for U.S. Appl. No. 17/508,869 mailed Jan. 5, 2022, 3 Pages.

Office Communication for U.S. Appl. No. 17/508,869 mailed Dec. 22, 2021, 9 Pages.

Office Communication for U.S. Appl. No. 17/530,420 mailed May 4, 2022, 3 Pages.

Office Communication for U.S. Appl. No. 17/530,420 mailed May 12, 2022, 3 Pages.

Office Communication for European Patent Application No. 16812585.4 mailed Apr. 1, 2021, 9 pages.

Intention to Grant for European Patent Application No. 18155779.4 mailed Jun. 12, 2020, 10 Pages.

Office Communication for U.S. Appl. No. 17/115,529 mailed Sep. 12, 2023, 25 Pages.

Office Communication for U.S. Appl. No. 17/491,017 mailed May 4, 2023, 6 Pages.

Office Communication for U.S. Appl. No. 17/491,017 mailed Aug. 17, 2022, 5 Pages.

Office Communication for U.S. Appl. No. 17/864,190 mailed Aug. 25, 2023, 12 Pages.

Office Communication for U.S. Appl. No. 18/070,705 mailed Sep. 7, 2023, 5 Pages.

Office Communication for European Patent Application No. 18155779.4 mailed Apr. 17, 2018, 4 Pages.

Office Communication for U.S. Appl. No. 17/864,190 mailed Nov. 17, 2023, 12 Pages.

Office Communication for U.S. Appl. No. 17/115,529 mailed Dec. 13, 2023, 4 Pages.

Office Communication for U.S. Appl. No. 17/115,529 mailed Jan. 12, 2024, 26 Pages.

Office Communication for U.S. Appl. No. 18/503,791 mailed Jan. 4, 2024, 27 Pages.

Office Communication for U.S. Appl. No. 17/864,190 mailed Feb. 8, 2024, 5 Pages.

Office Communication for U.S. Appl. No. 18/503,918 mailed Jan. 24, 2024, 12 Pages.

Office Communication for U.S. Appl. No. 18/503,918 mailed Jan. 31, 2024, 8 Pages.

Office Communication for U.S. Appl. No. 14/859,114 mailed Jun. 27, 2018, 33 pages.

Office Communication for U.S. Appl. No. 14/859,114 mailed Nov. 19, 2018, 35 Pages.

Office Communication for U.S. Appl. No. 14/859,114 mailed Jan. 31, 2019, 4 Pages.

Office Communication for U.S. Appl. No. 14/859,114 mailed Mar. 7, 2019, 32 Pages.

Office Communication for U.S. Appl. No. 14/859,114 mailed Jun. 26, 2019, 21 Pages.

Office Communication for U.S. Appl. No. 14/859,114 mailed Sep. 13, 2019, 6 Pages.

Office Communication for U.S. Appl. No. 14/859,114 mailed Nov. 26, 2019, 21 Pages.

Office Communication for U.S. Appl. No. 15/288,853 mailed Sep. 19, 2018, 13 pages.

Chimera, Richard, "Value Bars: An Information Visualization and Navigation Tool for Multi-attribute Listings", CHI '92, Monterey, CA, May 3-7, 1992, pp. 293-294.

Office Communication for U.S. Appl. No. 15/288,853 mailed Mar. 25, 2019, 25 Pages.

Cudre-Mauroux, Philippe et aL, "TrajStore An Adaptive Storage System for Very Lar ie Trajecto1y Sets", ICDE 2010, Long Beach, CA, Mar. 1-6, 2010, pp. 109-120.

Office Communication for U.S. Appl. No. 16/436,825 mailed Jul. 11, 2019, 9 Pages.

Office Communication for U.S. Appl. No. 15/474,047 mailed Sep. 18, 2017, 14 Pages.

Office Communication for U.S. Appl. No. 15/474,047 mailed Mar. 9, 2018, 8 Pages.

Office Communication for U.S. Appl. No. 15/474,047 mailed Jun. 11, 2018, 6 Pages.

Office Communication for U.S. Appl. No. 15/474,047 mailed Aug. 15, 2018, 11 Pages.

Office Communication for U.S. Appl. No. 15/957,809 mailed Jun. 28, 2018, 27 Pages.

Office Communication for U.S. Appl. No. 15/957,809 mailed Jan. 24, 2019, 11 Pages.

Office Communication for U.S. Appl. No. 16/434,157 mailed Jul. 25, 2019, 8 Pages.

Office Communication for U.S. Appl. No. 15/854,447 mailed May 6, 2019, 9 pages.

(56) References Cited

OTHER PUBLICATIONS

Office Communication for U.S. Appl. No. 16/505,562 mailed Aug. 30, 2019, 11 Pages.

Extended European Search Report for European Patent Application No. 17206518.7 mailed Apr. 5, 2018, 8 Pages.

Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.

Office Communication for U.S. Appl. No. 16/004,182 mailed Jan. 7, 2020, 46 Pages.

Office Communication for U.S. Appl. No. 16/125,573 mailed Nov. 21, 2019, 13 Pages.

Office Communication for U.S. Appl. No. 16/226,587 mailed Oct. 24, 2019, 4 Pages.

Office Communication for U.S. Appl. No. 16/262,790 mailed Dec. 12, 2019, 10 Pages.

Office Communication for U.S. Appl. No. 16/234,334 mailed Jan. 16, 2020, 8 Pages.

Office Communication for U.S. Appl. No. 15/694,604 mailed Nov. 20, 2019, 8 Pages.

Office Communication for U.S. Appl. No. 16/262,756 mailed Jan. 28, 2020, 21 Pages.

Office Communication for U.S. Appl. No. 16/434,157 mailed Jan. 29, 2020, 9 Pages.

Office Communication for U.S. Appl. No. 16/262,790 mailed Feb. 6, 2020, 8 Pages.

Office Communication for U.S. Appl. No. 14/859,114 mailed Mar. 13, 2020, 21 Pages.

Office Communication for U.S. Appl. No. 16/752,451 mailed Mar. 12, 2020, 14 Pages.

Office Communication for U.S. Appl. No. 16/775,041 mailed Mar. 11, 2020, 8 pages.

Office Communication for U.S. Appl. No. 16/779,362 mailed Mar. 26, 2020, 10 Pages.

Wikipedia clustered file system page from elate Jul. 9, 2019, retrieved using the WayBackMachine, From https//web.archive.org/web/20190709083400/tlttps://en.wikipedia.org/wiki/Clustered_file_system (Year: 2019), pp. 1-6.

Wikipedia raft page from date Jul. 16, 2019, retrieved using the WayBackMachine, from tlttps://web.archive.org/web/20190716115001/https://en.wikipedia.org/wiki/Raft (computer_science) (Year: 2019), pp. 1-4.

Office Communication for U.S. Appl. No. 16/004,182 mailed Mar. 23, 2020, 4 Pages.

Office Communication for U.S. Appl. No. 16/752,509 mailed Apr. 2, 2020, 8 Pages.

Office Communication for U.S. Appl. No. 16/152,277 mailed Apr. 3, 2020, 10 Pages.

Office Communication for U.S. Appl. No. 16/004,182 mailed Apr. 28, 2020, 51 Pages.

Office Communication for U.S. Appl. No. 16/152,259 mailed Apr. 29, 2020, 19 Pages.

Office Communication for U.S. Appl. No. 14/859,114 mailed Jun. 5, 2020, 5 Pages.

Office Communication for U.S. Appl. No. 16/262,756 mailed Jun. 8, 2020, 22 Pages.

Office Communication for U.S. Appl. No. 14/595,598 mailed Jul. 9, 2020, 19 Pages.

Office Communication for U.S. Appl. No. 16/752,451 mailed Jul. 23, 2020, 8 Pages.

Office Communication for U.S. Appl. No. 14/859,114 mailed Jul. 23, 2020, 21 Pages.

Office Communication for U.S. Appl. No. 16/152,615 mailed Aug. 6, 2020, 7 Pages.

Office Communication for U.S. Appl. No. 16/779,362 mailed Aug. 7, 2020, 11 Pages.

* cited by examiner

700

706          704

702

712 →

708

714 →

708

710

718

Read Cache
Index

716

Object Store
Index

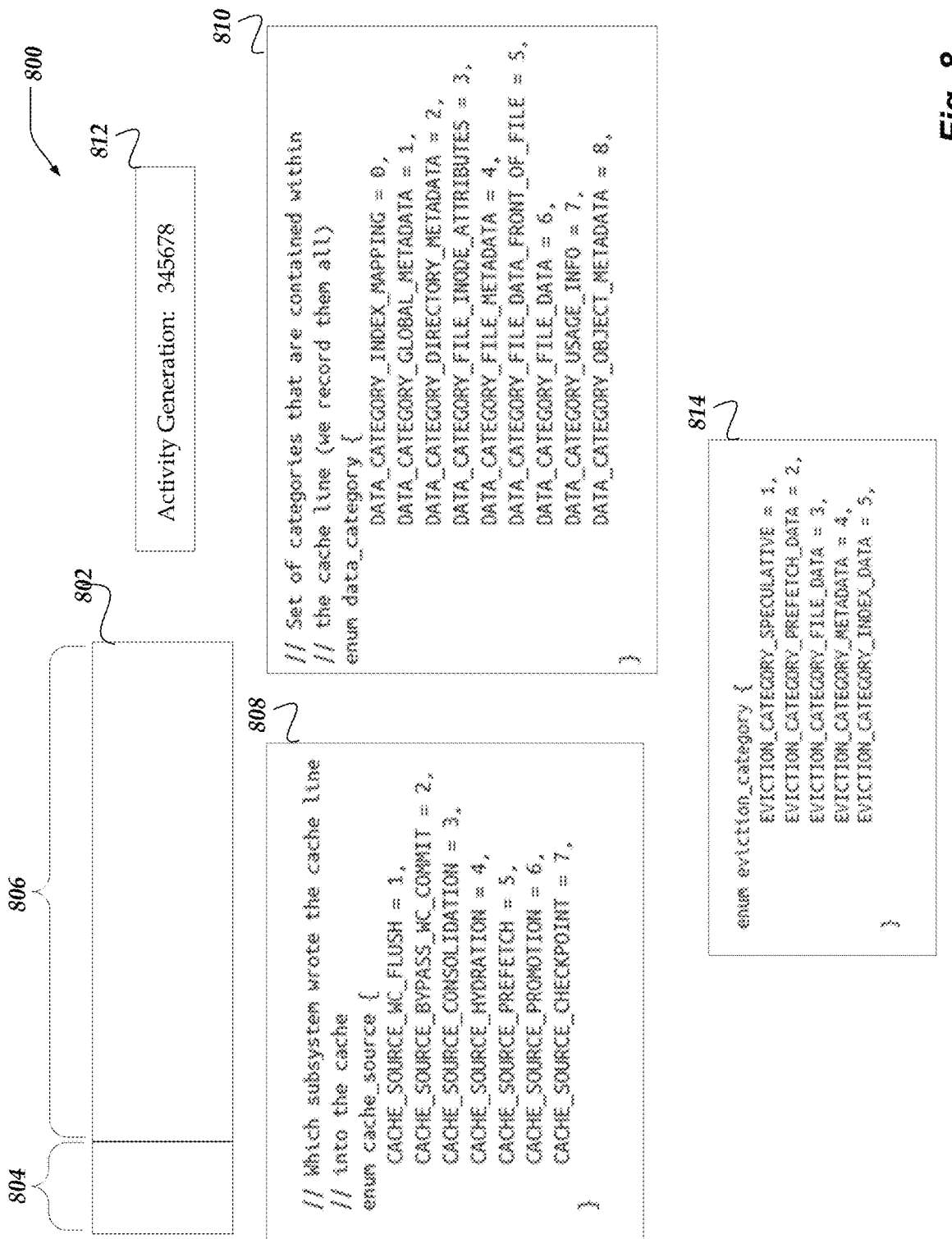

*Fig. 8*

```
// Set of categories that are contained within
// the cache line (we record them all)
enum data_category {
    DATA_CATEGORY_INDEX_MAPPING = 0,
    DATA_CATEGORY_GLOBAL_METADATA = 1,
    DATA_CATEGORY_DIRECTORY_METADATA = 2,
    DATA_CATEGORY_FILE_INODE_ATTRIBUTES = 3,
    DATA_CATEGORY_FILE_METADATA = 4,
    DATA_CATEGORY_FILE_DATA_FRONT_OF_FILE = 5,
    DATA_CATEGORY_FILE_DATA = 6,
    DATA_CATEGORY_USAGE_INFO = 7,
    DATA_CATEGORY_OBJECT_METADATA = 8,
}
```

```
// Which subsystem wrote the cache line
// into the cache
enum cache_source {
    CACHE_SOURCE_WC_FLUSH = 1,
    CACHE_SOURCE_BYPASS_WC_COMMIT = 2,
    CACHE_SOURCE_CONSOLIDATION = 3,
    CACHE_SOURCE_HYDRATION = 4,
    CACHE_SOURCE_PREFETCH = 5,
    CACHE_SOURCE_PROMOTION = 6,
    CACHE_SOURCE_CHECKPOINT = 7,
}
```

```
enum eviction_category {
    EVICTION_CATEGORY_SPECULATIVE = 1,
    EVICTION_CATEGORY_PREFETCH_DATA = 2,
    EVICTION_CATEGORY_FILE_DATA = 3,
    EVICTION_CATEGORY_METADATA = 4,
    EVICTION_CATEGORY_INDEX_DATA = 5,
}
```

Activity Generation: 345678

900

902

| Data Category | Eviction Threshold |
|---|---|
| Index Mapping | 10 |
| Global Metadata | 10 |
| ... | [..] |
| File Data | 40 |
| Object Metadata | 20 |
| ... | [...] |

904 →     906 →

908 →
910 →
912 →
914 →

CACHING FOR OBJECT STORES

TECHNICAL FIELD

The present invention relates generally to file systems, and more particularly, but not exclusively, to caching for object stores.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth. Further, often contemporary distributed file systems may be implemented in various cloud computing environments. In some cases, cloud computing environments provided by different cloud computing providers may require specialized handling adapted to particular features or characteristics of a given cloud computing environment. Failure to adapt file system operations to particular cloud computing environment characteristics may result in disadvantageous cost or performance impacts. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a logical schematic of a system for caching for object stores in accordance with one or more of the various embodiments;

DETAILED DESCRIPTION OF VARIOUS EMBODIMENTS

Figure 1:
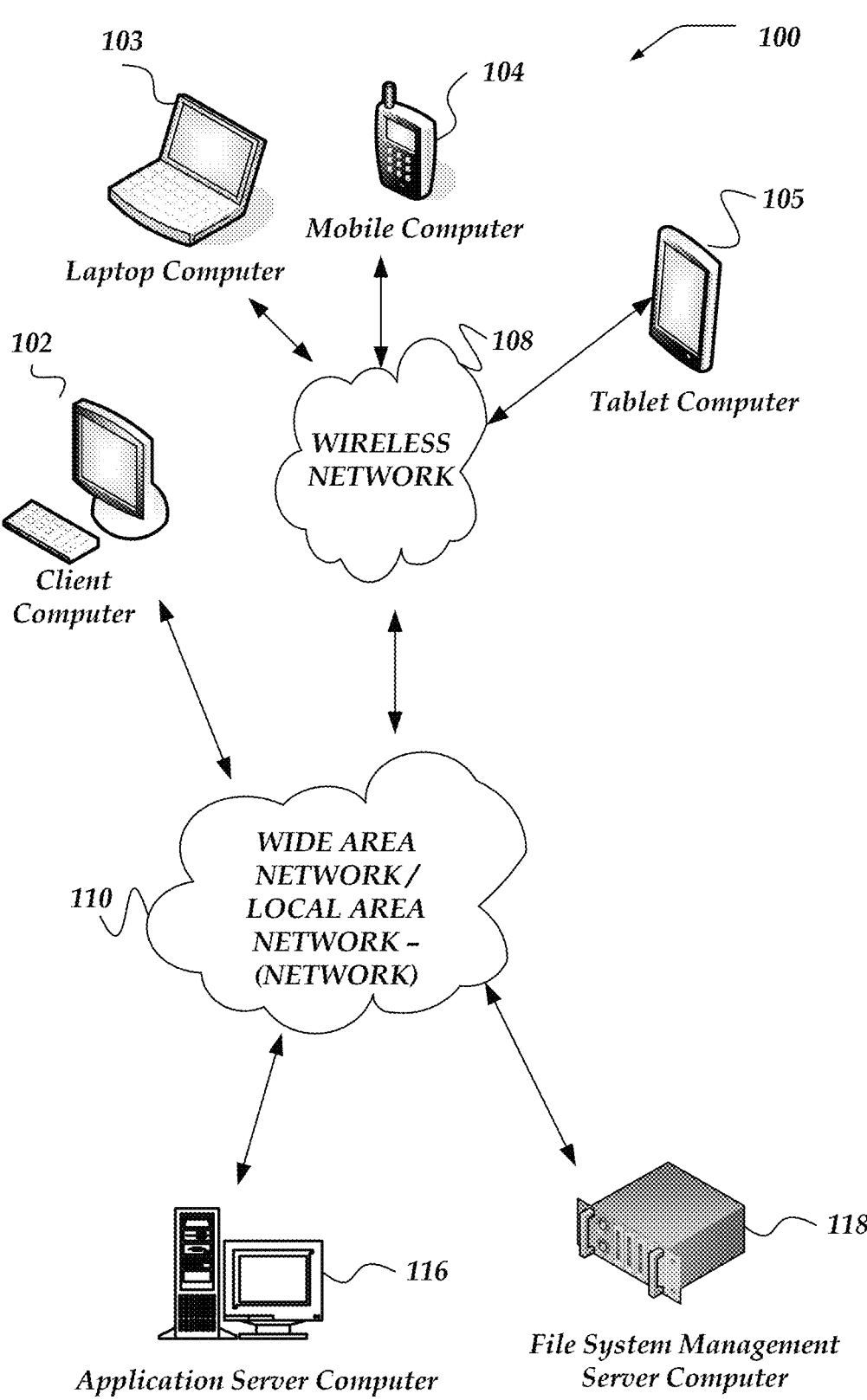
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," "file system block," refer to the portions of data used to store data in a file system. For example, small sized items such as, directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or meta-data for the item.

As used herein the terms "write-ahead log,", or "WAL" refer to data structures for providing persistent records to support atomicity and durability in file systems, databases, or other data stores. Typically, a file system action may be considered "persisted" if the information or actions associated with the actions are recorded to persistent storage in a corresponding WAL. In some cases, WALs may be configured to record meta-data associated with file system actions rather than storing the payload data in the WAL. In general, organization/operational policies may determine which file system actions or which data is recorded in a given WAL.

As used herein the terms "write-ahead log block," or "WAL block" refer to data structures that represent a portion of a write-ahead log. Write-ahead log blocks may include meta-data that links them to subsequent blocks that comprise the write-ahead log. Write-ahead log blocks may include meta-data for managing the write-ahead log or other file system accounting/administration. Also, write-ahead log blocks may include or reference a list of transactions and associated data blocks if any.

As used herein the term "block storage" refers to storage device or storage system that stores or manages data using data block-level protocols that enable data to be accessed referenced in terms of fixed size portions. Block storage typically supports random access and often may provide a (in some cases modifiable) fixed capacity. Cloud computing providers may provide one or more block storage services for managing data in a cloud computing environment.

As used herein the term "object store" refers to a storage system that stores or manages data using objects. Objects may be individually sized based on the amount of data they are holding. In most cases, objects in object stores may be considered immutable such that updating a portion of the data included in an object may require the entire object to be replaced in the object store.

As used herein the term "WAL entry" refers to a data structure that includes modifications to one or more file system data blocks, where the modifications may be write, overwrite, delete, or the like.

As used herein the term "WAL object" refers to an object that includes one or more WAL entries. WAL objects may be stored in object stores using object identifiers that distinguish them from other types of objects. A WAL object may not contain any file system data if all the modifications in the WAL entries included are deletes and other non-data modifying operations.

As used herein the term "data object" refers to an object that is a WAL object that contains file system data but no longer has an associated WAL block due to a successful checkpoint. Data objects may be stored in object stores using object identifiers that distinguish them from other types of objects.

As used herein the term "index object" refers to an object that includes index entries that map data block addresses to data objects in the object store. Index objects may be stored in object stores using object identifiers that distinguish them from other types of objects.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to caching for object stores. In one or more of the various embodiments, a read request to collect data from the file system for a client of the file system may be obtained such that the file system includes a write cache, a read cache, an object store, or the like.

In one or more of the various embodiments, a file system address associated with the read request may be used to perform further actions, including: collecting one or more cache lines in the read cache based on the file system address and a read cache index such that each cache line includes a fixed-size slice of content from an object in the object store and cache line metadata comprising one or more cache line qualities; collecting one or more portions of the data for the read request from the one or more cache lines; or the like.

In one or more of the various embodiments, one or more other portions of the data that are unavailable in the read cache may be used to perform further actions, including: collecting one or more fixed size slices of content that include the one or more other portions of the data from one or more objects in the object store based on the read request; obtaining one or more new cache lines based on the one or more fixed size slices of content, wherein the one or more new cache lines are stored in the read cache; collecting a response to the read request based on one or more portions of the data and the one or more other portions of the data, wherein the response is communicated to the client; or the like.

In one or more of the various embodiments, a user interface that includes one or more display panels for content that includes a cache performance metrics and other information associated with the file system may be obtained such that the content may be dynamically transformed and arranged for display to a user based on user interaction telemetry, user feedback and telemetry metrics.

In one or more of the various embodiments, an activity generation value for the one or more cache lines and the one or more new cache lines may be updated based on a current activity generation such that the activity generation value may be employed to sequence cache line eviction from the read cache.

In one or more of the various embodiments, one or more additional portions of the data that are in the write cache may be collected based on the read request. In some embodiments, the one or more additional portions of the data may be included in the response.

In one or more of the various embodiments, a read cache eviction trigger associated with the read cache may be used to perform additional actions, including: obtaining an eviction category for each cache line in the read cache based on the one or more cache qualities associated with each cache line such that each eviction category is associated with a minimum eviction threshold value; collecting one or more eviction categories that are associated with an amount of content in the read cache that exceeds their associated minimum eviction threshold value; collecting one or more evictable cache lines in the read cache that are associated with the one or more eviction categories such that the one or more evictable cache lines are sorted in ascending order based on their associated activity generation value; iteratively evicting the one or more evictable cache lines in the ascending order until the amount of content in the read cache associated with each eviction category is at or below its associated minimum eviction threshold value; or the like.

In one or more of the various embodiments, a cache promotion operation may be used to perform further actions, including: collecting the one or more other portions of the data that may be unavailable in the read cache based on a cache miss for the read request; identifying one or more target objects in the object store that contain the one or more other portions of the data using an object store index that maps file system addresses to object identifiers and offset locations within the one or more target objects; obtaining the one or more target objects from the object store; collecting the one or more new cache lines by dividing the one or more target objects into the one or more fixed size slices of content that correspond to one or more cache line boundaries; storing the one or more new cache lines in the read cache; or the like.

In one or more of the various embodiments, the one or more cache line qualities may include one or more of a cache source identifier, a data category identifier, or an activity generation value such that the cache source identifier indicates which subsystem stored the cache line into the read cache.

In one or more of the various embodiments, the read cache index may be updated based on one or more of a new cache line added to the read cache, a cache line eviction from the read cache, or a cache line modification such that the read cache index maps file system addresses to cache line locations in the read cache.

In one or more of the various embodiments, a read cache loss event that includes one or more of a loss of ephemeral storage, a disk failure, a system restart, or a cache restoration action that disables or invalidates the current read cache may be used to perform additional actions, including: collecting the read cache index from the file system; collecting one or more restoration cache lines from the object store based on the read cache index; storing the one or more restoration cache lines in the read cache to restore cache functionality such that the one or more restoration cache lines preserve their original cache line qualities and activity generation value; or the like, Illustrated Operating Environment FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
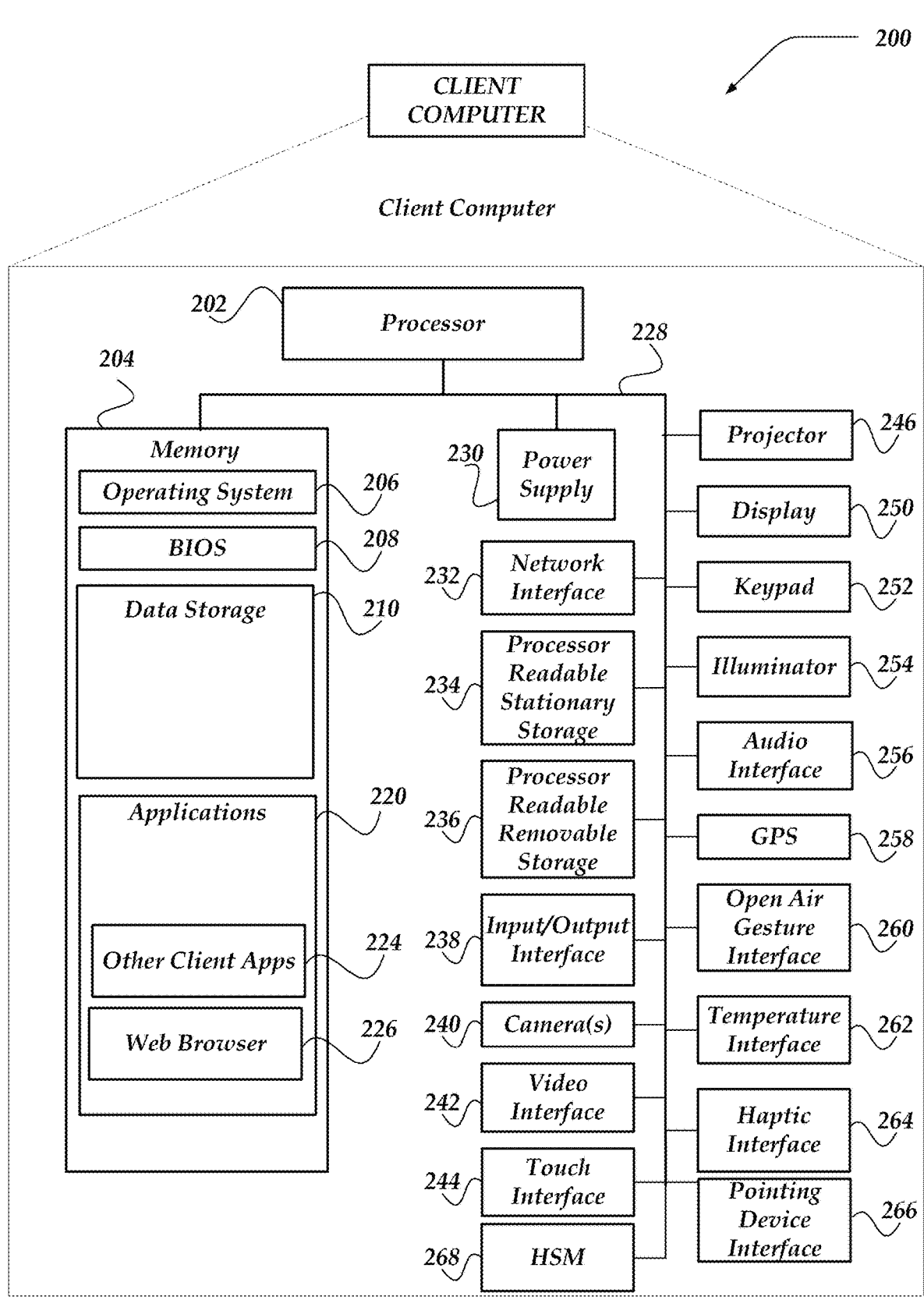
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/ cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer. In some embodiments, processor-readable stationary storage device 234 or processor-readable removable storage device 236 may be considered a processor or computer readable non-transitory storage media that includes instructions configured for obtaining dynamic investigation playbooks in a computing environment such that execution of the instructions by one or more processors on one or more network computers performs actions described herein.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic 16 to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
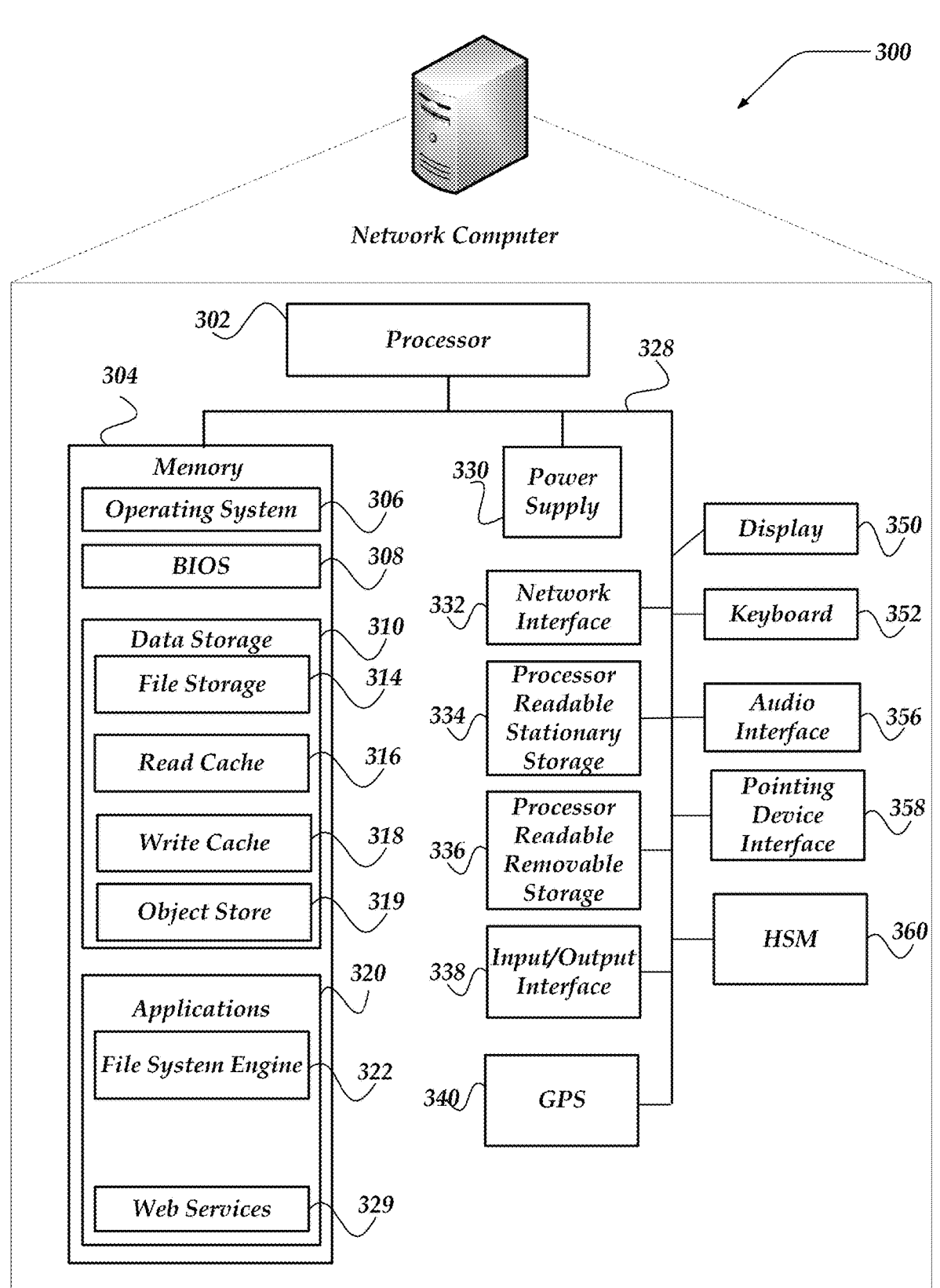
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor readable or computer readable non-transitory storage media that includes instructions configured for obtaining dynamic investigation playbooks in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, read cache 316, write cache 318, object store 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, web services 329, or the like, may be provisioned and de-commissioned automatically.

Also, in one or more of the various embodiments, file system engine 322, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
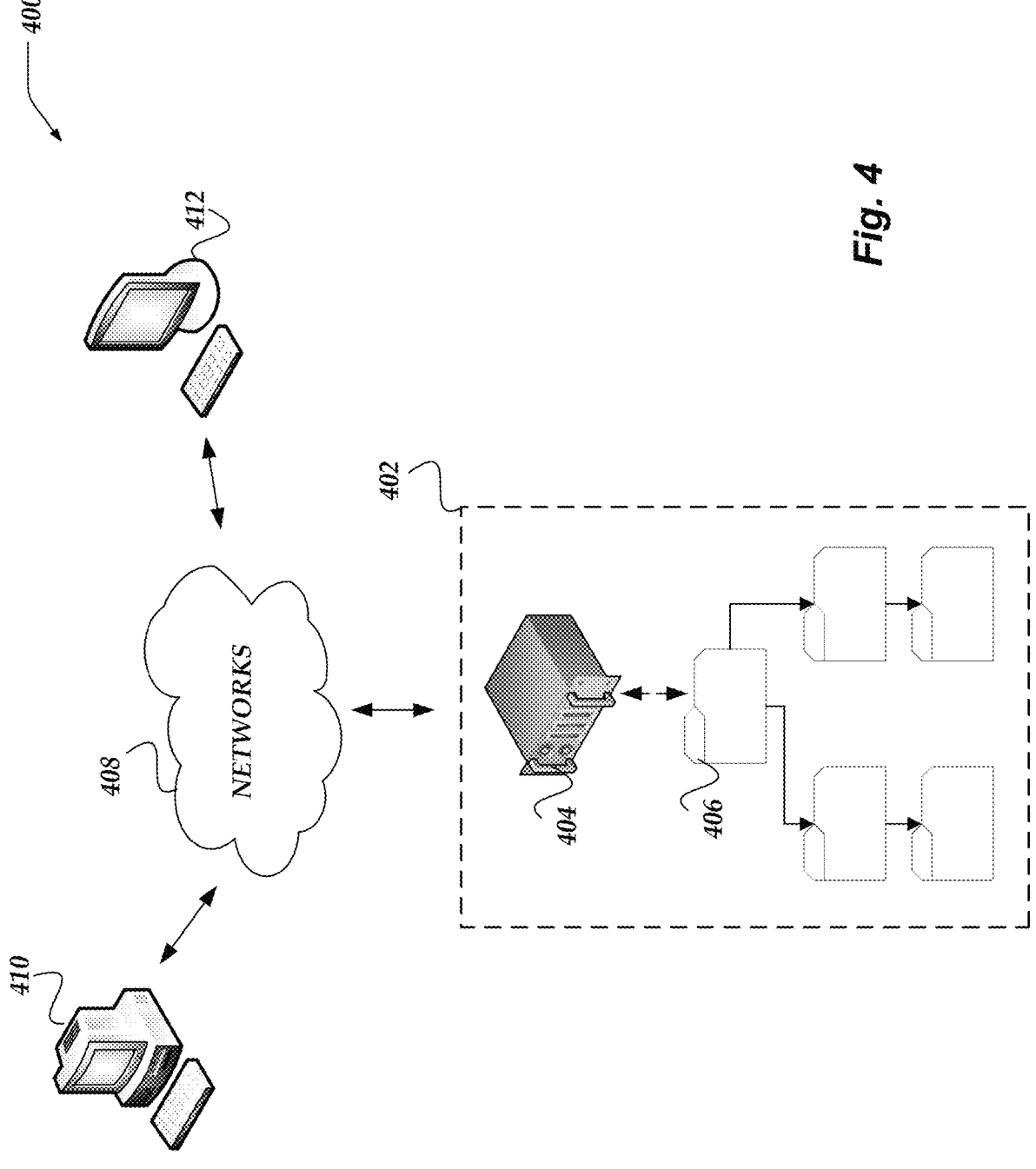
FIG. 4 illustrates a logical architecture of a system for object-based storage with garbage collection and data consolidation in accordance with one or more of the various embodiments.

FIG. 4 illustrates a logical architecture of system 400 for caching for object stores in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, moving, renaming, or deleting data (e.g., files, directories, documents, file system meta-data, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include, files, documents, directories, folders, backups, snapshots, or the like. In some embodiments, some file system items may be comprised of smaller file system items. Accordingly, in some embodiments, blocks or data blocks may be considered to be file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports caching for object stores because file system engines may be arranged to mimic the interface or behavior of one or more conventional file systems.

Also, while file system 402 is illustrated as using one file system management computer with one set of file system items, one of ordinary skill in the art will appreciate that these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, cloud environment geographic regions, storage clusters, or the like.

Figure 5:
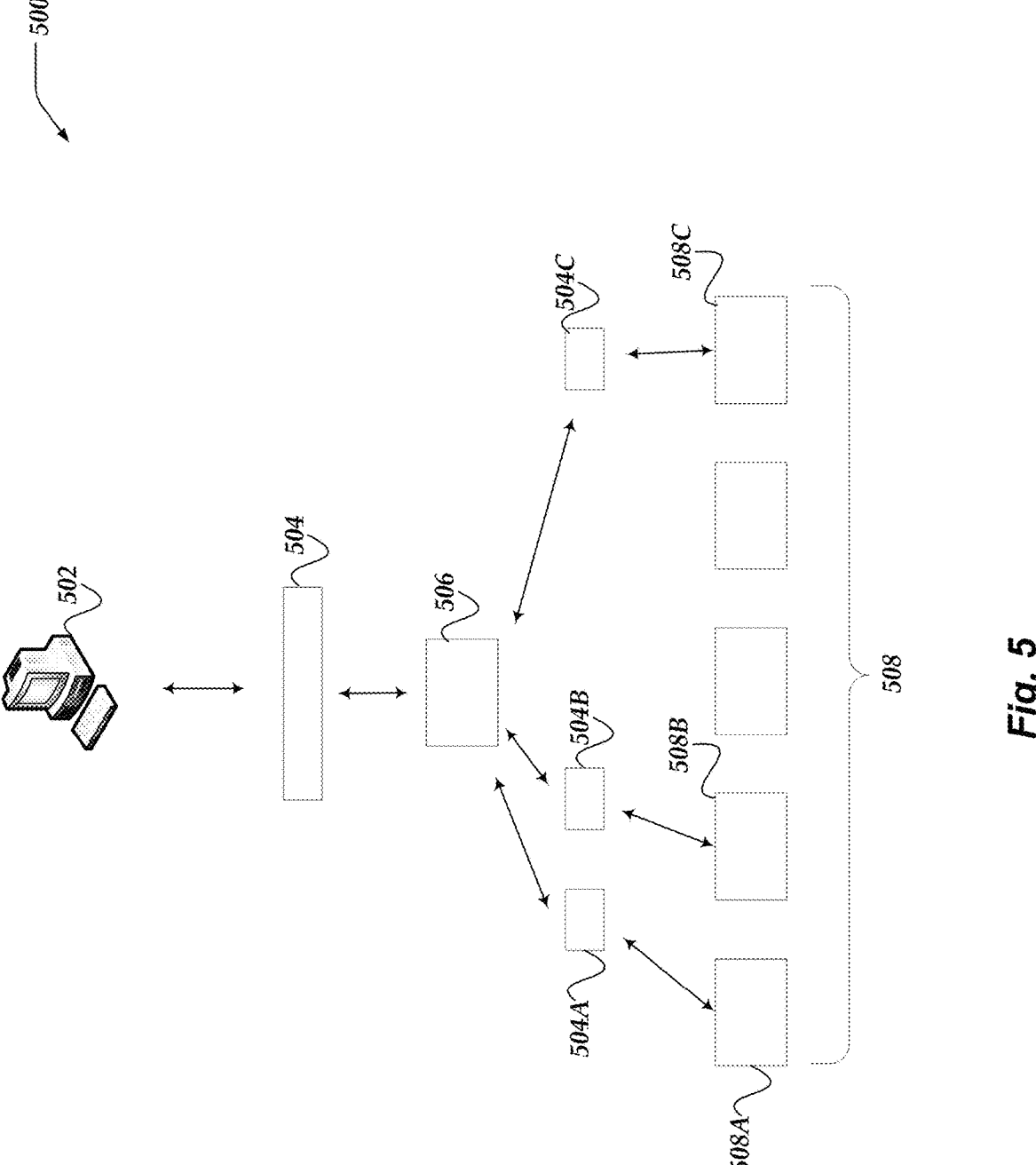
FIG. 5 illustrates a logical schematic of a file system for object-based storage with garbage collection and data consolidation in accordance with one or more of the various embodiments.

FIG. 5 illustrates a logical schematic of file system 500 for caching for object stores in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients, such as file system client 502 may be enabled to issue various file system commands (e.g., read file, remove file, move file, rename file, save file, or the like) to a file system engine that may initiate one or more command transactions. Accordingly, in some embodiments, file system engines may be arranged to determine which portion of the command transaction may be satisfied by which of the various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g, files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various data protection strategies or performance strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request completes successfully, the read transaction may be considered successful and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

Figure 6:
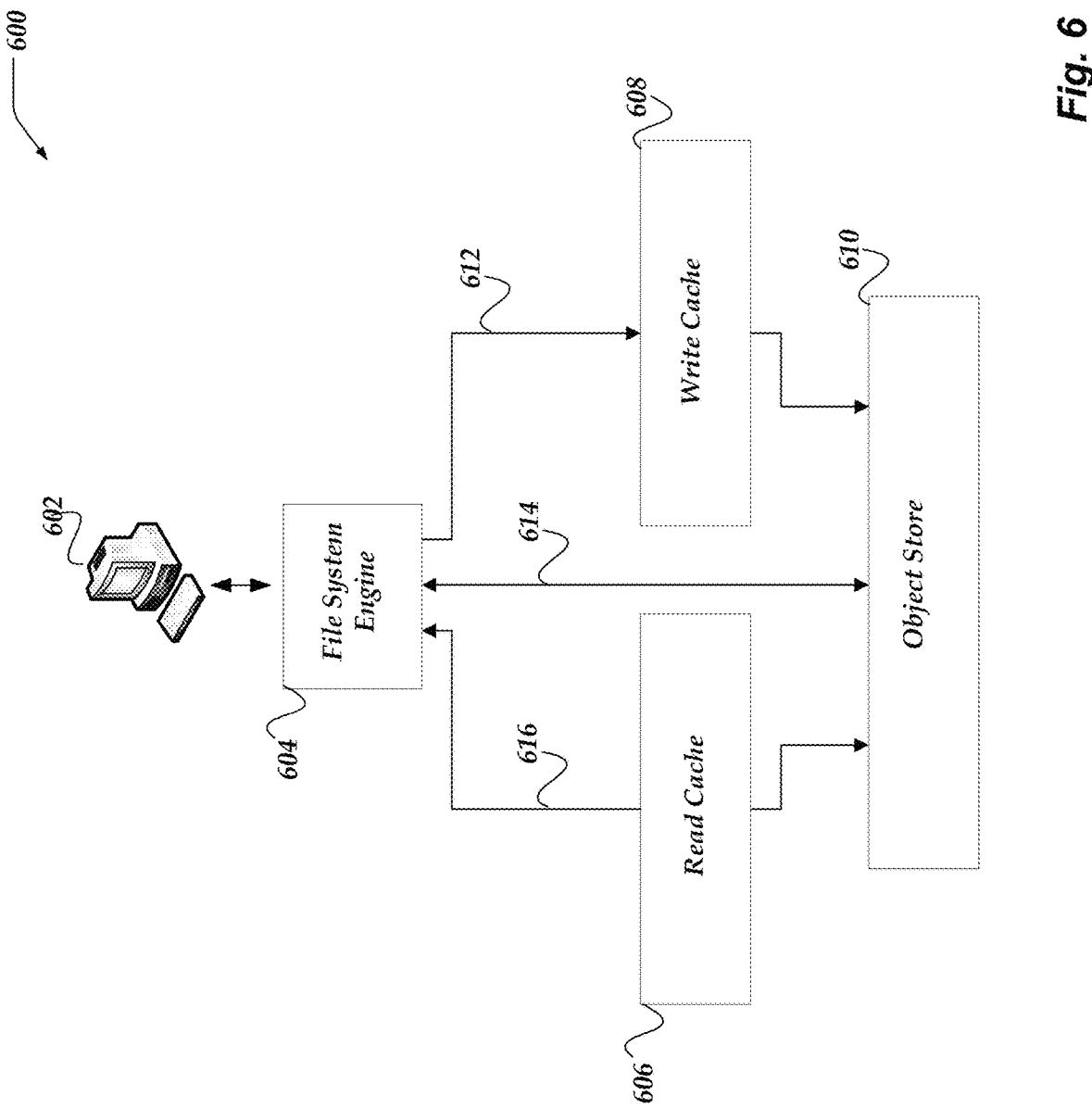
FIG. 6 illustrates a logical schematic of a file system for object-based storage with garbage collection and data consolidation in accordance with one or more of the various embodiments.

FIG. 6 illustrates a logical schematic of file system 600 for caching for object stores in accordance with one or more of the various embodiments. In some embodiments, file systems may be implemented in one or more cloud computing environments. Often, data storage services provided by cloud computing providers may mimic some or all features of conventional disk drives. For example, most cloud computing providers provide features or services, such as block storage services (e.g., block storage) that may be based on or otherwise emulate conventional hard drives.

However, in some embodiments, pricing models, performance considerations, resource/bandwidth limits/quotas, or the like, associated with cloud-based data storage services provided by cloud computing providers may be disadvantageous for naive use of such services. In some cases, latency, access limitations (e.g., IOPS quotas), capacity restrictions, capacity costs, or the like, of native cloud computing storage services may result in unpredictable performance variations, cost increases/fluctuations, reliability concerns, or the like. Accordingly, in some embodiments, file systems may be arranged to compensate for some of the disadvantages of native cloud-based storage as described herein.

In some embodiments, file systems, such as, file system 600 may be arranged to provide storage services by organizing stored data (including meta-data) by providing read caches, such as read 606 and write caches, such as write cache 608 that are coordinated with an underlying object stores, such as object store 610.

In some embodiments, read caches, such as read cache 606 may be arranged to provide low latency read-only operations for data cached in the read cache. In some embodiments, write caches, such as write cache 608 may provide persistent stable storage with some performance limitations or cost considerations. And, in some embodiments, object stores, such as object store 610 may be arranged to provide lower cost long-term storage at the cost of latency or data format mismatches such as providing object based storage rather than block storage. In this context, data format mismatches may be considered to include the semantic or API mismatches between conventional file system operations and object oriented operations.

In some embodiments, read caches, such as read cache 606 may be considered to provide ephemeral storage that may be assumed to become unavailable more or less at the whim of the cloud computing environment. Generally, cloud computing environments may enable ephemeral storage to be associated with compute instances. In some cases, ephemeral storage may enable performant read/write services for the associated compute instances. However, in some cloud computing environments, if compute instances may be moved (within the cloud computing environment) or reset/re-provisioned, ephemeral storage may be automatically irrevocably discarded. Accordingly, ephemeral storage may be considered non-durable storage. Thus, in some embodiments, reliable file systems may employ ephemeral storage for temporary or otherwise non-durable caching. For example, ephemeral storage may be employed for providing read caches of file system data while other tiers (e.g., write caches or object stores) may provide persistent (e.g., recoverable) data storage services.

In some embodiments, write cache, such as, write cache 608 may be considered to be block storage devices that provide persistent storage for compute instances. In some cases, block storage may provide a reserved storage capacity that may generally provide features that may operate similarly to hard disks. In some cases, cloud computing providers may rate limit the number of input/output operations (IOPS) associated with accessing block storage. In some cases, this rate limiting may be independent of the general purpose bandwidth or data transfer services provided within the cloud computing environment. Also, in some cases, cloud computing providers may charge different prices for general purpose bandwidth or data transfer versus the cost for accessing block storage. Accordingly, in some embodiments, file systems may be arranged to intentionally manage the I/O operations directed to block storage devices to reduce or manage costs.

In some embodiments, cloud computing environments may provide object storage services referred to herein as object stores or object storage. In some cases, object stores may be the lowest cost data storage offered by cloud computing providers. However, in some cases, object stores may behave or operate differently than hard disks or their cloud-based analogs (e.g., block storage). For example, object stores may store data in unordered/non-indexed buckets of arbitrarily sized objects while block storage may store data in indexed/ordered blocks of a fixed size. Accordingly, for example, in some cases, a file that consumes 1000 blocks of block storage may be stored in a single object in an object store. Also, while block storage may provide interfaces that easily enable random data access, object stores may provide access to entire objects or object slices rather than arbitrary data from the object store. Further, for example, in some cases, objects in object stores may be immutable such that updating a portion of the data in an object requires the entire object to be replaced rather than just replacing the modified portions of the affected objects within the object store. Also further, for example, object stores may employ cataloging/naming semantics that may be different from indexing/naming semantics used by block storage. For example, data in block storage may be accessed using addresses, address ranges, offsets, or the like, that reference fixed-sized blocks or ranges of fixed-sized blocks while objects typically may be accessed using object names or object identifiers rather than conventional addresses.

Accordingly, in some embodiments, file systems, such as file system 600 may be arranged to leverage the different types of storage facilities offered by cloud computing environments to provide performant, reliable, and consistent storage.

In this example, for some embodiments, client 602 may be considered to be a file system client that may be reading or writing file system items (e.g., documents) in the file system. In some embodiments, file system engines, such as file system engine 604 may be arranged to provide interfaces that enable client 602 to conventionally access the file system absent awareness of the underlying tiered architecture. Accordingly, in some embodiments, file system engines may be arranged to employ read caches, write caches, or object stores in concert to provide performant, reliable, and consistent storage service to one or more clients.

Further, in this example, trace 612, trace 614, or trace 616 represent data flow paths for various requests that may be processed by file system engine 604. Accordingly, for some embodiments, trace 612 represents write requests that may be directed to write cache 608. Likewise, for some embodiments, trace 614 may be considered to represent read or write requests that may be directly services by object store 610 bypassing read cache 606 or write cache 608. Also, for some embodiments, trace 616 may represent response to read requests that may be satisfied by read cache 606. In some embodiments, file system policies or configurations may determine how file system engines determine if requests may implicate read caches, write caches, or object stores.

Also, in some embodiments, file system engines may be assumed to include components, sub-processes, agents, or the like, that perform various administrative or accounting services, such as determining if data should be cached, executing cache eviction policies, executing pre-fetching policies, or the like. However, for brevity or clarity, these different components, sub-processes, agents, or the like are not shown.

Briefly, in some embodiments, file system engines may be arranged to process read requests as follows: in some embodiments, file system engines may be arranged to initially try to satisfy read requests directly from the write cache to obtain the most recent version of the data being requested that may have not yet been flushed out of the write cache; if the read request may not be satisfied from the write cache, file system engines may be arranged to attempt to obtain the remaining data blocks from the read cache. And, for some embodiments, if data may still be needed to satisfy the read request, file system engines may be arranged to obtain those data blocks directly from the object store.

Also, in some embodiments, conventionally objects in object stores may be considered to be immutable such that updating the data in an object may require the entire object to be loaded from the object store, a new object that includes the updates may be generated and stored back into the object store. Accordingly, while this immutability feature may simplify reasoning or management of the stored objects, it may be disadvantageous for naive file system-type operations.

Accordingly, in some embodiments, read caches or write caches may be employed to mitigate some or all of the behavior that may be disadvantageous for using objects as a backing store for file systems.

Also, in some embodiments, data in object store objects may be organized such that meta-data, maps, local indexes, or the like, may be located at the head or beginning of an object with other data (e.g., file data, additional meta-data, or the like) stored further in the object. In some cases, different cloud providers or object stores may have varying or different features, characteristics, pricing models, or the like that may influence the particular object format for a file system. Accordingly, in some embodiments, the particular object format that determines how data may be arranged within an object may vary depending on the characteristics of the underlying object store. Accordingly, in some embodiments, file system engines may be arranged to be adaptable to different data organization formats within objects. For example, for some embodiments, file system engines may be arranged to employ rules, instructions, libraries, plug-ins, or the like for interacting with objects based on configuration information to account for local circumstances or local requirements. Thus, in some embodiments, for brevity or clarity the particular details of object formatting is omitted from this disclosure.

Figure 7:
FIG. 7 illustrates a logical schematic of system 700 for caching for object stores in accordance with one or more of the various embodiments.

FIG. 7 illustrates a logical schematic of system 700 for caching for object stores in accordance with one or more of the various embodiments.

In some embodiments, file system engines may be arranged to store one or more cache lines in the read cache. In some embodiments, cache lines may be fixed size data structures that include data for storing in the read cache. In some embodiments, the particular geometry or size of each cache line may depend on how the objects in the object store may be format or organized. In some embodiments, the particular size of cache lines may be configured based on one or more characteristics of the file system, the object store, the cloud computing environment, the storage providing the read cache, or the like. For example, in some embodiments, cache line size may be selected to be the same the file system data block size, block size of the read cache storage system, or the like, or a multiple thereof. One of ordinary skill in the art will appreciate that particular geometry of a cache line may be selected such that the smallest unit of storage in the cache may be a single aligned and contiguous block within a given object's logical data range.

In this example, for some embodiments, read cache 702 may be associated with object store 704 (write cache is not shown). In this example, for some embodiments, object 706 and object 708 represent objects in object store 704 that may be storing file system data. Also, in this example, object slice 708 and object slice 708 may be considered to represent portions of objects that have been loaded into reach cache 702. Accordingly, for some embodiments, cache line 712 may represent object slice 710 as stored in read cache 702. Similarly, for some embodiments, cache line 714 may represent object slice 708 as stored in read cache 702.

Note, in this example, object slice 708 and object slice 710 are indicated using dashed lines to represent that the object slices remain part of the source objects. Thus, in some embodiments, the data stored in read cache 702 remains (immutably) in object store 704.

In some embodiments, cache lines represent the minimum amount of data read from the object store to populate the read cache. For example, if a read request is asking for 32 bytes that may be stored in object 706 and cache lines are 128 KB, an entire object slice of 128 KB that includes the requested 32 bytes of data may be loaded into the read cache if needed. Note, a detailed description of read cache ingestion or eviction is provided below.

Also, in some embodiments, file system engines may be arranged to maintain an object store index, such as object store index 716 that associates file system addresses to objects and location within the object. Accordingly, in some embodiments, file system engines may be enabled to determine the particular object and the location within the object of the data being requested. In some embodiments, object store indexes may be considered to be full-fledged file system objects such that they benefit from the data protection features of the file system. Accordingly, in some embodiments, the file address to object location may be preserved in the event of node loss, restart, reboot, or the like. Note, this may be considered similar to how other file system meta-data may be protectively preserved in the file system.

In some embodiments, file system engines may be arranged to use object store indexes to determine an object and location/range within the object for a given read address and range (or size of read). Thus, briefly, object store indexes may be updated as objects are created or updated. For the purpose of caching for object stores it may be assumed that given a read address and size or range, the object store index may return an object identifier and a offset position in that object that is storing the data for the read request. Note, managing objects (e.g., generating new objects, consolidating objects, pruning objects, or the like) may be considered to be provided by file system engines separately from caching for object stores.

Similarly, in some embodiments, file system engines may be arranged to generate and maintain read cache indexes that associate file system addresses with cache lines. Accordingly, in some embodiments, file system engines may be arranged to use read cache indexes, such as read cache index 718 to identify which cache line if any may be storing data for a particular file system address. In some embodiments, read cache indexes may be treated as fully protected file system objects that are persisted and protected as are other protected file system data. For example, in some embodiments, if the ephemeral storage used for a read cache may be revoked or otherwise lost, the present state of the read cache may be restored using the read cache index that may be retrieved from the greater file system.

Further, in some embodiments, meta-data associated with cache lines may be stored in the read cache index. This meta-data may include various attributes, such as cache line qualities which may indicate the reason or source for why a cache line may be in the read cache. Also, in some embodiments, cache line qualities may include a data types of the data included in a cache line.

Note, the particular indexing data structures used for object store indexes may vary as long as they enable file system addresses to be mapped to objects and object locations. Likewise, the particular indexing data structures used for read cache indexes may vary as long as they enable file system addresses to be mapped to cache lines in a read cache.

FIG. 8 illustrates a logical schematic of system 800 for caching for object stores in accordance with one or more of the various embodiments. As described above, cache lines may include file system data (the cached data) and meta-data associated with the cache line or the cached data. In this example, for some embodiments, cache line 802 represents a cache line with cache line meta-data 804 and file system data 806. In some embodiments, the file system data corresponds to data stored in particular object at a particular location range within that object.

In some embodiments, cache line meta-data, such as cache line meta-data 804 may include various fields or attributes, such cache line identifiers, as well as various cache line qualities. While, in some embodiments, cache line file system data, such as cache line file system data 806 may include a portion of data copied from an object located in the object store.

In some embodiments, cache line qualities may include tags or fields that store the source or reason for the cache line. In this example, for some embodiments, cache sources 808 represents values for cache line source values. Likewise, for some embodiments, data categories 810 represent the type of data that may be stored in a given cache line. Note, in some embodiments, a cache line may include several different types of file system data. Accordingly, in some embodiments, meta-data for cache lines may include one or more data category values depending on the types of data stored in a particular cache line.

Also, in some embodiments, file system engines may be arranged to associate an activity generation, such as activity generation 812 with each cache line. In some embodiments, file system engines may be arranged to employ activity generations to sort eviction ordering for cache lines that may be eligible for eviction. In some embodiments, activity generations may be monotonically increasing values that may be generated as a global file system attribute.

Accordingly, in some embodiments, if a cache line is added to a read cache, it is assigned the current activity generation value. Also, in some embodiments, if data in a cache line is read to respond to a read request, the cache line is reassigned to the current activity generation value. Thus, in some embodiments, activity generation may used for grouping or bucketing cache lines into according to their assigned activity generation as well as for determining establishing least-recently-used ordering for eviction evaluation.

In some embodiments, file system engines may be arranged to be adaptable to changes to cache line meta-data. For example, in some embodiments, more, fewer, or different cache sources may be defined. Likewise, in some embodiments, more, fewer, or different data categories may be defined without departing from the scope of these innovations. Accordingly, in some embodiments, file system engines may be arranged to determine the particular cache line qualities that may be available to the system based on configuration information to account for local circumstance or local requirements.

Figure 9:
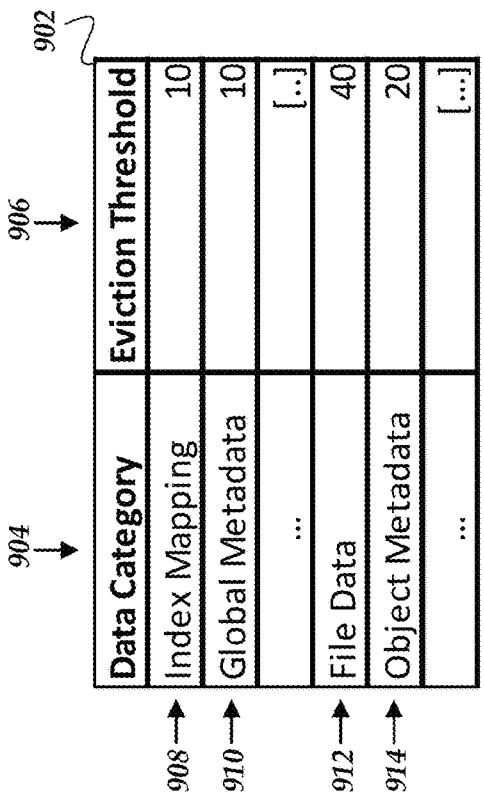
FIG. 9 illustrates a logical schematic for a system for managing eviction thresholds for caching for object stores in accordance with one or more of the various embodiments.

FIG. 9 illustrates a logical schematic for system 900 for managing eviction thresholds for caching for object stores in accordance with one or more of the various embodiments.

As described above, file system engines may be arranged to use cache line qualities that include data categories for managing eviction policies.

In some embodiments, the storage for read caches may be provided by performance storage system or storage components, such as SSD drives, Non-Volatile Memory Express (NVMe) storage, or the like. Typically, storage devices or services used for read caches may be more expensive in exchange for improved performance over other storage options. Accordingly, in some embodiments, the storage capacity of read caches may be scarce as compared to other less expensive options or object stored. Thus, in some embodiments, file system engines may be arranged to intentionally manage the use or allocation of read cache storage.

In some embodiments, if the amount of data of a particular eviction category in a read cache reaches a capacity threshold, file system engines may be arranged to execute eviction operations to clear space in the read cache for pending or subsequent file system operations. Further, in some embodiments, file system engines may be arranged to enforce minimum eviction thresholds for the different eviction categories. In some embodiments, a minimum eviction threshold may be considered the amount of storage space in a read cache that may be guaranteed to be available for a particular eviction category.

In Some Embodiments, minimum eviction threshold may be a guarantee of space rather than a reservation of space. Accordingly, in some embodiments, unused guaranteed space in the read cache may be available for other eviction categories to use as necessary.

In some embodiments, file system engines may be arranged to consider minimum eviction thresholds if determining which cache lines to evict from the read cache.

Accordingly, in some embodiments, if the amount of data of a given eviction category in a read cache exceeds its associated minimum eviction threshold, the data in excess of the minimum threshold value may be eligible for eviction. In some embodiments, if a data of particular eviction category may be evicted, the data eligible for eviction may be the data that exceeds the minimum eviction threshold.

In this example, for some embodiments, table 902 represents a data structure that declares the minimum eviction thresholds for a read cache. Accordingly, in some embodiments, column 904 may represent names or labels of the particular eviction categories. Also, column 906 may represent the minimum eviction threshold. In this example, units of the thresholds is omitted, however, one of ordinary skill in the art will appreciate the that minimum eviction threshold values as well as unit (e.g., kilobytes, megabytes, gigabytes, or the like) may be determined from configuration information.

In some embodiments, tables, such as table 902 may include rows represent the minimum eviction threshold for the various eviction categories that may be eligible for read caching. In this example, for some embodiments, rows may include: row 908 representing the minimum eviction threshold for data associated with an index that maps cache lines to file system addresses or object addresses (e.g., object identifier+offset into the object); row 910 for representing global file system meta-data that may be used to manage to the file system as whole; row 912 representing actual file data; row 912 representing object related meta-data; or the like. Note, in some embodiments, file system engines may determine the particular eviction categories may be based on settings, rules, or instruction provided via configuration information to account for local requirement or local circumstances. Likewise, in this example, for brevity or clarity eviction categories are represented here as being in a table or table-like data structure. However, one of ordinary skill in the art will appreciate that other data structures, such as lists, maps, arrays, structures, or the like may be used for representing eviction categories without departing from the scope of the innovations disclosed herein.

In some embodiments, file system engines may be configured initiate read cache eviction based on one or more criteria. For example, if the overall unused read cache capacity (free space in the cache) falls below a threshold value, file system engines may be configured initiate an eviction job. Also, in some embodiments, file system engines may be arranged to periodically run an eviction job.

In some embodiments, during an eviction job, file system engines may be arranged to determine which eviction categories in the read cache have exceeded their minimum eviction threshold. Accordingly, in some embodiments, file system engines may be arranged to eviction the least recently used cache lines of eviction categories that exceed their minimum eviction threshold. In some embodiments, the eviction may evict the relevant cache lines until the amount data in the read cache may be reduced to the current minimum eviction threshold for the respective eviction categories.

In some embodiments, if the overall free space in the read cache remains above a minimum threshold value, the minimum eviction thresholds for various eviction categories may be exceeded without triggering eviction. For example, if the read cache eviction free space minimum threshold is 100 GB, file system engines may identify one or more cache lines in the read cache for eviction categories that exceed their minimum eviction threshold. For example, if only one eviction category exceeds its minimum eviction threshold, the one or more cache lines associated with that eviction category may be evicted up until the minimum eviction threshold for that eviction category is matched. For example, if the minimum eviction threshold for file data is 40 GB and there is 100 GB of file data in the read cache, the file system engine may evict cache lines such that only 40 GB remains in the read cache. However, in some embodiments, if the overall free space in the read cache does not exceed the overall threshold for the read cache, the amount of file data or other eviction categories may be allowed to exceed their respective minimum eviction threshold.

Accordingly, in some embodiments, the sum of minimum eviction thresholds may exceed the minimum eviction threshold for the overall read cache. However, in some embodiments, as the read cache fills up, if the amount of data in the read cache exceeds the read cache overall minimum eviction threshold, an eviction job may be initiated.

Also, in some embodiments, if an eviction category has unused cache space as indicated by it consuming less space than its minimum eviction threshold, the remaining space may be used by other eviction categories without concern since the eviction process may be triggered if the overall read cache free space drops below a minimum threshold value. For example, if the minimum eviction threshold for Global Metadata is 10 GB and there is only 1 GB Global Metadata in the read cache, the extra/unused 9 GB may be used for other eviction categories.

In some embodiments, file system engines may be configured to have a defined target eviction size such that eviction jobs may be expected to evict a particular amount of data. In some embodiments, the target eviction size may be determined based on the amount of minimum free space that may be desired after an eviction job.

Figure 10:
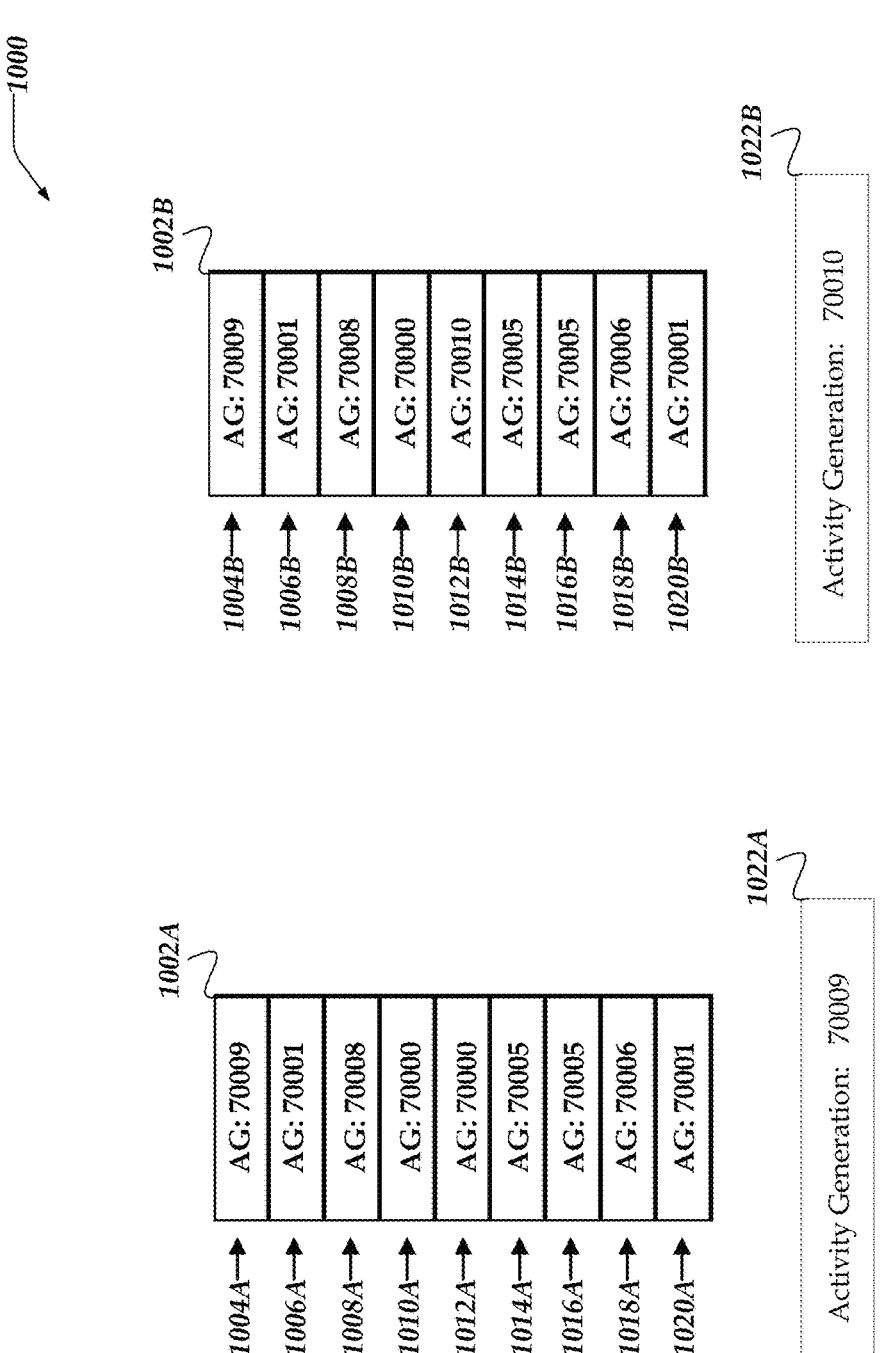
FIG. 10 illustrates a logical schematic of a system that includes activity generations for caching for object stores in accordance with one or more of the various embodiments.

FIG. 10 illustrates a logical schematic of system 1000 that includes activity generations for caching for object stores in accordance with one or more of the various embodiments.

As described above, in some embodiments, file system engines may be arranged to associate activity generations with cache lines in read caches. In some embodiments, activity generations may be managed as a file system global metadata value. Accordingly, in some embodiments, file system engines at individual nodes of a file system may employ a file system command API or interface to obtain the current activity generation.

Accordingly, in some embodiments, if a cache line is loaded into a read cache, it may be assigned the current activity generation value. Likewise, in some embodiments, if a file system engine reads data from cache lines in the read cache to respond to a read request, those cache lines may be assigned the current activity generation value. Accordingly, in some embodiments, the activity generation provides a mechanism for evaluating cache eviction ordering if cache lines may be eligible for eviction.

In this example, for some embodiments, read cache 1002A represents a read cache for a file system node. In this example, for some embodiments, read cache 1002A includes cache lines 1004A-1020A each associated with an activity generation. Also, in this example, activity generation 1022A represents the current activity generation for the file system.

In this example, for some embodiments, cache line 110A and cache line 1012A represent cache lines that have not been read from since activity generation 70000 making them the "coldest" cache lines in read cache 1002A. Similarly, in this example, cache line 1004A is associated with activity generation 70009 making it the newest or most recently accessed cache line in the read cache 1004A.

Likewise, in this example, read cache 1002B represents the same read cache as read cache 1002A with cache lines 1004B-1020B and activity generation 1022B except that the activity generation for the file system has been advanced. Accordingly, in some embodiments, new cache lines or cache lines that have been accessed after activity generation 1022B was established will be assigned activity generation 70010. Accordingly, in this example, cache line 1012B is now assigned activity generation 70010 updated from activity generation 70000. In some embodiments, this represents that cache line 1012B may be a new cache line loaded from the object store or the data has been read from cache line 1012B during activity generation 70010.

Accordingly, in this example, for some embodiments, if cache line 1006B, cache line 1012B, and cache line 1016B were determined to be eligible for eviction, the eviction would occur in the order cache line 1006B, cache line 1016B, and cache line 1012B based on the activity generations associated with these cache lines.

Further, in some embodiments, file system engines may be arranged to associate cache lines with an eviction category. In this example, for some embodiments, eviction categories 814 may represent various eviction categories that cache line may be mapped to based on their associated cache line qualities. In some embodiments, file system engines may be arranged to assign different eviction policies based on eviction categories. Accordingly, in some embodiments, eviction categories provide an additional layer of abstraction for simplifying the determination of which eviction policies to execute for the associated cache lines.

Note, in some embodiments, eviction categories may be omitted such that cache line qualities may be directly evaluated for determining the appropriate eviction policy for a given cache line.

Further, in some embodiments, file system engines may be arranged to be adaptable to the discovery or determination of new or additional cache line qualities. For example, for some embodiments, by experiment or observation it may be determined that it may be advantageous to represent two different types of prefetch activities as different cache line quality values. Accordingly, in some embodiments, file system engines may be arranged to employ rules, instructions, or the like provided via configuration information to define or declare cache line qualities. Likewise, in some embodiments, file system engines may be arranged to employ rules, instructions, maps, or the like provided via configuration information to associated eviction categories with cache lines based on their cache line qualities to account for local circumstance or local requirements.

Figure 11:
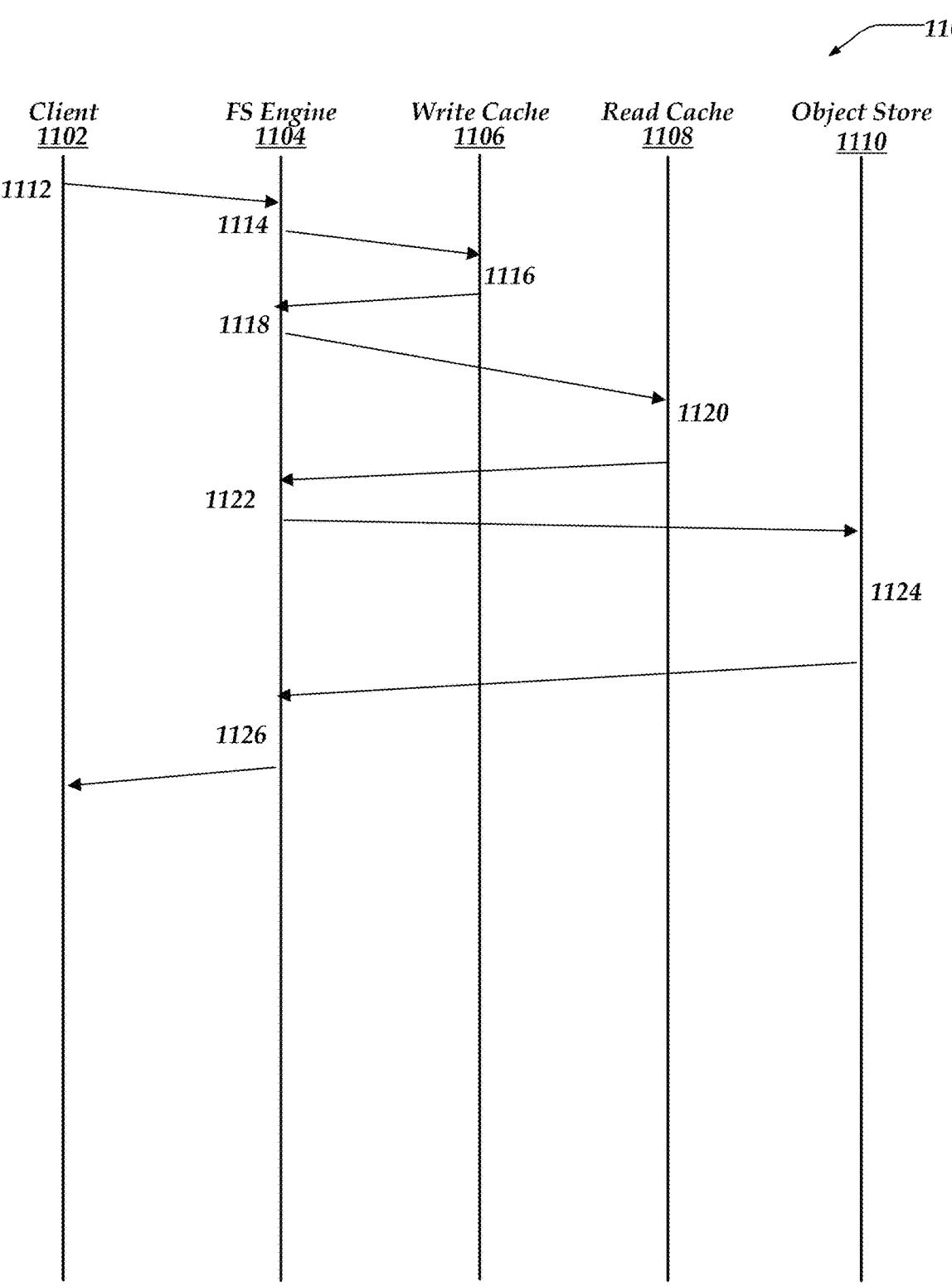
FIG. 11 illustrates logical sequence diagram for a sequence for caching for object stores in accordance with one or more of the various embodiments.

FIG. 11 illustrates a logical sequence diagram for sequence 1100 for caching for object stores in accordance with one or more of the various embodiments.

In this example, for some embodiments, sequence 1100 represents how file system engines may be arranged to handle read requests. Accordingly, in this example, at step 1112, client 1102 may initiate a request to read data from the file system. In some embodiments, a read request may include a file system address and a range or size of the data being requested. In some embodiments, the file system address may correspond to a logical address space of the file system that may be mapped to specific locations within objects stored in object store 1110 using object store indexes maintained by file system engine 1104. In some embodiments, the requested data range may span multiple cache lines if the data is distributed across different portions of one or more objects in the object store.

Accordingly, in some embodiments, file systems may be arranged to collect data for read requests from one or more of the write cache, read cache, or object store for a given file system node. In some embodiments, file system engines may be arranged to prioritize data sources such that write cache 1106 takes precedence over read cache 1108, which in turn takes precedence over object store 1110, to ensure that the most recent version of data is returned to client 1102.

In some embodiments, file system engines may be arranged to employ index objects to convert file system address information to locations in write caches, read caches, or object stores. In some embodiments, these index objects may include read cache indexes that map file system addresses to specific cache lines in read cache 1108, and object store indexes that associate file system addresses with object identifiers and offset positions within objects stored in object store 1110.

At step 1114, in some embodiments, file system engines, such as file system engine 1104 may be arranged to determine if some or all of the read request may be satisfied using data that may in write cache 1106. In some embodiments, write caches may include data that has yet to be flushed to an object store or other permanent/long-term storage. Accordingly, in some embodiments, it may include the most recent version of data. In some embodiments, file system engine 1104 may employ write cache indexes or overlay data structures to rapidly determine if the requested file system address range corresponds to data currently held in write cache 1106, including data that may have been recently modified or added but not yet persisted to object store 1110.

At step 1116, in some embodiments, file system engines may be arranged to collect data from write cache 1106 for responding to the read request. In some embodiments, data collected from write cache 1106 may take precedence because write cache data represents the most current state of modifications that have not yet been committed to the object store.

At step 1118, in some embodiments, if the read request has not been satisfied by the data collected from write cache 1106, file system engines may be arranged to determine if data for the read request may be held in the read cache. In some embodiments, file system engine 1104 may employ read cache indexes to determine if one or more cache lines in read cache 1108 contain data that corresponds to the requested file system address range.

At step 1120, in some embodiments, file system engines may be arranged to collect data for the read request that may be currently in the read cache. In some embodiments, if data may be accessed from cache lines in read cache 1108, file system engine 1104 may update activity generation information associated with those cache lines to reflect their recent use for least-recently-used eviction ordering. In some embodiments, the activity generation may be a monotonically increasing value that is assigned to cache lines when they are created or accessed, enabling file system engines to maintain eviction policies based on recency of use while respecting minimum eviction thresholds for different data categories.

At step 1122, in some embodiments, if the file system engines have not collected all the data for the read request, the file system engines may determine if object store 1110 has data for the read request. In some embodiments, file system engine 1104 may employ object store indexes to identify specific objects and offset locations within those objects that contain the remaining requested data. In some embodiments, the object store indexes may map file system addresses to object identifiers and ranges within immutable objects stored in object store 1110.

At step 1124, in some embodiments, file system engines may be arranged to collect data from the object store for satisfying the read request. In some embodiments, if loading data from object store 1110, file system engine 1104 may load entire one or more object slices corresponding to cache line boundaries and store these slices as new cache lines in read cache 1108 for future use. In some embodiments, file system engines may be configured to load entire objects into cache lines of the read cache if space may be available in the read cache.

At step 1126, in some embodiments, file system engines may be arranged to merge the data from write cache 1106, read cache 1108, and object store 1110 in a response to the read request that may be communicated back to client 1102.

In some embodiments, file system engines may be arranged to merge data for the read request into a single response to be sent back to the client. Note, omitted from consideration here is how file system engines may merge or collect data that may be stored on separate file system nodes or file system clusters. Accordingly, in some embodiments, one of ordinary skill in the art will appreciate that there may be additional processing to merge data that may have been distributed across multiple file system nodes, object store regions, or the like as per a protection scheme or other distributed file system features. For example, the read request as discussed here may be assumed to be for data that is managed by the file system node associated with write cache 1106, read cache 1108, or object store 1110.

Figure 12:
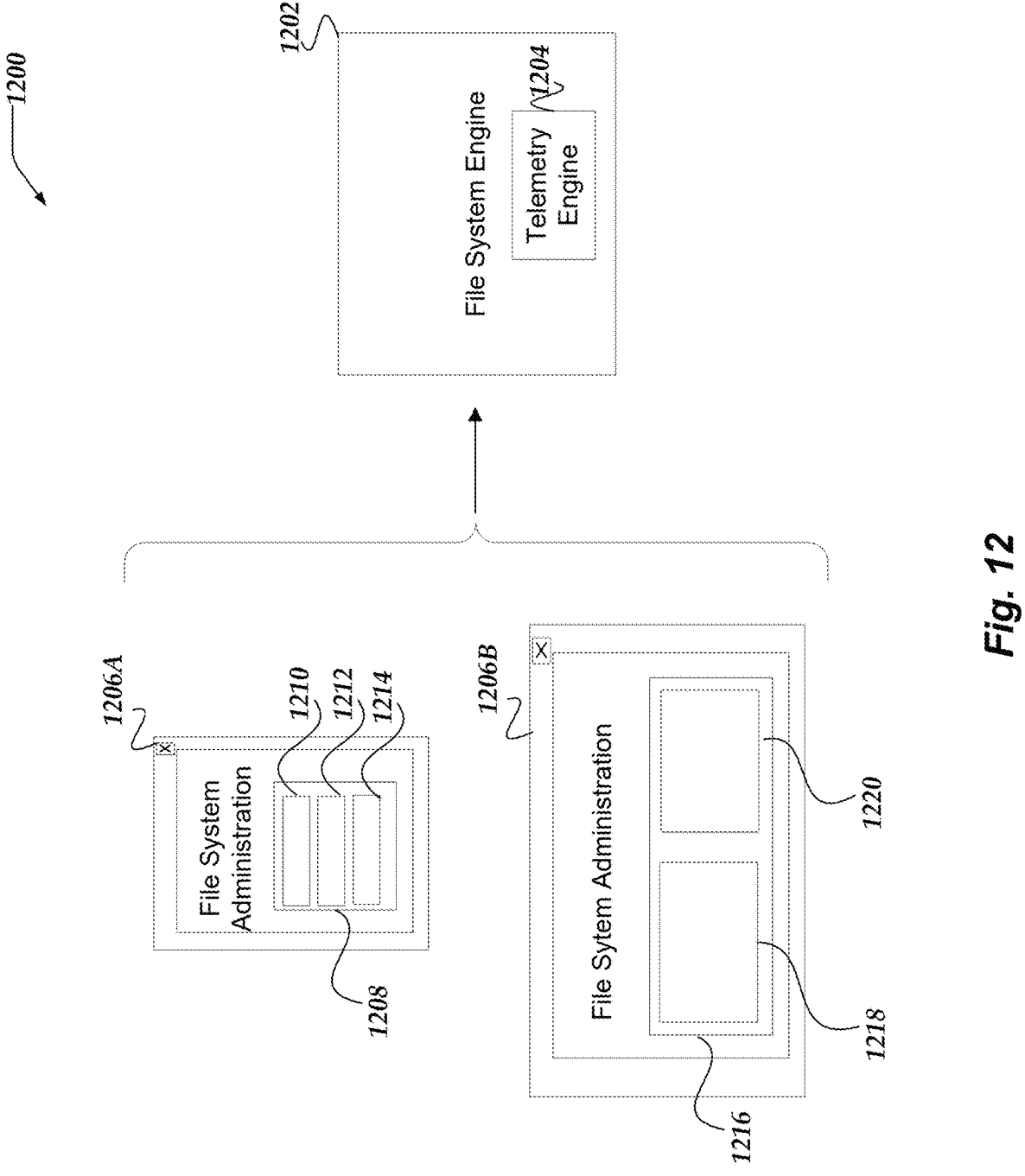
FIG. 12 illustrates a logical schematic of a system for collecting and applying telemetry information and telemetry metrics for file system administration and caching for object stores in accordance with one or more of the various embodiments.

FIG. 12 illustrates a logical schematic of system 1200 for collecting and applying telemetry information and telemetry metrics for file system administration and caching for object stores in accordance with one or more of the various embodiments.

In some embodiments, system 1200 may include various constituents, including: file system engine 1202; telemetry engine 1204; one or more client user interfaces, such as user interface 1206A or user interface 1206B; or the like.

In some embodiments, file system engines, such as file system engine 1202 may be arranged to perform one or more actions to support the operation, organization, management, or execution of caching for object stores and file system administration.

Further, in some embodiments, systems, such as system 1200 may include one or more telemetry engines, such as telemetry engine 1204. In some embodiments, telemetry engines may be arranged to monitor or evaluate interactions with applications or user interfaces such as user interface 1206A, user interface 1206B, or the like. In some embodiments, this may include monitoring how users or even other applications may interact with user interfaces, interactive reports, various applications, or one or more system features related to cache management, object store operations, file system configuration, or the like. Accordingly, in some embodiments, one or more telemetry metrics or user interaction metrics may be employed to adapt or rearranged user interfaces or the like in view of the telemetry metrics or user interaction metrics. In some embodiments, user interface 1206A may represent the presentation or display of a user interface in a first adapted arrangement while user interface 1206B may represent the presentation or display of the same user interface having a second adapted arrangement. For example, in some embodiments, user interface 1206A may be the user interface displayed in portrait mode while user interface 1206B may be considered to be the user interface in landscape mode after a hardware display has been rotated.

In some embodiments, user interfaces, such as user interface 1206A or user interface 1206B may include various windows, controls, or other user interface features. In some embodiments, user interfaces may include various user interface panels, such as panel 1208, panel 1216, or the like. For example, in some embodiments, panel 1208, or the like may represent a user interface that enables users, such as system administrators, to review cache configuration information, object store performance metrics, or perform file system administration displayed in a portrait (vertical) orientation while user interface 1206B may represent file system administration information displayed in a landscape (horizontal) orientation. Further, in some embodiments, element 1210, element 1212, element 1214, element 1218, element 1220, or the like may be considered to represent various user interface elements, controls, buttons, list items, report features, user interface components, displayed content, formatted content, or the like that may be included in user interfaces.

Also, for example, in some embodiments, user interface 1206A or 1206B may be considered a user interface that enables administrative users to work with cache management, object store configuration, file system monitoring, or the like. For example, panel 1208 may be used to select, generate, or modify cache policies, object store settings, file system parameters, provide supplemental configuration data, or the like. For example, display panel 1208 may be used to display quality or effectiveness rankings for one or more cache configurations, object store policies, file system operations, or the like ordered based on inferred importance, performance characteristics, or the like. Likewise, in some embodiments, panels such as panel 1208 may be used to display cache utilization schema information, object store sections, candidate configuration sections, display reports regarding cache performance records or their relevance to pending or previous file system optimization operations, or the like.

In some embodiments, file system engines, such as file system engine 1202 (as well as telemetry engines, or the like) may be arranged to generate or display user interfaces, such as user interface 1206A or user interface 1206B to users using one or more of video interface 242, projector 246, display 250, or the like, of a client computer, such as client computer 200. Similarly, in some embodiments, file system engine 1202 may be arranged to generate or display user interface 1206A, user interface 1206B, or the like to users using a one or more of input/output interface 338, display 350, audio interface 356, or the like, of a network computer, such as network computer 300.

In some embodiments, file system engines, such as file system engine 1202 (as well as telemetry engines, or the like) may be arranged to collect various telemetry or other metrics associated with user interactions with user interfaces. In some embodiments, telemetry may include tracking or monitoring if users may be in agreement with the generated cache configurations, object store policy selection or execution, report arrangement or organization, or the like. In some embodiments, file system engines, or the like may be enabled to employ telemetry information or telemetry metrics collected or determined by telemetry engines, such as telemetry engine 1204. In some embodiments, telemetry engines may be separate from file system engines, or the like as shown in FIG. 12. Also, in some embodiments, telemetry engines may be part of or otherwise embedded in file system engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, or the like.

In one or more of the various embodiments, file system engines, or the like may be arranged to monitor telemetry information associated with one or more users.

Accordingly, in some embodiments, file system engines, or the like may be arranged to provide one or more user interface facilities to collect direct feedback from one or more of the users that may interact with information displayed in the one or more user interfaces. For example, in some embodiments, user interfaces may include controls that enable authorized users to grade one or more cache performance reports, candidate configurations, candidate policy sections, cache profiles, or the like.

In some embodiments, grades or scores may be binary (e.g., like or dislike), discrete (e.g., one-four stars, letter grades), continuous values, or the like.

Also, in one or more of the various embodiments, file system engines, or the like may be arranged to provide user interfaces that monitor how users interact with input information, events, cache performance reports, recommended configuration actions, or the like. In some embodiments, telemetry information employed to monitor user preferences may be based on monitoring user interactions as well as direct feedback. Accordingly, in some embodiments, input information, cache configurations, candidate policy sections, or the like, that may appear well-formed but are ignored or discarded by users may be inferred to be poorly received. For example, in some embodiments, if the top ranked results provided in response to user actions, user queries, or the like, are ignored or lower ranked results are favored by users, it may be inferred that there may be a problem with the data or the display of the data.

Further, in some embodiments, file system engines, or the like may be arranged to receive telemetry information from other services or applications. Accordingly, in one or more of the various embodiments, file system engines, or the like may not be required to directly monitor activity associated with the input information, candidate policy sections, cache configurations, file system performance reports, recommend configuration actions, or the like. For example, in some embodiments, user interfaces, such as user interface 1206A or user interface 1206B may be displayed to users via desktop computer applications, mobile applications, web-based applications, or the like. In some embodiments, such applications may collect the telemetry information or provide some or all it to file system engines, or the like rather than requiring the file system engines, or the like to include monitoring facilities on user-facing applications.

Accordingly, in some embodiments, file system engine 1202, or the like may be arranged to collect metrics or telemetry associated with user interactions with user interface 1206A or user interface 1206B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, file system engine 1202, or the like may be arranged to collect metrics or telemetry associated with user interactions with user interface 1206A, or user interface 1206B using a one or more of input/output interface 338, GPS 340, keyboard 352, audio interface 356, pointing device interface 358, or the like, of a network computer, such as network computer 300.

In some embodiments, file system engines, or the like may be arranged to track mouse movement, eye movement, keystrokes, or the like, to determine how users may interact with information (e.g., input information, events, cache performance reports, candidate policy sections, configuration sections, recommended optimization actions, or the like) displayed in user interfaces. Accordingly, in some embodiments, file system engines, or the like may be arranged to evaluate at least the quality of various cache recommendations, policy section selection, report characteristics, or the like based on how users interact with them via the user interfaces. For example, if users consistently select or otherwise favor interacting with items or candidate policy sections ranked lower than others, it may indicate that one or more models performing the ranking or item selection may be experiencing diminished or diminishing effectiveness. Likewise, in some embodiments, users may reject or ignore report results, suggested actions, configuration section suggestions, optimization conclusions, or the like which may indicate that one or more associated models or systems may be experiencing diminished or diminishing effectiveness.

In some embodiments, file system engines, or the like may be arranged to associate a performance score with user interfaces used in the system based on the user interaction metrics or telemetry. Accordingly, in some embodiments, if the performance score associated with a user interface or user interface element falls below a defined threshold value, file system engines, or the like may be arranged to suspend those user interfaces (or portions thereof) from operation. Or, in some embodiments, file system engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, or the like. The dynamic transformation may include arrangement, re-arrangement, elimination, addition, or adaptation of content or visual elements in user interfaces or display panels based on at least the collected telemetry information.

Additionally, in some embodiments, telemetry engines may collect metrics associated with the one or more user interactions with the system including content within the user interfaces or display panels. In some embodiments, user profiles may be configured to dynamically include user interface preferences based on collected user telemetry metrics or user feedback. Accordingly, in some embodiments, file system engines, or the like may dynamically change the visual appearance of the user interfaces to improve the efficiency or effectiveness of the system or its user interfaces for the user. Accordingly, in some embodiments, file system engines, or the like may be arranged to dynamically select, position, size, shape, remove, hide, inactivate, disable, highlight, or style one or more visual user interface components such as display panels, controls, elements or content based on one or more of user telemetry metrics or user feedback. For example, if user interactions with the user interface are tracked focusing on or navigating to particular user interface views, components or user interface panels, system components, such as file system engines, or the like may be arranged to dynamically highlight or size the preferred user interface elements or display panels. For example, if users are determined to rarely interact with a user interface element, such as element 1214, file system engines, or the like may be arranged to dynamically reduce the size, diminish the shape, disable its controls, or reposition element 1214 by displaying a smaller sized greyed out version of element 1214 in its display panel.

Also, in some embodiments, file system engines, or the like may be arranged to adapt user interfaces based on the size or type of display, input methods, user status, or the like. For example, in some embodiments, if a user is determined to be operating using a mobile device, one or more user interface elements may be dynamically positioned differently. In some cases, in some embodiments, depending on the display type or display size, one or more user interface elements may be hidden from view. For example, in some embodiments, a file system engine may be arranged to dynamically modify or re-arrange user interface 1206A to obtain user interface 1206B based on telemetry associated with the display or associated user interactions. Accordingly, in this example, display panel 1216 may be considered to be dynamically modified or rearranged to accommodate the modified physical orientation of the display. Further, in this example, user interface 1206B now may be considered to display two elements (element 1218 or element 1220) rather than three elements as were displayed in user interface 1206A. Thus, in this example, file system engine 1202 may display two elements for the landscape (horizontal) orientation instead of the three elements displayed in the portrait (vertical) orientation based on one or more telemetry metrics.

Thus, in some embodiments, file system engines, or the like may be arranged to tangibly modify user interfaces, display panels, interactive reports, input collection, input selection, input data representation, configuration sections, cache management interfaces, object store administration tools, or the like, based on the efficient or effective performance of processes or activities associated with various types input information, events, configuration sections, cache policies, file system optimization results, or the like as determined by telemetry information, or the like.
Generalized Operations FIGS. 13-20 represent generalized operations for caching for object stores in accordance with one or more of the various embodiments. In one or more of the various embodiments, processes 1300, 1400, 1500, 1600, 1700, 1800, 1900, and 2000 described in conjunction with FIGS. 13-20 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 13-20 may perform actions for caching for object stores in accordance with at least one of the various embodiments or architectures such as those described in conjunction with FIGS. 1-12. Further, in one or more of the various embodiments, some or all of the actions performed by processes 1300, 1400, 1500, 1600, 1700, 1800, 1900, and 2000 may be executed in part by one or more of file system engine 322, or the like.

Figure 13:
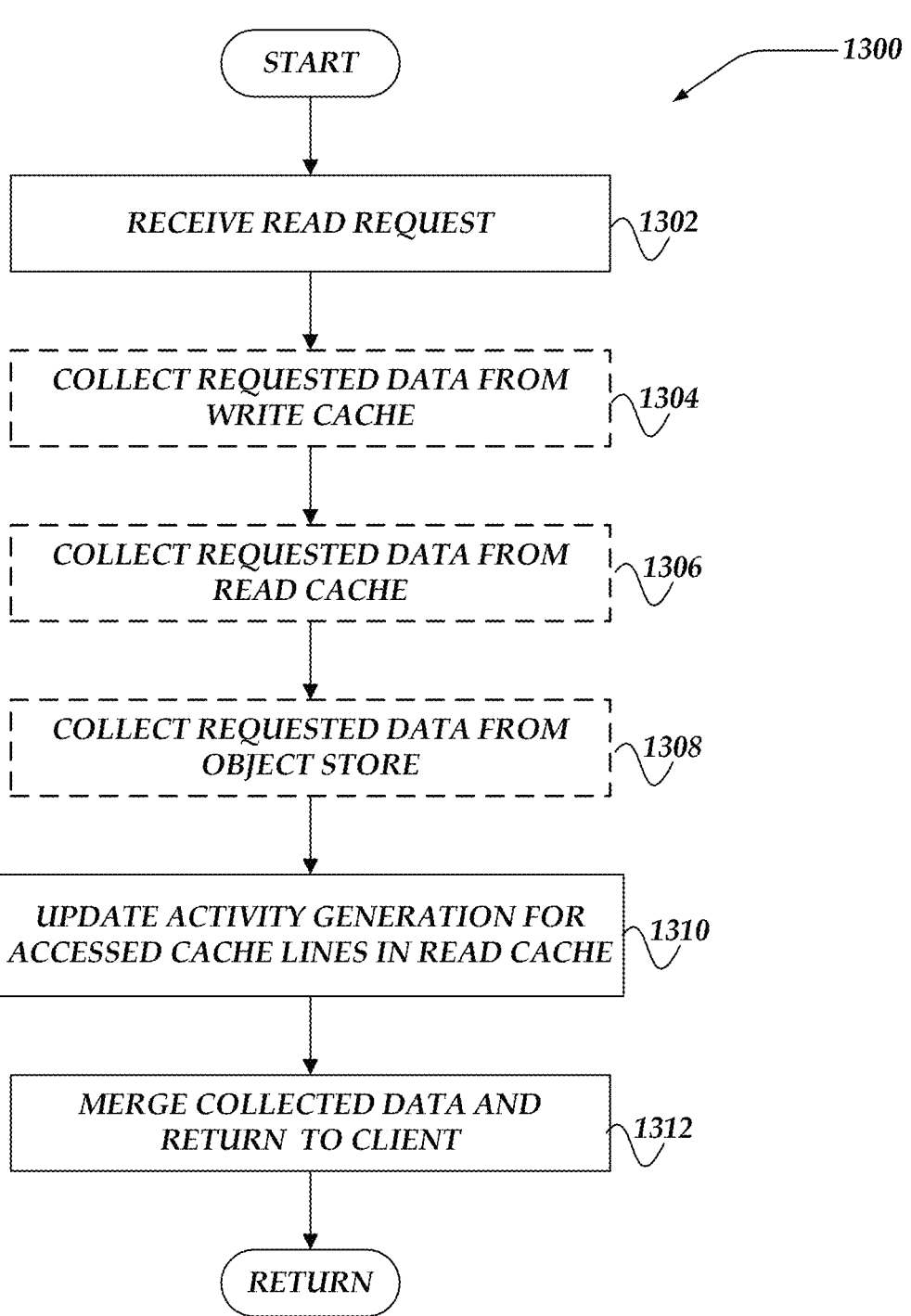
FIG. 13 illustrates an overview flowchart for a process for caching for object stores in accordance with one or more of the various embodiments.

FIG. 13 illustrates an overview flowchart for process 1300 for caching for object stores in accordance with one or more of the various embodiments. After a start flowchart block, at flowchart block 1302, in one or more of the various embodiments, file system engines may be arranged to receive a read request from one or more file system clients. In some embodiments, read requests may include file system address information, address ranges, data size information, or the like that may correspond to data stored in one or more data in a file system. In some embodiments, file system engines may be arranged to process read requests that may be part of larger file system-wide command transactions that may be distributed across one or more nodes or protection stores in the distributed file system. Accordingly, in some embodiments, read requests may include address information that corresponds to logical addresses in the file system that may be mapped to specific locations within immutable data or object that may be stored in one or more of a write cache, read cache or an object store using one or more indexes maintained by the file system engines.

At flowchart block 1304, in one or more of the various embodiments, optionally, file system engines may be arranged to collect the requested data from the write cache if available. In some embodiments, write caches may include data that has been recently modified or added but may not yet be flushed to the object store. Accordingly, in some embodiments, data in write caches may represent the most current version of file system data such that file system engines may be arranged to prioritize write cache data over data from read caches or object stores. In some embodiments, file system engines may be arranged to employ write cache indexes or overlay data structures to rapidly determine if the requested file system address range corresponds to data currently held in the write cache. Thus, in some embodiments, if the requested data may be found in the write cache, file system engines may be arranged to collect the write cache data for responding to the read request.

Note, this flowchart block is indicated as being optional because in some cases for some embodiments the write cache may not include any relevant data.

At flowchart block 1306, in one or more of the various embodiments, optionally, file system engines may be arranged to collect the requested data from the read cache if available. In some embodiments, read caches may store one or more cache lines that include slices of the immutable objects in the object store. In some embodiments, file system engines may be arranged to employ read cache indexes to determine if one or more cache lines in the read cache contain data that corresponds to the requested file system address range. Accordingly, in some embodiments, cache lines may be fixed-size data structures that represent contiguous slices of objects, such as 16 kilobyte slices, that may be loaded from the object store to populate the read cache. In some embodiments, if the requested data may be found in one or more cache lines, file system engines may be arranged to collect the data from those cache lines without requiring access to the underlying object store.

Note, this flowchart block is indicated as being optional because in some cases for some embodiments the read cache may not include any relevant data. Also, in some cases, data from the write cache may have satisfied the read request.

At flowchart block 1308, in one or more of the various embodiments, file system engines may be arranged to collect the requested data from the object store if needed. In some embodiments, if the read request cannot be satisfied entirely by data from the write cache or read cache, file system engines may be arranged to access the object store directly to obtain the remaining data. In some embodiments, file system engines may be arranged to employ object store indexes to identify specific objects or object identifiers that contain the requested data along with offset locations within those objects. Accordingly, in some embodiments, file system engines may be arranged to load entire object slices corresponding to cache line boundaries from the object store to satisfy the read request. In some embodiments, object slices loaded from the object store may be stored as new cache lines in the read cache for future use, subject to available cache capacity or eviction policies.

Note, this flowchart block is indicated as being optional because in some cases for some embodiments the object cache may not include any relevant data. For example, if data from the write cache or read cache satisfied the read request.

At flowchart block 1310, in one or more of the various embodiments, file system engines may be arranged to update the activity generation for the accessed cache lines in the read cache. In some embodiments, activity generations may be monotonically increasing values that may be employed for among other things implementing least-recently-used ordering for cache eviction policies. In some embodiments, if data may be accessed from cache lines in the read cache to respond to the read request, file system engines may be arranged to assign those cache lines the current activity generation value to reflect their recent use. Accordingly, in some embodiments, activity generations may provide a mechanism for tracking cache line access patterns such that cache lines with older activity generation values may be considered candidates for eviction if the read cache approaches capacity limits. In some embodiments, activity generation updates may be persisted along with other read cache indexes such that cache line ordering information may survive node restarts or other interruptions to the file system.

At flowchart block 1312, in one or more of the various embodiments, file system engines may be arranged to merge the collected data and return a response to the client that issued the read request. In some embodiments, file system engines may be arranged to combine data collected from one or more sources, such as write caches, read caches, or object stores, into a single coherent response that satisfies the original read request. Thus, in some embodiments, the merged response may provide the client with a consistent view of the file system data.

Next, in one or more of the various embodiments, control may be returned to a calling process.

Figure 14:
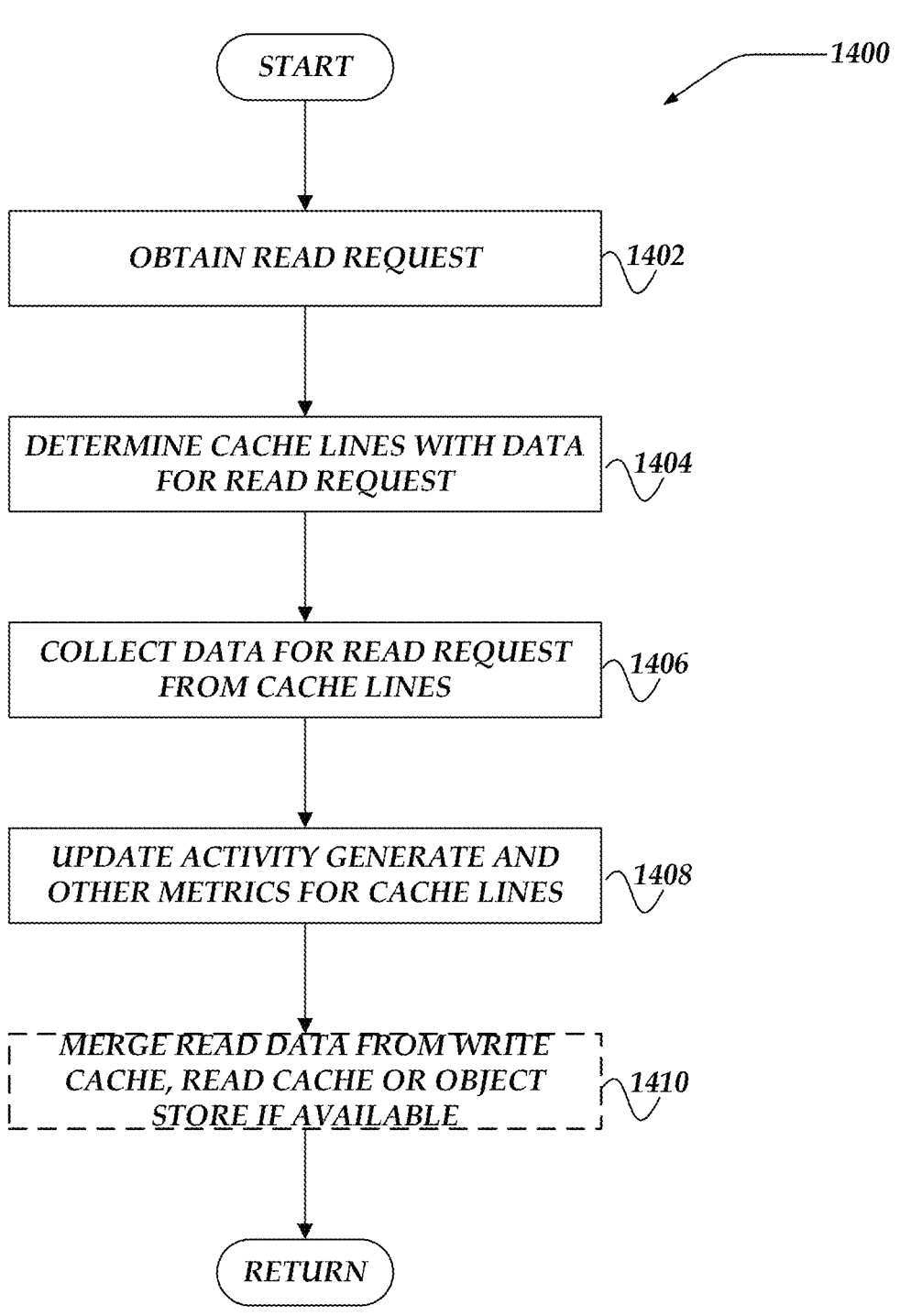
FIG. 14 illustrates a flowchart for a process for caching for object stores in accordance with one or more of the various embodiments.

FIG. 14 illustrates a flowchart for process 1400 for caching for object stores in accordance with one or more of the various embodiments. After a start flowchart block, at flowchart block 1402, in one or more of the various embodiments, file system engines may be arranged to obtain a read request from one or more file system clients.

In some embodiments, read requests may include file system address information, address ranges, or data size specifications that may correspond to data stored in one or more cache lines within the read cache. In some embodiments, file system engines may be arranged to process read requests that may target specific portions of immutable objects that have been cached as cache lines in the read cache. Accordingly, in some embodiments, read requests may include logical file system addresses that may be mapped to specific cache lines using read cache indexes maintained by the file system engines. In some embodiments, file system engines may be arranged to validate that the requested address ranges correspond to data that may be eligible for read cache access based on the current state of the cache line inventory.

At flowchart block 1404, in one or more of the various embodiments, file system engines may be arranged to determine one or more cache lines that may include data for the read request. In some embodiments, file system engines may be arranged to employ read cache indexes, or the like to rapidly identify one or more cache lines that contain data that may correspond to the requested file system address ranges. In some embodiments, cache lines may be fixed-size slices of immutable objects, such as 16 kilobyte segments, that have been loaded from the object store into the read cache for improved access performance.

Accordingly, in some embodiments, file system engines may be arranged to evaluate cache line boundaries to determine which specific cache lines may contain portions of the requested data. In some embodiments, if the requested data spans multiple cache lines, file system engines may be arranged to identify all relevant cache lines that contribute to satisfying the read request. In some embodiments, file system engines may be arranged to verify that identified cache lines contain valid data that has not been invalidated by subsequent write operations or cache management activities.

At flowchart block 1406, in one or more of the various embodiments, file system engines may be arranged to collect data for the read request from the one or more cache lines.

In some embodiments, file system engines may be arranged to extract the specific data portions from each identified cache line that correspond to the requested file system address ranges. In some embodiments, collecting data from cache lines may involve reading contiguous data segments from the high-performance storage devices that may provide the physical storage for the read cache. Accordingly, in some embodiments, file system engines may be arranged to handle cases if the requested data may be distributed across multiple non-contiguous cache lines by collecting data from each relevant cache line.

At flowchart block 1408, in one or more of the various embodiments, file system engines may be arranged to update the activity generation or other metrics associated with the one or more cache lines that may include data responsive to the read request. In some embodiments, activity generations may be monotonically increasing values that may be employed to track the recency of cache line access for implementing least-recently-used eviction policies. In some embodiments, file system engines may be arranged to assign the current activity generation value to each cache line that may include data responsive to the read request which may update their position in subsequent eviction ordering.

Accordingly, in some embodiments, activity generation updates may be persisted using data protection schemes as are other file system objects (e.g., file data, file meta-data, directory information, object indexes, cache indexes, or the like) to ensure that cache line ordering information survives node restarts, disk failures, or other system interruptions. In some embodiments, file system engines may be arranged to update one or more additional metrics associated with cache lines, such as access frequency counters, data category classifications, cache line qualities, or the like that may influence eviction policies or cache management decisions. Thus, in some embodiments, updating cache line metrics may contribute to maintaining accurate information for cache space guarantees or minimum eviction thresholds for different eviction categories.

At flowchart block 1410, in one or more of the various embodiments, optionally, file system engines may be arranged to merge the read data from the write cache, read cache, or object store if such data may be available. In some embodiments, merging read cache data with the other data may be necessary if the read request spans data that may be distributed across multiple storage tiers, such as write caches, read caches, or object stores. Accordingly, in some embodiments, file system engines may be arranged to handle cases if partial data may be available from the read cache while additional data must be obtained from the write cache or object store to complete the read request.

Note, this flowchart block is indicated as being optional because in some cases there may not be any other data to merge with the data obtained from the read cache.

Next, in one or more of the various embodiments, control may be returned to a calling process.

Figure 15:
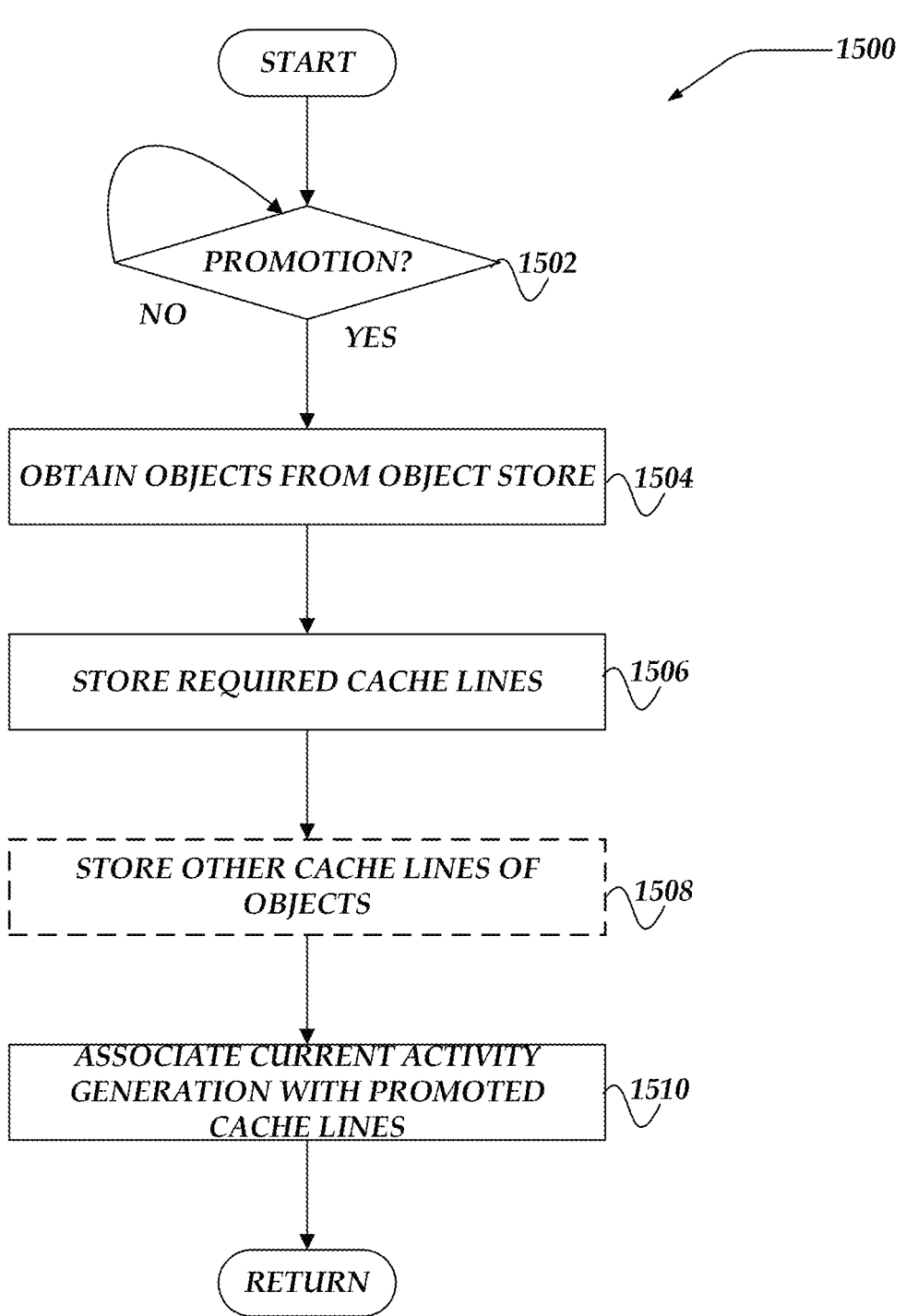
FIG. 15 illustrates a flowchart for a process for caching for object stores in accordance with one or more of the various embodiments.

FIG. 15 illustrates a flowchart for process 1500 for caching for object stores in accordance with one or more of the various embodiments. After a start flowchart block, at flowchart decision block 1502, in one or more of the various embodiments, if read cache promotion may be initiated, control may flow to block 1504; otherwise, control may loop back to flowchart decision block 1502.

In some embodiments, file system engines may be arranged to determine if promotion operations should be initiated based on one or more read cache policies or file system policies. In some embodiments, promotion operations may be triggered by various conditions, such as read requests that result in cache misses, hydration operations following disk failures or system restarts, or prefetch operations that anticipate future data access patterns. Accordingly, in some embodiments, file system engines may be arranged to evaluate current cache utilization, available cache capacity, or activity generation metrics to determine if promotion of object data into the read cache may be beneficial for system performance.

At flowchart block 1504, in one or more of the various embodiments, file system engines may be arranged to obtain one or more objects from an object store. In some embodiments, file system engines may be arranged to identify which objects in the object store contain the data blocks that may correspond to pending read requests or hydration operations. In some embodiments, file system engines may be arranged to employ object store indexes to determine specific object identifiers or object locations that may contain the requested data. Accordingly, in some embodiments, file system engines may be arranged to execute one or more cloud computing provider APIs to retrieve the identified objects from object storage services. In some embodiments, file system engines may be arranged to optimize object retrieval operations by requesting specific byte ranges from objects rather than loading entire objects.

At flowchart block 1506, in one or more of the various embodiments, file system engines may be arranged to store one or more required cache lines based on the one or more objects. In some embodiments, this may include selectively caching cache lines associated with a pending read request. In some embodiments, file system engines may be arranged to extract specific cache lines from the retrieved objects based on the address ranges or data blocks that are directly responsive to the initiating read requests. In some embodiments, cache lines may be fixed-size data structures, such as 16 kilobyte slices, that represent contiguous portions of immutable objects stored in the object store. Accordingly, in some embodiments, file system engines may be arranged to store these required cache lines in high-performance storage devices, such as NVMe disks or other ephemeral storage, that may provide faster access times compared to object store retrieval operations. In some embodiments, file system engines may be arranged to update read cache indexes to associate file system addresses with the newly cached data, enabling rapid determination of cache hits for subsequent read operations.

At flowchart block 1508, in one or more of the various embodiments, optionally, file system engines may be arranged to store one or more other cache lines of the one or more objects. In some embodiments, this may include executing a cache policy to load other cache lines from the one or more objects into the read cache. In some embodiments, file system engines may be arranged to implement prefetch policies that proactively cache additional cache lines from objects beyond those directly required for the current read request. In some embodiments, such prefetch operations may be based on observed access patterns, spatial locality principles, or predictive algorithms that may anticipate future data access requirements. Accordingly, in some embodiments, file system engines may be arranged to balance the benefits of prefetching additional cache lines against available cache capacity or eviction policies that manage cache space allocation. In some embodiments, file system engines may be arranged to consider cache space guarantees for different eviction categories, such as metadata, file data, or index information, to ensure that prefetched data does not adversely impact the retention of more critical cached content.

Note, this flowchart block is indicated as being optional because the particular number of cache lines to be loaded into the read cache may depend on the particular caching policy, prefetch policies, data type quotas/thresholds, or the like that may be configured to support local requirements or local circumstances.

At flowchart block 1510, in one or more of the various embodiments, file system engines may be arranged to associate the current activity generation with the one or more cache lines associated with the promoted data from the one or more objects.

In some embodiments, activity generations may be monotonically increasing values that file system engines employ to implement least-recently-used ordering for cache eviction policies. In some embodiments, file system engines may be arranged to assign the current activity generation value to each newly promoted cache line to establish their initial position in the eviction ordering relative to other cached data.

Accordingly, in some embodiments, file system engines may be arranged to persist activity generation information along with cache line metadata in durable storage structures, such as lookup trees or cache indexes, ensuring that eviction ordering information survives system restarts or disk failures. Thus, in some embodiments, file system engines may be arranged to maintain consistent cache management policies that prioritize recently accessed or newly promoted data while enabling efficient eviction of older or less frequently accessed cache lines based on their associated activity generation values.

Next, in one or more of the various embodiments, control may be returned to a calling process.

Figure 16:
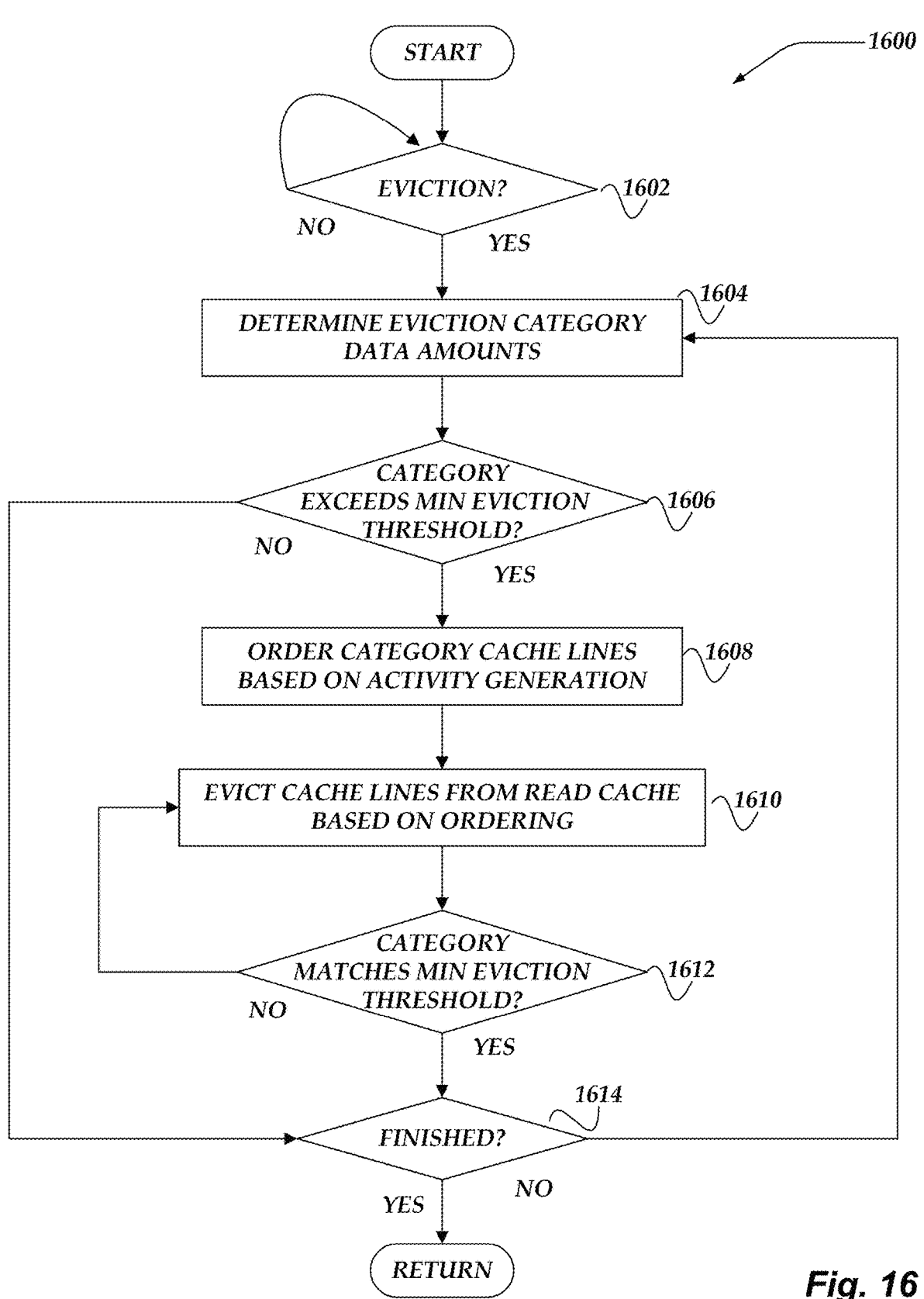
FIG. 16 illustrates a flowchart for a process for caching for object stores in accordance with one or more of the various embodiments.

FIG. 16 illustrates a flowchart for process 1600 for caching for object stores in accordance with one or more of the various embodiments. After a start flowchart block, at flowchart decision block 1602, in one or more of the various embodiments, if there may be a pending eviction job, control may flow to flowchart block 1604; otherwise, control may loop back to flowchart decision block 1602.

In some embodiments, file system engines may be arranged to initiate eviction operations based on one or more eviction policies that may be configured for the read cache. Accordingly, in some embodiments, eviction jobs may be triggered by various conditions, such as read cache capacity reaching threshold values, periodic eviction schedules, or administrator-initiated eviction operations. In some embodiments, file system engines may be arranged to monitor read cache utilization metrics to determine if eviction operations may be necessary to maintain optimal cache performance or to free cache space for new cache lines.

At flowchart block 1604, in one or more of the various embodiments, file system engines may be arranged to evaluate eviction category capacity or cached data in the read cache. In some embodiments, file system engines may be arranged to analyze the current composition of cached data across one or more eviction categories, such as speculative data, prefetch data, file data, metadata, index data, or the like. Accordingly, in some embodiments, file system engines may be arranged to determine the amount of cache space consumed by each eviction category to identify which categories may be eligible for eviction based on their respective minimum eviction thresholds. In some embodiments, file system engines may be arranged to collect one or more metrics regarding one or more of cache line quantities, cache space utilization, or activity generation distributions to facilitate eviction reasoning.

At flowchart decision block 1606, if a minimum eviction threshold value for an eviction category may be exceeded, control may flow to flowchart decision block 1614; otherwise, control may flow to flowchart block 1608.

In some embodiments, file system engines may be arranged to compare the current cache space consumption for each eviction category against its corresponding minimum eviction threshold value. Accordingly, in some embodiments, minimum eviction thresholds may provide cache space guarantees that ensure a minimal amount of cache capacity remains available for specific eviction categories. In some embodiments, eviction categories that consume cache space below their minimum threshold values may be protected from eviction to maintain cache performance for critical data types, such as metadata or frequently accessed file data.

At flowchart block 1608, in one or more of the various embodiments, file system engines may be arranged to order the cache lines for the eviction category that exceeds its minimum eviction category based on activity generation.

In some embodiments, file system engines may be arranged to implement least recently used ordering by evaluating activity generation values associated with each cache line in the eligible eviction categories. Accordingly, in some embodiments, activity generation values may represent monotonically increasing identifiers that may be assigned to cache lines if they are created or accessed, enabling file system engines to determine the relative age or recency of cache line access.

In some embodiments, file system engines may be arranged to sort cache lines within eligible eviction categories in ascending order based on their activity generation values, such that cache lines with older activity generation values may be prioritized for eviction. Thus, in some embodiments, this ordering mechanism may ensure that least recently used cache lines may be evicted first while preserving more recently accessed data in the read cache.

At flowchart block 1610, in one or more of the various embodiments, file system engines may be arranged to evict one or more cache lines from the read cache based on the activity generation based ordering. In some embodiments, file system engines may be arranged to remove cache lines from the read cache starting with those having the oldest activity generation values within eligible eviction categories. Accordingly, in some embodiments, file system engines may be arranged to free cache space by removing cache line data from high-performance storage devices, such as NVMe storage or ephemeral storage, while updating corresponding cache indexes to reflect the removal of evicted cache lines. In some embodiments, file system engines may be arranged to continue evicting cache lines until sufficient cache space has been freed or until the eviction category consumption falls within its minimum eviction threshold.

At flowchart decision block 1612, in one or more of the various embodiments, if the amount of data in the read cache for the category may be less than or equal to its corresponding minimum eviction threshold, control may flow to flowchart decision block 1614; otherwise, control loop back to flowchart block 1610.

In some embodiments, file system engines may be arranged to monitor the cache space consumption for the eviction category being processed to ensure that eviction operations do not reduce the category below its guaranteed minimum threshold. Accordingly, in some embodiments, this threshold checking mechanism may prevent over-eviction that could negatively impact cache performance for critical data categories. In some embodiments, file system engines may be arranged to cease eviction operations for a particular category if further eviction would violate the minimum cache space guarantees established for that data category.

At flowchart decision block 1614, in one or more of the various embodiments, if the eviction job remains unfinished, control may loop back to flowchart block 1604; otherwise, control may be returned to a calling process. In some embodiments, file system engines may be arranged to evaluate if additional eviction categories require processing or if the overall eviction objectives have been achieved. Accordingly, in some embodiments, eviction jobs may continue processing additional eviction categories that exceed their minimum thresholds until sufficient cache space has been freed or until all eligible categories have been processed. In some embodiments, file system engines may be arranged to complete eviction operations by updating cache metadata, persisting cache state information, or notifying other file system components about the completion of eviction activities. Thus, in some embodiments, this iterative approach may ensure that eviction operations systematically process all eligible eviction categories while respecting minimum cache space guarantees for each category.

Figure 17:
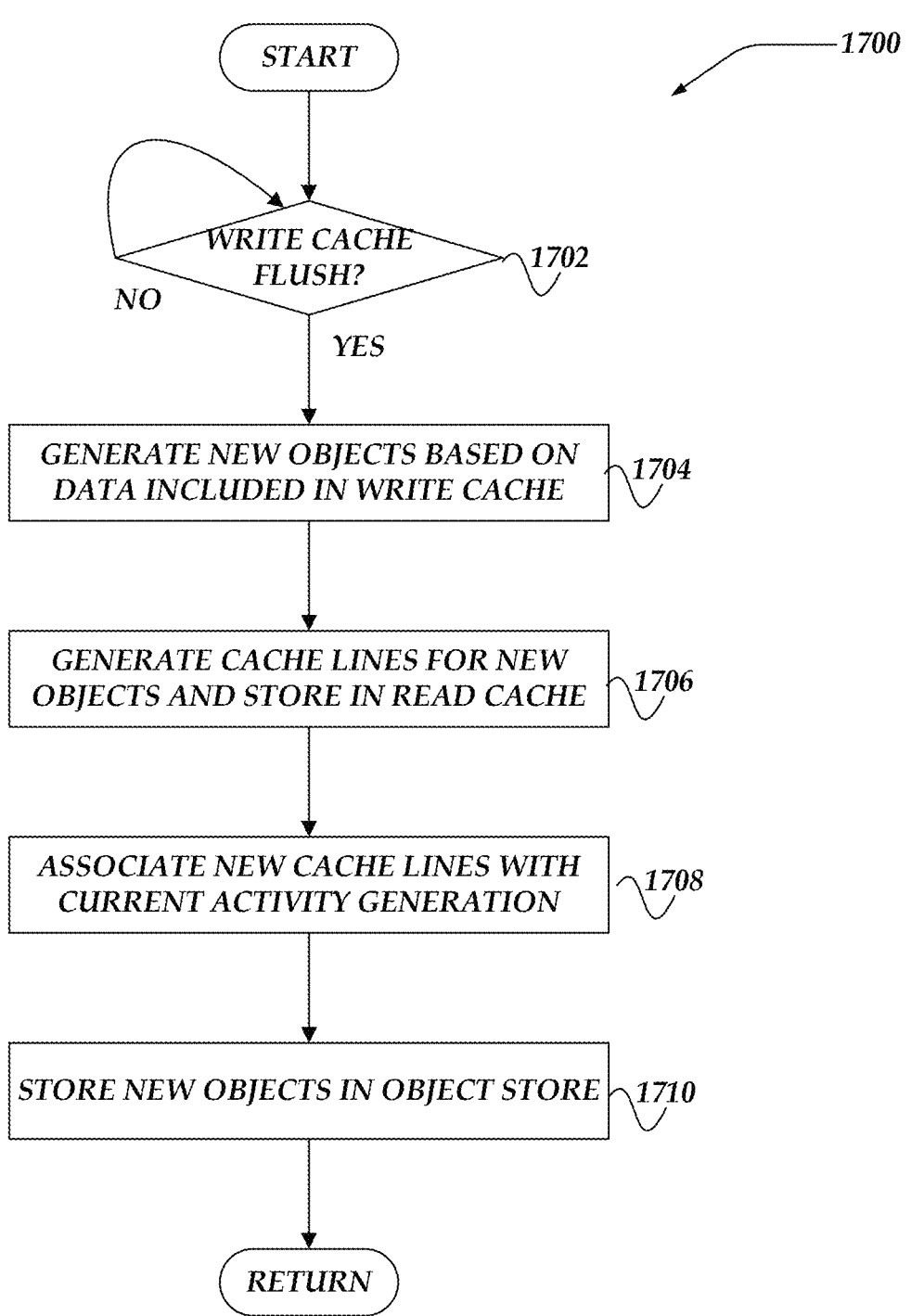
FIG. 17 illustrates a flowchart for a process for caching for object stores in accordance with one or more of the various embodiments.

FIG. 17 illustrates a flowchart for process 1700 for caching for object stores in accordance with one or more of the various embodiments. At flowchart decision block 1702, in one or more of the various embodiments, if there may be a pending full or partial write cache flush job, control may flow to flowchart block 1704; otherwise, control loop back to flowchart decision block 1702.

In some embodiments, file system engines may be arranged to monitor one or more write caches to determine if flush operations should be initiated based on one or more flush policies. In some embodiments, write cache flush operations may be triggered by various conditions, such as write cache capacity reaching threshold values, periodic flush schedules, or the like. Accordingly, in some embodiments, file system engines may be arranged to evaluate write cache utilization metrics, pending transaction states, administrative flush requests, or the like to determine if flush operations may be necessary to maintain write cache performance or to ensure data durability.

At flowchart block 1704, in one or more of the various embodiments, file system engines may be arranged to generate one or more new objects based on the data included in the write cache. In some embodiments, file system engines may be arranged to collect one or more write entries from the write cache that may be eligible for flush operations based on transaction commit status or flush policies. Accordingly, in some embodiments, file system engines may be arranged to organize write cache data into one or more write ahead log (WAL) objects that include WAL entries corresponding to committed write transactions. In some embodiments, file system engines may be arranged to package data blocks, metadata, transaction information, or the like into immutable objects that conform to object store formatting requirements. Thus, in some embodiments, file system engines may be arranged to ensure that generated objects include sufficient metadata to enable proper indexing, data retrieval, or cache line generation for subsequent read operations.

Note, In some embodiments, file system engines may determine the particular WAL object formatting, object internal formatting, or the like for generating objects based on the formatting requirements of the particular file systems. Accordingly, in some embodiments, file system engines may be arranged to be adaptable to different formatting requirements. Thus, in some embodiments, file system engines may be arranged to employ rules, instructions, libraries, or the like provided via configuration information to account for local circumstances or local requirements.

At flowchart block 1706, in one or more of the various embodiments, file system engines may be arranged to generate one or more cache lines for the one or more new objects such that the cache lines may be stored in the read cache. In some embodiments, file system engines may be arranged to create cache lines by dividing the newly generated objects into fixed-size slices, such as 16 kilobyte segments, that correspond to cache line boundaries. In some embodiments, cache lines may be generated to include cache line metadata that characterizes the contents of each cache line, such as data categories, cache sources, activity information, activity generation, or the like. Accordingly, in some embodiments, file system engines may be arranged to associate cache line qualities with each generated cache line to support eviction policies, performance monitoring, or cache management operations. In some embodiments, file system engines may be arranged to ensure that cache lines maintain references to their corresponding object identifiers, byte offsets, or other location information to enable efficient data retrieval.

At block 1708, in one or more of the various embodiments, file system engines may be arranged to associate the one or more new cache lines with the current activity generation. In some embodiments, activity generations may be monotonically increasing values that file system engines employ to implement least-recently-used ordering for cache eviction policies. Accordingly, in some embodiments, file system engines may be arranged to assign the current activity generation value to each newly created cache line to establish their initial position in the eviction ordering relative to other cached data. In some embodiments, file system engines may be arranged to update cache line metadata to include activity generation information that may be persisted along with other cache management data structures. Thus, in some embodiments, file system engines may be arranged to maintain consistent cache management policies that enable efficient eviction of older or less frequently accessed cache lines based on their associated activity generation values.

At block 1710, in one or more of the various embodiments, file system engines may be arranged to store the one or more new objects into the object store. In some embodiments, file system engines may be arranged to execute one or more cloud computing provider APIs or object storage protocols to persist the newly generated objects to the underlying object storage infrastructure. In some embodiments, file system engines may be arranged to update object store indexes to include references to the newly stored objects, ensuring that data blocks within the objects can be located for subsequent read operations. Accordingly, in some embodiments, file system engines may be arranged to perform object naming operations that conform to object store naming conventions or sorting policies to optimize object discovery or management operations. In some embodiments, file system engines may be arranged to update in-memory data structures, such as overlays, indexes, or cache metadata, to reflect the successful storage of new objects in the object store, enabling coordinated operation between write caches, read caches, or object stores.

Next, in one or more of the various embodiments, control may be returned to a calling process.

Figure 18:
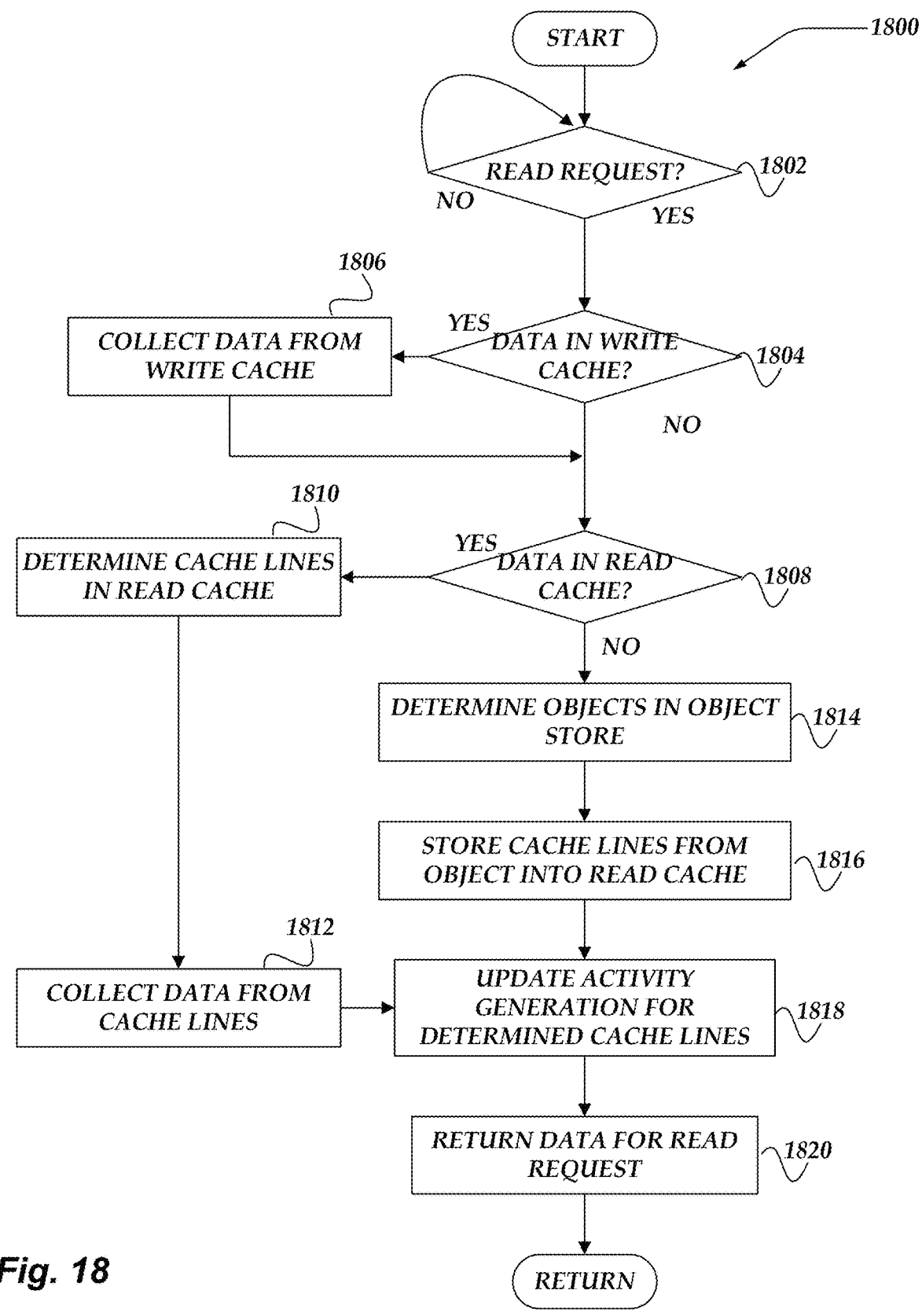
FIG. 18 illustrates a flowchart for a process for caching for object stores in accordance with one or more of the various embodiments.

FIG. 18 illustrates a flowchart for process 1800 for caching for object stores in accordance with one or more of the various embodiments. After a start flowchart block, at flowchart decision block 1802, in one or more of the various embodiments, if there may be a pending read request, control may flow to flowchart decision block 1804; otherwise, control loop back to flowchart decision block 1802.

In some embodiments, file system engines may be arranged to monitor for incoming read requests that may be submitted by one or more file system clients or other file system components. In some embodiments, read requests may include file system address information, data ranges, or size specifications that correspond to data stored in one or more of the read caches, write caches, or object stores of the distributed file system. Accordingly, in some embodiments, file system engines may be arranged to evaluate pending read requests to determine the appropriate data sources, such as write caches, read caches, or object stores, that may contain the requested data. In some embodiments, file system engines may be arranged to implement one or more request queuing mechanisms not discussed here to manage multiple concurrent read requests while maintaining consistent data access ordering or transaction semantics.

At flowchart decision block 1804, in one or more of the various embodiments, if the data responsive to the read request may be found in the write cache, control may flow to flowchart block 1806; otherwise, control may flow to flowchart decision block 1808.

In some embodiments, file system engines may be arranged to prioritize write cache data over other data sources because write caches may contain the most recent version of file system data that has been modified but not yet flushed to other persistent storage. In some embodiments, file system engines may be arranged to employ write cache indexes, overlay data structures, or other metadata to rapidly determine if the requested file system address ranges correspond to data currently held in write cache storage. Accordingly, in some embodiments, file system engines may be arranged to evaluate write cache entries to identify data blocks that match the address ranges specified in the read request. In some embodiments, file system engines may be arranged to handle cases if write cache data may be part of pending transactions that have not yet been committed to ensure data consistency or transaction isolation.

At flowchart block 1806, in one or more of the various embodiments, file system engines may be arranged to collect data responsive to the read request from the write cache.

In some embodiments, file system engines may be arranged to extract specific data portions from write cache entries that correspond to the requested file system address ranges or data specifications. In some embodiments, collecting data from write caches may involve accessing high-performance storage devices, such as NVMe storage or other block storage devices, that provide the physical storage for write cache operations. Accordingly, in some embodiments, file system engines may be arranged to handle cases if the requested data may be distributed across multiple write cache entries by collecting data from each relevant write cache location. In some embodiments, file system engines may be arranged to update write cache access statistics, performance metrics, or other telemetry data to support write cache optimization or administrative monitoring.

Next, in one or more of the various embodiments, control may flow to flowchart decision block 1808.

At flowchart decision block 1808, in one or more of the various embodiments, if there may be data responsive to the read request in the read cache, control may flow to flowchart block 1810; otherwise, control may flow to flowchart block 1814.

In some embodiments, file system engines may be arranged to evaluate read cache indexes to determine if one or more cache lines contain data that corresponds to the requested file system address ranges. In some embodiments, read caches may store cache lines that represent fixed-size slices of immutable objects from the object store, enabling rapid access to frequently accessed or recently cached data. Accordingly, in some embodiments, file system engines may be arranged to check cache line boundaries to determine which specific cache lines may contain portions of the requested data.

At flowchart block 1810, in one or more of the various embodiments, file system engines may be arranged to determine one or more cache lines read cache that may include data responsive to the read request.

In some embodiments, file system engines may be arranged to employ read cache indexes or other metadata structures to identify specific cache lines that contain data blocks corresponding to the requested file system addresses. In some embodiments, cache lines may be organized as fixed-size data structures, such as 16 kilobyte segments, that represent contiguous slices of objects stored in the underlying object store. Accordingly, in some embodiments, file system engines may be arranged to evaluate address mappings to determine which cache lines may contain the requested data ranges, including cases if the requested data spans multiple cache lines or cache line boundaries.

At flowchart block 1812, in one or more of the various embodiments, file system engines may be arranged to collect the data responsive to the read request from the one or more cache lines.

In some embodiments, file system engines may be arranged to extract specific data portions from each identified cache line that correspond to the requested file system address ranges or data specifications. In some embodiments, collecting data from cache lines may involve reading from high-performance storage devices, such as NVMe storage or ephemeral storage, that provide the physical storage for the read cache. Accordingly, in some embodiments, file system engines may be arranged to handle cases if the requested data may be distributed across multiple non-contiguous cache lines by collecting data segments from each relevant cache line location. In some embodiments, file system engines may be arranged to maintain read cache performance statistics, access patterns, or other metrics that may be employed for cache optimization, eviction policy tuning, or administrative reporting purposes.

Next, in one or more of the various embodiments, control may flow to flowchart block 1818.

At block 1814, in one or more of the various embodiments, file system engines may be arranged to determine one or more objects in the object store that may include data responsive to the read request.

In some embodiments, file system engines may be arranged to employ object store indexes to identify specific objects or object identifiers that contain the requested data along with offset locations within those objects. In some embodiments, object store indexes may provide mappings from file system addresses to object identifiers, byte ranges, or other location information that enables efficient data retrieval from immutable objects. Accordingly, in some embodiments, file system engines may be arranged to handle cases if the requested data may be distributed across multiple objects by identifying all relevant objects that contribute to satisfying the read request. In some embodiments, file system engines may be arranged to optimize object store access patterns by grouping related data requests, prefetching additional object slices, or employing other strategies to minimize object store operation costs or latency.

At flowchart block 1816, in one or more of the various embodiments, file system engines may be arranged to generate one or more cache lines for the one or more objects and store them in the read cache.

In some embodiments, file system engines may be arranged to create cache lines by dividing retrieved objects into fixed-size slices that correspond to cache line boundaries or storage alignment requirements. In some embodiments, file system engines may be arranged to execute one or more cloud computing provider APIs or object storage protocols to retrieve specific byte ranges or entire objects from the underlying object storage infrastructure. Accordingly, in some embodiments, file system engines may be arranged to generate cache line metadata that characterizes the contents of each cache line, such as data categories, cache sources, object references, or other attributes that support cache management policies. In some embodiments, file system engines may be arranged to store newly generated cache lines in high-performance storage devices while updating read cache indexes to enable rapid location of cached data for subsequent read operations. Thus, in some embodiments, file system engines may be arranged to implement cache space management policies to ensure that new cache lines do not exceed available cache capacity or violate eviction thresholds for different eviction categories.

At flowchart block 1818, in one or more of the various embodiments, file system engines may be arranged to update the activity generation for the one or more cache lines and the one or more new cache lines.

In some embodiments, file system engines may be arranged to assign current activity generation values to cache lines that have been accessed or newly created to maintain least-recently-used ordering for cache eviction policies. In some embodiments, activity generations may be monotonically increasing values that enable file system engines to determine the relative age or recency of cache line access across the entire read cache. Accordingly, in some embodiments, file system engines may be arranged to update activity generation information for existing cache lines that provided data for the read request as well as newly created cache lines that were loaded from the object store. In some embodiments, file system engines may be arranged to persist activity generation updates along with other cache metadata in durable storage structures to ensure that eviction ordering information survives system restarts, disk failures, or other interruptions, such as including them in the cache lines, or the like.

At block 1820, in one or more of the various embodiments, file system engines may be arranged to return the data responsive to the read request. In some embodiments, this may include data from the write cache, read cache, or objects depending where the data responsive to the read request was located.

In some embodiments, file system engines may be arranged to merge data collected from one or more sources, such as write caches, read caches, or object stores, into a single coherent response that satisfies the original read request. In some embodiments, file system engines may be arranged to handle data format conversions, byte ordering, or other data processing requirements to ensure that returned data conforms to file system client expectations or protocol requirements. Accordingly, in some embodiments, file system engines may be arranged to include appropriate metadata, status information, or error conditions in the response to enable file system clients to properly process the returned data. Thus, in some embodiments, file system engines may be arranged to update performance metrics, telemetry data, or other monitoring information to support file system optimization, administrative reporting, or capacity planning activities.

Next, in one or more of the various embodiments, control may be returned to a calling process.

Figure 19:
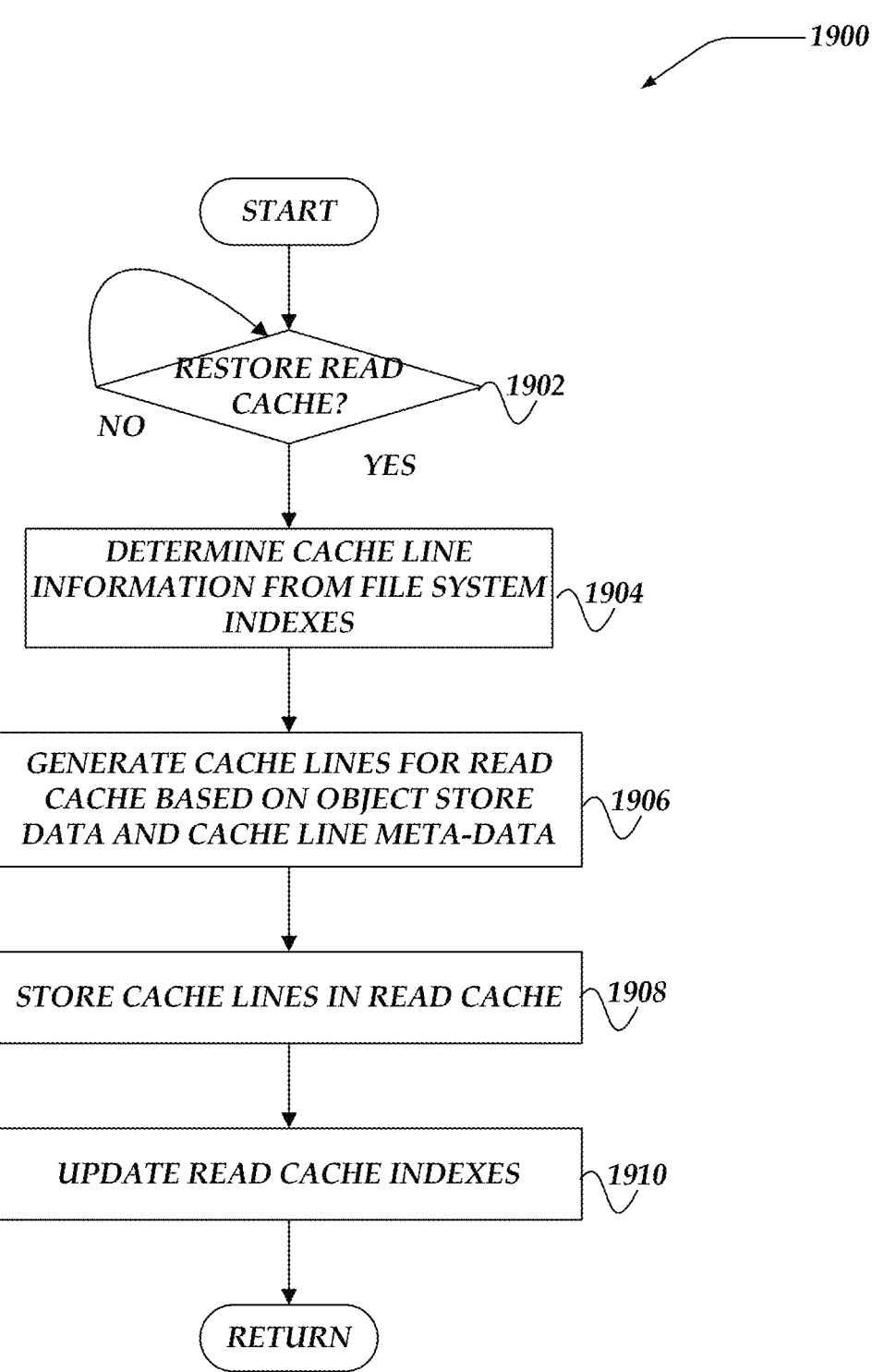
FIG. 19 illustrates a flowchart for a process for caching for object stores in accordance with one or more of the various embodiments.

FIG. 19 illustrates a flowchart for process 1900 for caching for object stores in accordance with one or more of the various embodiments. At flowchart decision block 1902, in one or more of the various embodiments, if there may be a pending read cache restoration operation, control may flow to flowchart decision block 1904; otherwise, control loop back to flowchart decision block 1902.

In some embodiments, file system engines may be arranged to initiate read cache restoration operations based on one or more restoration policies or system events that may require cache reconstruction. In some embodiments, cache restoration operations may be triggered by various conditions, such as disk failures that result in loss of ephemeral storage, system restarts that clear volatile cache data, node provisioning/replacements that require cache repopulation, or administrative operations that may necessitate cache rebuilding.

Accordingly, in some embodiments, file system engines may be arranged to monitor system events, disk status changes, or cache availability metrics to determine if restoration operations may be necessary to restore read cache functionality. In some embodiments, file system engines may be arranged to coordinate restoration operations across one or more file system nodes to ensure consistent cache state or to optimize restoration resource utilization across the distributed file system infrastructure.

At flowchart block 1904, in one or more of the various embodiments, file system engines may be arranged to determine the cache line information for the read cache based on one or more indexes.

In some embodiments, file system engines may be arranged to retrieve cache line metadata from durable read cache indexes that may have been preserved before the cache loss event. In some embodiments, read cache indexes may be stored as protected file system objects that maintain information about cache line composition, object references, activity generations, cache line qualities, or other attributes that characterized the previous state of the read cache. Accordingly, in some embodiments, file system engines may be arranged to analyze cache line information to determine which object slices were previously cached, their associated data categories, eviction priorities, access patterns, or the like that may influence restoration decisions. In some embodiments, file system engines may be arranged to evaluate cache space guarantees, minimum eviction thresholds, or other cache policies to determine which cache lines should be prioritized for restoration based on their data categories or system importance. In some embodiments, file system engines may be arranged to cross-reference cache line information with current object store indexes to ensure that referenced objects remain available or have not been modified since the cache loss occurred. Thus, in some embodiments, file system engines may be arranged to filter cache line information based on available cache capacity, restoration resource constraints, or administrative policies that may limit the scope of restoration operations.

At flowchart block 1906, in one or more of the various embodiments, file system engines may be arranged to generate one or more cache lines for the read cache based on data from the object store and the cache line information.

In some embodiments, file system engines may be arranged to retrieve specific object slices from the object store that correspond to the cache lines identified during the cache line information determination process. In some embodiments, file system engines may be arranged to execute one or more cloud computing provider APIs or object storage protocols to access immutable objects that contain the data required for cache line reconstruction.

Accordingly, in some embodiments, file system engines may be arranged to extract fixed-size data segments, such as 16 kilobyte slices, from retrieved objects based on the byte ranges, offset positions, or object locations specified in the preserved cache line metadata. In some embodiments, file system engines may be arranged to reconstruct cache line data structures by combining retrieved object data with restored cache line metadata, including activity generation values, data category classifications, cache source information, or other cache line qualities that support cache management policies. In some embodiments, file system engines may be arranged to validate that retrieved object data matches expected checksums, data integrity markers, or other verification information to ensure cache line accuracy. In some embodiments, file system engines may be arranged to implement restoration prioritization policies that may determine the order of cache line generation based on data importance, access frequency predictions, or system performance requirements.

At flowchart block 1908, in one or more of the various embodiments, file system engines may be arranged to store the one or more cache lines in the read cache.

In some embodiments, file system engines may be arranged to allocate cache line storage space on high-performance storage devices, such as NVMe storage or other ephemeral storage systems, that provide the physical storage infrastructure for the read cache. In some embodiments, file system engines may be arranged to organize cache lines according to cache geometry requirements, storage alignment constraints, access optimization patterns, or the like that may improve read cache performance. Accordingly, in some embodiments, file system engines may be arranged to implement cache space management policies that ensure restored cache lines comply with minimum eviction thresholds, cache space guarantees, or other capacity constraints defined for different data categories.

In some embodiments, file system engines may be arranged to update cache line metadata structures, such as lookup trees or cache management data structures, to reflect the storage locations, access patterns, or organizational information for newly restored cache lines. In some embodiments, file system engines may be arranged to coordinate cache line storage operations with concurrent file system activities to prevent interference with ongoing read requests, write operations, or other cache management processes. Thus, in some embodiments, file system engines may be arranged to monitor restoration progress, storage utilization metrics, or performance indicators to optimize restoration operations or to detect potential issues during cache reconstruction.

At flowchart block 1910, in one or more of the various embodiments, file system engines may be arranged to update the read cache indexes to reflect the restored read cache.

In some embodiments, file system engines may be arranged to rebuild read cache indexes to establish accurate mappings between file system addresses or logical data ranges to the newly restored cache lines in the read cache. In some embodiments, file system engines may be arranged to update index data structures, such as binary trees, hash tables, or other indexing mechanisms, to enable rapid determination of cache hits for subsequent read operations targeting the restored cache content. Accordingly, in some embodiments, file system engines may be arranged to synchronize read cache indexes with object store indexes, write cache overlays, or other file system metadata to ensure consistent data location information across the distributed file system infrastructure.

In some embodiments, file system engines may be arranged to validate index consistency by verifying that cache line references, address mappings, or object relationships accurately reflect the current state of both the read cache or the underlying object store. In some embodiments, file system engines may be arranged to persist updated read cache indexes using data protection schemes that ensure index durability, replication, or recovery capabilities that prevent future index loss. In some embodiments, file system engines may be arranged to notify other file system components, nodes, or administrative interfaces about the completion of cache restoration operations to enable coordinated file system operations or performance monitoring activities.

Next, in one or more of the various embodiments, control may be returned to a calling process.

Figure 20:
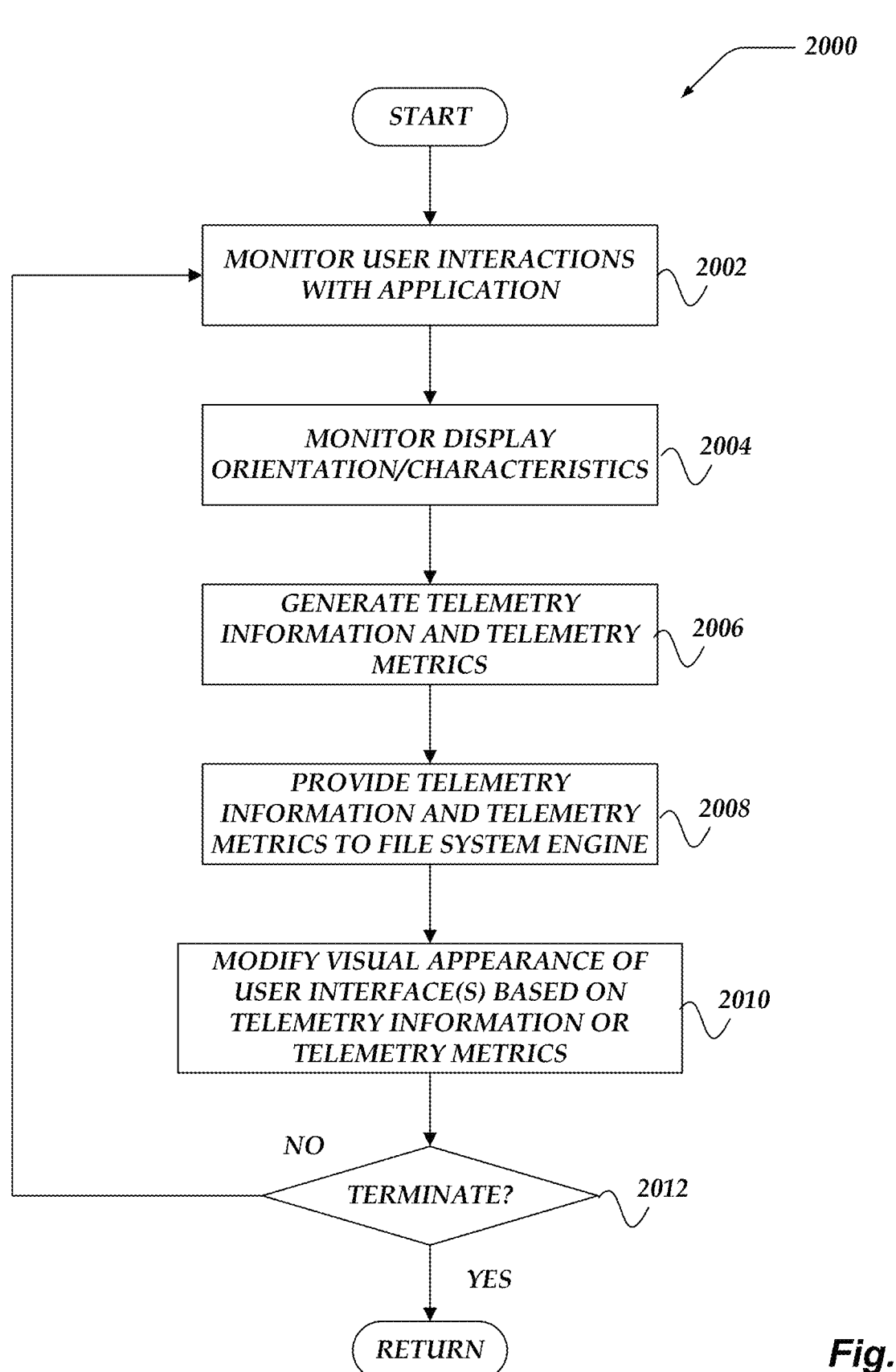
FIG. 20 illustrates a flowchart of a process for collecting and applying telemetry information and telemetry metrics for context repository management in accordance with one or more of the various embodiments.

FIG. 20 illustrates a flowchart of process 2000 for collecting and applying telemetry information and telemetry metrics for caching for object stores in accordance with one or more of the various embodiments. After a start block, at block 2002, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 12 for additional details.

At block 2004, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 2006, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 2008, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as file system engines, or the like, to gain access to the telemetry information or telemetry metrics. In some embodiments, telemetry engines may be configured to push some or all of the telemetry information or telemetry metrics to one or more subscribing applications or services. Also, in some embodiments, telemetry engines may be configured to enable other applications or services to poll or otherwise request-on-demand some or all of the telemetry information or telemetry metrics.

At block 2010, in one or more of the various embodiments, analysis engines or playbook engines may be arranged to modify the visual appearance of one or more user interfaces based on the telemetry information or telemetry metrics.

Accordingly, in some embodiments, analysis engines or playbook engines may be arranged to dynamically change the visual appearance of the one or more user interfaces to improve the efficiency and effectiveness of the user interfaces based on some or all of the telemetry information or telemetry metrics. For example, analysis engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, analysis engines or playbook engines may be arranged to highlight or size the preferred user interface elements or display panels. For example, if users are determined to rarely interact with a particular display panel, playbook engines may be arranged to reduce the size, diminish the shape, disable its controls, and re-position that display panel to improve the efficiency of display screen usage. See, also FIG. 12 and its description.

At decision block 2012, in one or more of the various embodiments, if the telemetry engine or file system engine may be terminated, control may be returned to a calling process; otherwise, control may loop back to block 2002. In some embodiments, telemetry engines may be arranged to continuously or periodically provide updated/current telemetry information or telemetry metrics to enable file system engines to dynamically change the visual appearance of the one or more user interfaces. Accordingly, in some embodiments, process 2000 may continue operation until it may be explicitly terminated or the operation of the associated file system engines may be terminated.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors to execute instructions that are configured to cause performance of actions, comprising:

obtaining a read request to collect data from the file system for a client of the file system, wherein the file system includes a write cache, a read cache, and an object store; and using a file system address associated with the read request, to perform further actions, including:

collecting one or more cache lines in the read cache based on the file system address and a read cache index, wherein each cache line includes a fixed-size slice of content from an object in the object store and cache line metadata comprising one or more cache line qualities;

collecting one or more portions of the data for the read request from the one or more cache lines; and using one or more other portions of the data that are unavailable in the read cache, to perform further actions, including:

collecting one or more fixed size slices of content that include the one or more other portions of the data from one or more objects in the object store based on the read request;

obtaining one or more new cache lines based on the one or more fixed size slices of content, wherein the one or more new cache lines are stored in the read cache; and collecting a response to the read request based on one or more portions of the data and the one or more other portions of the data, wherein the response is communicated to the client; and obtaining a user interface that includes one or more display panels for content that includes a cache performance metrics and other information associated with the file system, wherein the content is dynamically transformed and arranged for display to a user based on user interaction telemetry, user feedback and telemetry metrics.

2. The method of claim 1, further comprising:

updating an activity generation value for the one or more cache lines and the one or more new cache lines based on a current activity generation, wherein the activity generation value is employed to sequence cache line eviction from the read cache.

3. The method of claim 1, further comprising:

collecting one or more additional portions of the data that are in the write cache based on the read request; and including the one or more additional portions of the data in the response.

4. The method of claim 1, further comprising:

using a read cache eviction trigger associated with the read cache to perform additional actions, including:

obtaining an eviction category for each cache line in the read cache based on the one or more cache qualities associated with each cache line, wherein each eviction category is associated with a minimum eviction threshold value;

collecting one or more eviction categories that are associated with an amount of content in the read cache that exceeds their associated minimum eviction threshold value;

collecting one or more evictable cache lines in the read cache that are associated with the one or more eviction categories, wherein the one or more evictable cache lines are sorted in ascending order based on their associated activity generation value; and iteratively evicting the one or more evictable cache lines in the ascending order until the amount of content in the read cache associated with each eviction category is at or below its associated minimum eviction threshold value.

5. The method of claim 1, further comprising:

using a cache promotion operation to perform further actions, including:

collecting the one or more other portions of the data that are unavailable in the read cache based on a cache miss for the read request;

identifying one or more target objects in the object store that contain the one or more other portions of the data using an object store index that maps file system addresses to object identifiers and offset locations within the one or more target objects;

obtaining the one or more target objects from the object store;

collecting the one or more new cache lines by dividing the one or more target objects into the one or more fixed size slices of content that correspond to one or more cache line boundaries; and storing the one or more new cache lines in the read cache.

6. The method of claim 1, wherein the one or more cache line qualities further comprise:

one or more of a cache source identifier, a data category identifier, or an activity generation value, wherein the cache source identifier indicates which subsystem stored the cache line into the read cache.

7. The method of claim 1, further comprising:

updating the read cache index based on one or more of a new cache line added to the read cache, a cache line eviction from the read cache, or a cache line modification, wherein the read cache index maps file system addresses to cache line locations in the read cache.

8. The method of claim 1, further comprising:

using a read cache loss event that includes one or more of a loss of ephemeral storage, a disk failure, a system restart, or a cache restoration action that disables or invalidates the current read cache to perform additional actions, including:

collecting the read cache index from the file system;

collecting one or more restoration cache lines from the object store based on the read cache index; and storing the one or more restoration cache lines in the read cache to restore cache functionality, wherein the one or more restoration cache lines preserve their original cache line qualities and activity generation value.

9. A network computer for managing data in a file system over a network, comprising:

a memory that stores at least instructions; and one or more processors that execute instructions that are configured to cause performance of actions, including:

obtaining a read request to collect data from the file system for a client of the file system, wherein the file system includes a write cache, a read cache, and an object store; and using a file system address associated with the read request, to perform further actions, including:

collecting one or more cache lines in the read cache based on the file system address and a read cache index, wherein each cache line includes a fixed-size slice of content from an object in the object store and cache line metadata comprising one or more cache line qualities;

collecting one or more portions of the data for the read request from the one or more cache lines; and using one or more other portions of the data that are unavailable in the read cache, to perform further actions, including:

collecting one or more fixed size slices of content that include the one or more other portions of the data from one or more objects in the object store based on the read request;

obtaining one or more new cache lines based on the one or more fixed size slices of content, wherein the one or more new cache lines are stored in the read cache; and collecting a response to the read request based on one or more portions of the data and the one or more other portions of the data, wherein the response is communicated to the client; and obtaining a user interface that includes one or more display panels for content that includes a cache performance metrics and other information associated with the file system, wherein the content is dynamically transformed and arranged for display to a user based on user interaction telemetry, user feedback and telemetry metrics.

10. The network computer of claim 9, wherein the one or more processors execute instructions that are configured to cause performance of actions, further comprising updating an activity generation value for the one or more cache lines and the one or more new cache lines based on a current activity generation, wherein the activity generation value is employed to sequence cache line eviction from the read cache.

11. The network computer of claim 9, wherein the one or more processors execute instructions that are configured to cause performance of actions, further comprising:

collecting one or more additional portions of the data that are in the write cache based on the read request; and including the one or more additional portions of the data in the response.

12. The network computer of claim 9, wherein the one or more processors execute instructions that are configured to cause performance of actions, further comprising using a read cache eviction trigger associated with the read cache to perform additional actions, including:

obtaining an eviction category for each cache line in the read cache based on the one or more cache qualities associated with each cache line, wherein each eviction category is associated with a minimum eviction threshold value;

collecting one or more eviction categories that are associated with an amount of content in the read cache that exceeds their associated minimum eviction threshold value;

collecting one or more evictable cache lines in the read cache that are associated with the one or more eviction categories, wherein the one or more evictable cache lines are sorted in ascending order based on their associated activity generation value; and iteratively evicting the one or more evictable cache lines in the ascending order until the amount of content in the read cache associated with each eviction category is at or below its associated minimum eviction threshold value.

13. The method of claim 1, wherein the one or more processors execute instructions that are configured to cause performance of actions, further comprising using a cache promotion operation to perform further actions, including:

collecting the one or more other portions of the data that are unavailable in the read cache based on a cache miss for the read request;

identifying one or more target objects in the object store that contain the one or more other portions of the data using an object store index that maps file system addresses to object identifiers and offset locations within the one or more target objects;

obtaining the one or more target objects from the object store;

collecting the one or more new cache lines by dividing the one or more target objects into the one or more fixed size slices of content that correspond to one or more cache line boundaries; and storing the one or more new cache lines in the read cache.

14. The network computer of claim 9, wherein the one or more cache line qualities further comprise:

one or more of a cache source identifier, a data category identifier, or an activity generation value, wherein the cache source identifier indicates which subsystem stored the cache line into the read cache.

15. The network computer of claim 9, wherein the one or more processors execute instructions that are configured to cause performance of actions, further comprising updating the read cache index based on one or more of a new cache line added to the read cache, a cache line eviction from the read cache, or a cache line modification, wherein the read cache index maps file system addresses to cache line locations in the read cache.

16. The network computer of claim 9, wherein the one or more processors execute instructions that are configured to cause performance of actions, further comprising using a read cache loss event that includes one or more of a loss of ephemeral storage, a disk failure, a system restart, or a cache restoration action that disables or invalidates the current read cache to perform additional actions, including:

collecting the read cache index from the file system;

collecting one or more restoration cache lines from the object store based on the read cache index; and storing the one or more restoration cache lines in the read cache to restore cache functionality, wherein the one or more restoration cache lines preserve their original cache line qualities and activity generation value.

17. A processor readable non-transitory storage media that includes instructions for managing data in a file system over a network, wherein execution of the instructions by one or more processors on one or more network computers performs actions, comprising:

obtaining a read request to collect data from the file system for a client of the file system, wherein the file system includes a write cache, a read cache, and an object store; and using a file system address associated with the read request, to perform further actions, including:

collecting one or more cache lines in the read cache based on the file system address and a read cache index, wherein each cache line includes a fixed-size slice of content from an object in the object store and cache line metadata comprising one or more cache line qualities;

collecting one or more portions of the data for the read request from the one or more cache lines; and using one or more other portions of the data that are unavailable in the read cache, to perform further actions, including:

collecting one or more fixed size slices of content that include the one or more other portions of the data from one or more objects in the object store based on the read request;

obtaining one or more new cache lines based on the one or more fixed size slices of content, wherein the one or more new cache lines are stored in the read cache; and collecting a response to the read request based on one or more portions of the data and the one or more other portions of the data, wherein the response is communicated to the client; and obtaining a user interface that includes one or more display panels for content that includes a cache performance metrics and other information associated with the file system, wherein the content is dynamically transformed and arranged for display to a user based on user interaction telemetry, user feedback and telemetry metrics.

18. The media of claim 17, further comprising:

using a read cache eviction trigger associated with the read cache to perform additional actions, including:

obtaining an eviction category for each cache line in the read cache based on the one or more cache qualities associated with each cache line, wherein each eviction category is associated with a minimum eviction threshold value;

collecting one or more eviction categories that are associated with an amount of content in the read cache that exceeds their associated minimum eviction threshold value;

collecting one or more evictable cache lines in the read cache that are associated with the one or more eviction categories, wherein the one or more evictable cache lines are sorted in ascending order based on their associated activity generation value; and iteratively evicting the one or more evictable cache lines in the ascending order until the amount of content in the read cache associated with each eviction category is at or below its associated minimum eviction threshold value.

19. The media of claim 17, further comprising:

using a cache promotion operation to perform further actions, including:

collecting the one or more other portions of the data that are unavailable in the read cache based on a cache miss for the read request;

identifying one or more target objects in the object store that contain the one or more other portions of the data using an object store index that maps file system addresses to object identifiers and offset locations within the one or more target objects;

obtaining the one or more target objects from the object store;

collecting the one or more new cache lines by dividing the one or more target objects into the one or more fixed size slices of content that correspond to one or more cache line boundaries; and storing the one or more new cache lines in the read cache.

20. The media of claim 17, further comprising:

using a read cache loss event that includes one or more of a loss of ephemeral storage, a disk failure, a system restart, or a cache restoration action that disables or invalidates the current read cache to perform additional actions, including:

collecting the read cache index from the file system;

collecting one or more restoration cache lines from the object store based on the read cache index; and storing the one or more restoration cache lines in the read cache to restore cache functionality, wherein the one or more restoration cache lines preserve their original cache line qualities and activity generation value.

\* \* \* \* \*